(12) United States Patent
Matyjaszewski et al.

(10) Patent No.: US 7,893,174 B2
(45) Date of Patent: Feb. 22, 2011

(54) ATOM TRANSFER RADICAL POLYMERIZATION PROCESS

(75) Inventors: Krzysztof Matyjaszewski, Pittsburgh, PA (US); Lindsay Bombalski, Pittsburgh, PA (US); Wojciech Jakubowski, Pittsburgh, PA (US); Ke Min, Pittsburgh, PA (US); James Spanswick, Wheaton, IL (US); Nicolay V. Tsarevsky, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 684 days.

(21) Appl. No.: 10/591,426

(22) PCT Filed: Mar. 7, 2005

(86) PCT No.: PCT/US2005/007265

§ 371 (c)(1),
(2), (4) Date: Jun. 13, 2007

(87) PCT Pub. No.: WO2005/087819

PCT Pub. Date: Sep. 22, 2005

(65) Prior Publication Data

US 2007/0276101 A1      Nov. 29, 2007

Related U.S. Application Data

(60) Provisional application No. 60/550,391, filed on Mar. 5, 2004.

(51) Int. Cl.
*C08F 4/40*      (2006.01)

(52) U.S. Cl. .................. 526/111; 526/96; 526/135; 526/145; 526/146; 526/147; 525/168; 525/243; 525/245; 525/247

(58) Field of Classification Search ............... 526/96, 526/111, 135, 145, 146, 147; 525/168, 243, 525/245, 247
See application file for complete search history.

(56) References Cited

U.S. PATENT DOCUMENTS

| | | | |
|---|---|---|---|
| 3,037,004 A | 5/1962 | Simone et al. |
| 3,096,312 A | 7/1963 | Henry |
| 3,183,217 A | 5/1965 | Serniuk et al. |
| 3,350,374 A | 10/1967 | Fetscher et al. |
| 3,397,186 A | 8/1968 | Edward et al. |
| 3,862,978 A | 1/1975 | Decker et al. |
| 3,959,225 A | 5/1976 | Kuntz |
| 3,963,491 A | 6/1976 | Marsh |
| 4,007,165 A | 2/1977 | MacLeay et al. |
| 4,073,870 A | 2/1978 | Saji et al. |
| 4,145,586 A | 3/1979 | Swann |
| 4,374,751 A | 2/1983 | Dudgeon |
| 4,384,093 A | 5/1983 | Culbertson et al. |
| 4,581,429 A | 4/1986 | Solomon et al. |
| 4,728,706 A | 3/1988 | Farnham et al. |
| 4,806,605 A | 2/1989 | Hertler |
| 4,940,648 A | 7/1990 | Geiger |
| 4,940,760 A | 7/1990 | Boettcher et al. |
| 4,954,416 A | 9/1990 | Wright et al. |
| 4,978,498 A | 12/1990 | Yoshihiro et al. |
| 5,026,813 A | 6/1991 | Meder |
| 5,089,135 A | 2/1992 | Yoneyama et al. |
| 5,102,967 A | 4/1992 | Meder |
| 5,169,914 A | 12/1992 | Kaszas et al. |
| 5,210,109 A | 5/1993 | Tateosian et al. |
| 5,212,043 A | 5/1993 | Yamamoto et al. |
| 5,248,746 A | 9/1993 | Shimokawa et al. |
| 5,254,651 A | 10/1993 | Alexanian et al. |
| 5,281,681 A | 1/1994 | Austin |
| 5,294,678 A | 3/1994 | Tse et al. |
| 5,312,871 A | 5/1994 | Mardare et al. |

(Continued)

FOREIGN PATENT DOCUMENTS

CA      2209061      2/1998

(Continued)

OTHER PUBLICATIONS

Annenkov et al., Poly-C-vinyltetrazoles: A New Type of Polyacid, Journal of Polymer Science Part A: Polymer Chemistry, 1993, pp. 1903-1906, vol. 31(7).
Asscher et al., Chlorine-Activation by Redox-Transfer, Part IV, The Addition of Sulphonyl Chlorides to Vinylic Monomers and Other Olefins, Journal of the Chemical Society, 1964, pp. 4962-4971.
Bamford, Comprehensive Polymer Science (First Supplement), eds., Pergamon: Oxford vol. 3., p. 123 (1991).
Bellus, Pure & Appl. Chem. 57, 1827 (1985).
Bledzki, et al., Makromol. Chem. 184, 745 (1983).

(Continued)

*Primary Examiner*—David Wu
*Assistant Examiner*—Michael M Bernshteyn
(74) *Attorney, Agent, or Firm*—K&L Gates LLP

(57) ABSTRACT

Embodiments of the polymerization process of the present invention are directed to polymerizing free radically polymerizable monomers in the presence of a polymerization medium initially comprising at least one transition metal catalyst and an atom transfer radical polymerization initiator. The polymerization medium may additionally comprise a reducing agent. The reducing agent may be added initially or during the polymerization process in a continuous or intermittent manner. The polymerization process may further comprise reacting the reducing agent with at least one of the transition metal catalyst in an oxidized state and a compound comprising a radically transferable atom or group to form a compound that does not participate significantly in control of the polymerization process. Embodiments of the present invention comprise reacting a reducing agent with at least one of catalyst in an oxidized state and a compound comprising a radically transferable atom or group to initiate and/or maintain catalytic activity throughout the polymerization process.

42 Claims, 18 Drawing Sheets

U.S. PATENT DOCUMENTS

| | | | |
|---|---|---|---|
| 5,322,912 A | 6/1994 | Georges et al. |
| 5,324,879 A | 6/1994 | Hawthorne |
| 5,331,088 A | 7/1994 | Meister |
| 5,401,804 A | 3/1995 | Georges et al. |
| 5,405,913 A | 4/1995 | Harwood et al. |
| 5,451,647 A | 9/1995 | Faust et al. |
| 5,470,928 A | 11/1995 | Harwood et al. |
| 5,506,312 A | 4/1996 | Arjunan |
| 5,508,353 A | 4/1996 | Liu et al. |
| 5,510,212 A | 4/1996 | Delnick et al. |
| 5,510,307 A | 4/1996 | Narayanan et al. |
| 5,558,954 A | 9/1996 | Morrison |
| 5,610,250 A | 3/1997 | Veregin et al. |
| 5,656,708 A | 8/1997 | Meister |
| 5,668,188 A | 9/1997 | Whinnery et al. |
| 5,700,844 A | 12/1997 | Liao et al. |
| 5,705,577 A | 1/1998 | Rossi et al. |
| 5,708,102 A | 1/1998 | Fryd et al. |
| 5,763,548 A | 6/1998 | Matyjaszewski et al. |
| 5,767,210 A | 6/1998 | Lecomte et al. |
| 5,773,538 A | 6/1998 | Feiring |
| 5,789,487 A | 8/1998 | Matyjaszewski et al. |
| 5,807,937 A * | 9/1998 | Matyjaszewski et al. ..... 526/135 |
| 5,811,500 A | 9/1998 | Dubois et al. |
| 5,833,320 A | 11/1998 | Kaneko et al. |
| 5,854,364 A | 12/1998 | Senninger et al. |
| 5,886,118 A | 3/1999 | Percec |
| 5,891,971 A | 4/1999 | Keoshkerian et al. |
| 5,910,549 A | 6/1999 | Matyjaszewski et al. |
| 5,945,491 A | 8/1999 | Matyjaszewski et al. |
| 5,998,537 A | 12/1999 | Good et al. |
| 6,031,017 A | 2/2000 | Waki et al. |
| 6,054,507 A | 4/2000 | Funaki et al. |
| 6,057,042 A | 5/2000 | Shimotsu |
| 6,083,524 A | 7/2000 | Sawhney et al. |
| 6,111,022 A | 8/2000 | Matyjaszewski et al. |
| 6,114,448 A | 9/2000 | Derbes |
| 6,114,482 A | 9/2000 | Senninger et al. |
| 6,121,371 A | 9/2000 | Matyjaszewski et al. |
| 6,124,411 A | 9/2000 | Matyjaszewski et al. |
| 6,126,919 A | 10/2000 | Stefely et al. |
| 6,143,848 A | 11/2000 | Lee et al. |
| 6,162,882 A * | 12/2000 | Matyjaszewski et al. ..... 526/111 |
| 6,191,197 B1 | 2/2001 | Wang et al. |
| 6,254,854 B1 | 7/2001 | Edwards et al. |
| 6,255,448 B1 | 7/2001 | Grimaldi et al. |
| 6,288,186 B1 | 9/2001 | Matyjaszewski et al. |
| 6,310,149 B1 | 10/2001 | Haddleton |
| 6,326,455 B2 | 12/2001 | Vassiliou et al. |
| 6,407,187 B1 | 6/2002 | Matyjaszewski et al. |
| 6,512,060 B1 | 1/2003 | Matyjaszewski et al. |
| 6,534,610 B1 | 3/2003 | Wilson, Jr. et al. |
| 6,538,091 B1 | 3/2003 | Matyjaszewski et al. |
| 6,541,580 B1 | 4/2003 | Matyjaszewski et al. |
| 6,565,763 B1 | 5/2003 | Asakawa et al. |
| 6,592,991 B1 | 7/2003 | Wiesner et al. |
| 6,624,262 B2 | 9/2003 | Matyjaszewski et al. |
| 6,624,263 B2 | 9/2003 | Matyjaszewski et al. |
| 6,627,314 B2 | 9/2003 | Matyjaszewski et al. |
| 6,670,299 B1 | 12/2003 | Marks et al. |
| 6,672,717 B2 | 1/2004 | Smith |
| 6,686,432 B2 | 2/2004 | Coca et al. |
| 6,692,914 B1 | 2/2004 | Klaerner et al. |
| 6,737,488 B2 | 5/2004 | Vanhoorne et al. |
| 6,759,491 B2 | 7/2004 | Matyjaszewski et al. |
| 6,784,247 B2 | 8/2004 | Rechenberg et al. |
| 6,784,248 B2 | 8/2004 | Coca et al. |
| 6,790,919 B2 | 9/2004 | Matyjaszewski et al. |
| 6,887,962 B2 | 5/2005 | Matyjaszewski et al. |
| 7,018,655 B2 | 3/2006 | Lele et al. |
| 7,019,082 B2 | 3/2006 | Matyjaszewski et al. |
| 7,037,992 B2 | 5/2006 | Wilson, Jr. et al. |
| 7,049,373 B2 | 5/2006 | Matyjaszewski et al. |
| 7,056,455 B2 | 6/2006 | Matyjaszewski et al. |
| 7,064,166 B2 | 6/2006 | Matyjaszewski et al. |
| 7,125,938 B2 | 10/2006 | Matyjaszewski et al. |
| 7,157,530 B2 | 1/2007 | Matyjaszewski et al. |
| 7,332,550 B2 | 2/2008 | Matyjaszewski et al. |
| 7,572,874 B2 | 8/2009 | Matyjaszewski et al. |
| 7,678,869 B2 | 3/2010 | Matyjaszewski et al. |
| 2002/0026005 A1 | 2/2002 | Munro |
| 2002/0128405 A1 * | 9/2002 | Matyjaszewski et al. .... 526/129 |
| 2003/0065389 A1 | 4/2003 | Petersen |
| 2003/0216528 A1 | 11/2003 | Matyjaszewski et al. |
| 2003/0236361 A1 | 12/2003 | Wilson et al. |
| 2004/0044152 A1 | 3/2004 | Matyjaszewski et al. |
| 2004/0171779 A1 | 9/2004 | Matyjaszewski et al. |
| 2004/0204556 A1 | 10/2004 | Matyjaszewski et al. |
| 2005/0090632 A1 | 4/2005 | Matyjaszewski et al. |
| 2006/0258826 A1 | 11/2006 | Matyjaszewski et al. |
| 2007/0106012 A1 | 5/2007 | Matyjaszewski et al. |
| 2007/0155926 A1 | 7/2007 | Matyjaszewski et al. |
| 2007/0244265 A1 | 10/2007 | Matyjaszewski et al. |
| 2009/0171024 A1 | 7/2009 | Jakubowski et al. |
| 2009/0176951 A1 | 7/2009 | Matyjaszewski et al. |
| 2009/0312505 A1 | 12/2009 | Matyjaszewski et al. |

FOREIGN PATENT DOCUMENTS

| | | | |
|---|---|---|---|
| CN | 1165828 | | 11/1997 |
| EP | 0265091 | A1 | 4/1988 |
| EP | 0341012 | A2 | 11/1989 |
| EP | 0434438 | A | 6/1991 |
| EP | 0457916 | A | 11/1991 |
| EP | 0789036 | A1 | 8/1997 |
| EP | 0816385 | A1 | 1/1998 |
| EP | 0824110 | A1 | 2/1998 |
| EP | 0824111 | A1 | 2/1998 |
| EP | 0826698 | A1 | 3/1998 |
| EP | 0832902 | A2 | 4/1998 |
| EP | 0870809 | A2 | 10/1998 |
| EP | 1555273 | A * | 7/2005 |
| EP | 1555273 | A1 * | 7/2005 |
| JP | 6322171 | A | 11/1994 |
| WO | WO 97/18247 | | 5/1997 |
| WO | WO 97/47661 | A1 | 12/1997 |
| WO | WO 98/01480 | | 1/1998 |
| WO | WO 98/06758 | A1 | 2/1998 |
| WO | WO 98/20050 | A2 | 5/1998 |
| WO | WO 99/28352 | | 6/1999 |
| WO | WO 00/47634 | A1 | 8/2000 |
| WO | WO 00/56795 | A1 | 9/2000 |
| WO | WO 00/75198 | | 12/2000 |
| WO | WO 03/097107 | A | 11/2003 |
| WO | WO 2004/041972 | A | 5/2004 |
| WO | WO 2007/025086 | A2 | 3/2007 |
| WO | WO 2007/059350 | A2 | 5/2007 |
| WO | WO 2008/057163 | A2 | 5/2008 |
| WO | WO 2008/148000 | A1 | 12/2008 |
| WO | WO 2009/023353 | A9 | 2/2009 |
| WO | WO 2009/111725 | A1 | 9/2009 |

OTHER PUBLICATIONS

Brittain et al., Makromol. Chem., Macromol. Symp. 67, pp. 373-386 (1993), "Termination Processes in Group Transfer Polymerization".

Bywater, Makromol. Chem., Macromol. Symp. 67, pp. 339-350 (1993), "Group Transfer Polymerization - A Critical Overview".

Carnahan et al., Synthesis and Characterization of Poly(glycerol—succinic acid) Dendrimers, Macromolecules, 2001, pp. 7648-7655, vol. 34(22).

Carter et al., Polyimide Nanofoams From Phase-Separated Block Copolymers, Electrochemical Society Proceedings, 1997, pp. 32-43, vol. 97(8), Electrochemical Society, Pennington, NJ, US.

Caruso, Nanoengineering of Particle Surfaces—Adv. Mater. 2001, 13, No. 1, Jan. 5, 11-22— Wiley—VCH Verlag GmbH.D-69469 Weinheim, 2001.
Catala, et al., Macromolecules, 1995, 28, 8441.
Chemical Abstracts, vol. 85, 1976, pp. 20.
Chen et al., Pryolytic Behavior and In-Situ Paramagnetism of Starlike C60(CH3)×(PAN)xcopolymers, European Polymer Journal, 1998, pp. 421-429, vol. 34(3-4), Elsevier Science Ltd., Oxford, GB.
Coca et al., Polymerization of Acrylates by Atom Transfer Radical Polymerization. Homopolymerization of 2-Hydroxyethyl Acrylate, Journal of Polymer Science, Part A: Polymer Chemistry, 1998, pp. 1417-1424, vol. 36.
Cohen, et al., Inorg. Chem. 13, 2434 (1974).
Collman et al., "Clicking" Functionality onto Electrode Surfaces, Langmuir, 2004, pp. 1051-1053, vol. 20.
Copolymerization, pp. 237-257., 1996.
Curran, et al., Comprehensive Organic Synthesis, eds., Pergamon: Oxford vol. 4, p. 715 (1991).
Curran, et al., J. Am. Chem. Soc. 116, 4279 (1994).
Curran, et al., J. Org. Chem., 54, 3140 (1989).
Curran, Synthesis, 489 (1988).
Darkow et al., "Synthesis, Photomodification and Characterization of Homo- and Copolymers with 2,5-bisaryltetrazolyl Pendant Groups", Reactive and Functional Polymers, 1997, pp. 195-207, vol. 32(2).
Davies, "Reactions of L-ascorbic acid with transition metal complexes," Polyhedron, 1992, 11, 285-321.
De Vries, et al., "The Effect of Reducing Monosaccharides on the Atom Transfer Radical Polymerization of Butyl Methacrylate," Macromol. Chem. Phys., 2001, 202, 1645-1648.
Demko et al., A Click Chemistry Approach to Tetrazoles by Huisgen 1,3-Dipolar Cycloaddition: Synthesis of 5-Acyltetrazoles from Azides and Acyl Cyanides, Angewandte Chemie, International Edition, 2004, pp. 2113-2116, vol. 41(12).
Dreezen, et al., "Nano-Structured Polymer Blends: Phase Structure, Crystallisation Behaviour and Semi-Crystalline Morphology of Phase Separated Binary Blends of Poly(ethyleneoxide) and Poly(ether sulphone)", Polymer, Elsevier Science Publishers BV., GB, vol. 41, No. 4, Feb. 2000, pp. 1395-1407.
Druliner, Macromolecules, 24, 6079 (1991).
Endo, et al., Macromolecules, 25, 5554 (1992).
Feng, "Synthesis and Free Radical Polymerization of 2-oxo-3-methylene-5-pheny1-1,4-dioxan." Chinese Journal of Polymer Science, 1993, 11, 2, pp. 153-157).
Fischer, Am. Chem. Soc. 1986, 108, 3925.
Fukuda, et al, Chem. Letters, 1996, 4, 293.
Fukuda, et al., Macromolecules, 1996, 29, 3050.
Gaynor, et al., Polym. Prep. (Am. Chem. Soc. Polym. Chem. Div.), 36(1), 467 (1995).
Georges, et al., Macromolecules 1993, 26, 2987.
Georges, et al., Macromolecules 1994, 27, 7228.
Georges, et al., Macromolecules, 1993, 26, 5316.
Gilbert & Williams, Reactivity Ratios of Conjugated Dienes Copolymerized in Emulsion at 5 °, J. Am. Chem. Soc. 74, (1952), 4114-4118.
Gnanou et al., "Effect of Phenol and Derivatives on Atom Transfer Radical Polymerization in the Presence of Air," Journal Polymer Science, Part A: Polymer Chemistry, 2004, 42, 351-359.
Granel et al., Controlled Radical Polymerization of Methacrylic Monomers in the Presence of Bis(ortho-chelated) Arylnickel (II) Complex and Different Activated Alkyl Halides, Macromolecules, 1996, pp. 8576-8582, vol. 29(27).
Grayson et al., Convergent Dendrons and Dendrimers: From Synthesis to Applications, Chemical Reviews, 2001, pp. 3819-3867, vol. 101(12).
Greszta et al., Gradient Copolymers of Styrene and Acrylonitrille Via Atom Transfer Radical Polymerization, Polymer Preprints, 1997, pp. 709-710, vol. 38(1).
Greszta, et al., Macromolecules, 27, 638 (1994).
Gromada et al., Simultaneous Reverse and Normal Initiation in Atom Transfer Radical Polymerization, Macromolecules, 2001, pp. 7664-7671, 34(22).

Hawker et al., The Convergent-Growth Approach to Dentritic Macromolecules, Advances in Dendritic Macromolecules, 1995, pp. 1-39, vol. 2.
Hawker, "Molecular Weight Control by a Living Free Radical Polymerization Process", Journal American Chem. Society, 1994, vol. 116, pp. 11185-11186.
Hawker, et al., Macromolecules, 1996, 29, 2686.
Hayes, et al., J. Am. Chem. Soc. 110, 5533 (1988).
Hedrick et al., (Dendrimer-like Star Block and Amphiphlic Copolymers by Combination of Ring Opening and Atom Transfer Radicat Polymerization). Macromolecules, 1998, 31, 8671-8705.
Helms et al., Dendronized Linear Polymers via "Click Chemistry", Journal of the American Chemical Society, 2004, pp. 15020-15021, vol. 126(46).
Heuts et al., "Atom transfer radical polymerization in the presence of a thiol: more evidence supporting radical intermediates," Macromol. Chem. Phys., 1999, 200, 1380-1385.
Hirao, et al., J. Synth. Org. Chem. (Japan), 52(3), 197 (1994).
Hirao, et al., Syn. Lett. 217 (1990).
Ihre et al., Fast and Convenient Divergent Synthesis of Aliphatic Ester Dendrimers by Anhydride Coupling, Journal of the American Chemical Society, 2001, pp. 5908-5917, vol. 123(25).
Iqbal, et al., Chem. Rev. 94, 519 (1994).
Jakubowski et al., "Activators Regenerated by Electron Transfer for Atom Transfer Radical Polymerization of Styrene," Macromolecules, 2006, 39, 39-45.
J-F Lutz et al,. Synthesis and Properties of Copolymers with Tailored Sequence Distribution by Controlled/Living Radical Polymerization, in ACS Symposium Series, Advances in Controlled/living Radical Polymerizations, American Chemical Society Division of Polymer Chemistry, 2003, Chapter 19, pp. 268-282, vol. 854.
Jo et al., Effects of Various Copper Salts and Additives on Polymerization of Acrylonitrile by Atom Transfer Radical Polymerization, Polymer Preprints, 1997, pp. 699-700, vol. 38(1).
Jo et al., Polyacrylonitrile with Low Polydispersities by Atom Transfer Radical Polymerization, Polymer Preprints, 1997, pp. 697-698, vol. 38(1).
Kamigata, et al., Novel Perfluoroalkylation of Alkenes with Perfluoroalkanesulphonyl Chlorides Catalysed by a Ruthenium (II) Complex, Journal of the Chemical Society, Perkins Transactions 1, 1991, pp. 627-633.
Kato, et al., Macromolecules, 28, 1721 (1995).
Kizhnyaev et al., Vinyltetrazoles: Synthesis and Properties, Russian Chemical Reviews, 2003, pp. 143-164, vol. 72(2).
Kolb et al., Click Chemistry: Diverse Chemical Function from a Few Good Reactions, Angewandte Chemie, International Edition, 2001, pp. 2004-2021, vol. 40(11).
Kowalewski et al., Advances in Nanostructored Carbons from Block Copolymers Prepared by Controlled Radical Polymerization Techniques, in Controlled Radical Polymerization: From Synthesis to Materials, American Chemical Society Division of Polymer Chemistry, 2005, Chapter 21, pp. 295-310, vol. 944.
Kwak et al., "ARGET ATRP of methyl methacrylate in the presence of nitrogen-based ligands as reducing agents," Polym. Int. 2009, 58, 242-247.
Leduc et al., also in-house computer search of same Asnwer 3 of 19 abstract, p. 41, J. Am. Chem. Soc. 1996, 118, 11111-11118.
Lee, et al., J. Chem. Soc. Trans., Faraday Soc. I, 74, 1726 (1978).
Lewis, et al., Copolymerization VII, Copolymerization of Some Further Monomer Pairs, Apr. 1948, pp. 1527-1529.
Li, et al., ASC Polym. Preprints, 1995, 36(1), 469.
Ligane, "Interpretation of the Polarographic Waves of Complex Metal Ions," Chem. Rev. 1941, 29, 1.
Majoral et al., Dendrimers Containing Heteroatoms (Si, P, B, Ge, or Bi), Chemical Reviews, 1999, pp. 845-880, vol. 99(3).
Makino et al., Controlled Atom Transfer Radical Polymerizations of Methyl Methacrylate Under Micellar Conditions, Polymer Preprints, 1988, pp. 288-289, vol. 39(1).
Maraval et al., "Lego" Chemistry for the Straightforward Synthesis of Dendrimer, Journal of Organic Chemistry, 2003, pp. 6043-6046, vol. 68(15).
Mardare, et al., ACS Polymer Preprints 1994, 35(1), 778.
Mardare, et al., Macromolecules, 27, 645 (1994).

Mardare, et al., Polym. Prep. (ACS), 36(1), 700-701 (1995).

Marestin et al., Nitroxide Mediated Living Radical Polymerization of Styrene in Emulsion, Macromolecules, 1998, pp. 4041-4044, vol. 31(12).

Matthews et al., Dendrimers-Branching out from Curiosites into New Technologies, Progress in Polymer Science, 1998, pp. 1-56, vol. 23.

Matyjaszewski ed., Controlled/"Living" Radical Polymerization. Progress in ATRP, NMP, and RAFT, in: ACS Symposium Ser., 2000, Chapter 19, Reverse Atom Transfer Radical Polymerization Using AIBN or BPO as Initiator, pp. 263-275.

Matyjaszewski et al., (Structural Control of Poly(Methyl Methacrylate)-g-poly(Lactic Acid) Graft Copolymers by Atom Transfer Radical Polymerization (ATRP). Macromolecules 2001, 34, 62436248.

Matyjaszewski et al., "Controlled/'Living' Radical Polymerization. Kinetics of the Homogeneous Atom Transfer Radical Polymerization of Styrene," J. Am. Chem. Soc., 1997, 119, 674-680.

Matyjaszewski et al., Atom Transfer Radical Polymerization, Chemical Reviews, 2001, pp. 2921-2990, vol. 101(9).

Matyjaszewski et al., Controlled/"Living" Radical Polymerization of Styrene and Methly Methacrylate Catalyzed by Iron Complexes1, Macromolecules, 1997, pp. 8161-8164, vol. 30(26).

Matyjaszewski et al., Controlled/Living Radical Polymerization: State of the Art in 2002, in ACS Symposium Series, Advances in Controlled/living Radical Polymerizations, American Chemical Society Division of Polymer Chemistry, 2003, Chapter 1, pp. 2-9, vol. 854.

Matyjaszewski et al., Controlled/Living Radical Polymerization: State of the Art in 2005, in Controlled Radical Polymerization: From Synthesis to Materials, American Chemical Society Division of Polymer Chemistry, 2005, Chapter 1, pp. 2-12, vol. 944.

Matyjaszewski et al., Zerovalent Metals in Controlled/"Living" Radical Polymerization, Macromolecules, 1997, pp. 7348-7350, vol. 30(23).

Matyjaszewski, "The Importance of Exchange Reactions in the Controlled/Living Radical Polymerization in the Presence of Alkoxyamines and Transition Metals", Macromolecule Symposium, 1996, vol. 111, pp. 47-61.

Matyjaszewski, "Radical Nature of Cu-Catalyzed Controlled Radical Polymerizations (Atom Transfer Radical Polymerization)," Macromolecules, 1998, 31, 4710-4717.

Matyjaszewski, Controlled Radical Polymerization, American Chemical Society Division of Polymer Chemistry, 1998, Acs Symposium Series, Ch. 1, pp. 2-30. vol. 685.

McCarthy et al., Grafting Chromatographic Stationary Phase Substrates by Atom Transfer Radical Polymerization, in Controlled Radical Polymerization: From Synthesis to Materials, American Chemical Society Division of Polymer Chemistry, 2005, Chapter 18, pp. 252-268, vol. 944.

Mitani, et al., J. Am Chem. Soc. 105, 6719 (1983).

Nagashima, J. Org. Chem. 57, 1682 (1992).

Nagashima, J. Org. Chem. 58, 464 (1993).

Nishikawa et al., Evidence for Living Radical Polymerization of Methyl Methacrylate with Ruthenium Complex: Effects of Protic and Radical Compounds and Reinitiation from the Recovered Polymers, Macromolecules, 1997, pp. 2244-2248, vol. 30(8).

Odell, et al., Macromolecules, 1995, 28, 8453.

Odian, Principles of Polymerization, Third Edition, John Wiley & Sons, p. 205-233 (1991).

Orochov et al., Redox-Transfer, Part VI, Determination of Hammet's P-Constant for the Oxidation of Cuprous Chloride by Aromatic Sulphonyl Chlorides, Journal of the Chemical Society (B), (1969), pp. 255-259.

Orochov, et al., J. Chem. Soc., Perkin II, 1000 (1973).

Orr, Thermochemical Aspects of Butadiene-Styrene Copolymerization, 1960, pp. 74-82.

Otsu, et al., Chem. Express 5(10), 801 (1990).

Otsu, et al., New Initiator Systems for Radical Polymerization of Vinyl Monomers, Polymer Letters, 1967, pp. 697-701, vol. 5.

Otsu, et al., Synthesis, Reactivity, and Role of —Vinylbenzyl N,N-Diethyldithiocarbamate as a Monomer-Iniferter in Radical Polymerization, Macromolecules, 1986, pp. 287-290, vol. 19(2).

Pakuka et al., Polymers, Particles, and Surfaces with Hairy Coatings: Synthesis, Structure, Dynamics, and Resulting Properties, in ACS Symposium Series, Advances in Controlled/living Radical Polymerizations, American Chemical Society Division of Polymer Chemistry, 2003, Chapter 26, pp. 366-382, vol. 854.

Part 2, Controlled "Living" Emulsion Polymerization of Methyl Methacrylate by Atom Transfer Radical Polymerization, pp. 90-134. , 1998.

Patten et al., Atom Transfer Radical Polymerization and the Synthesis of Polymeric Materials, Advanced Materials, 1998, pp. 901-915, vol. 10(12).

Patten et al., Polymers with very Low Polydispersities from Atom Transfer Radical Polymerization, 1996, Science, pp. 866-868, vol. 272.

PCT International Search Report for International Application No. PCT/US05/07264 filed 12 Jun. 2005, mailed Jul. 5, 2005.

Percec et al., "Living" Radical Polymerization of Styrene Initiated by Arenesulfonyl Chlorides and $Cu^1l(bpy)_nCl$, Macromolecules, 1995, pp. 7970-7972, vol. 28(23).

Percec et al., Metal-Catalyzed "Living" Radical Polymerization of Styrene Initiated with Arenesulfonyl Chlorides. From Heterogeneous to Homogeneous Catalyses, Macromolecules, 1996, pp. 3665-3668, vol. 29(10).

Percec et al., Self-Regulated Phase Transfer of $Cu_2O$/bpy, Cu(0)/bpy, and $Cu_2O$(Cu(0)/bpy Catalyzed "Living" Radical Polymerization Initiated with Sulfonyl Chlorides, Macromolecules, 1998, pp. 4053-4056, vol. 31(12).

Pintauer et al., Toward Structural and Mechanistic Understanding of Transition Metal-Catalyzed Atom Transfer Radical Processes, in ACS Symposium Series, Advances in Controlled/living Radical Polymerizations, American Chemical Society Division of Polymer Chemistry, 2003, Chapter 10, pp. 130-147, vol. 854.

Punna et al., Click Chemistry in Polymer Synthesis, Polymer Preprints, 2004, pp. 778-779, vol. 45(1).

Puts, et al., Macromolecules, 1996, 29, 3323.

Qiu et al., Cyclic Voltammetric Studies of Copper Complexes Catalyzing Atom Transfer Radical Polymerization, Macromolecular Chemistry and Physics, 2000, pp. 1625-1631, vol. 201(14).

Queffelec et al., Optimization of Atom Transfer Radical Polymerization Using Cu(I)/Tris(2-(dimethylamino)ethyl)amine as a Catalyst, Macromolecules, 2000, pp. 8629-8639, vol. 33.

Quirk et al., Makromol. Chem., Macromol. Symp. 67, pp. 351-363 (1993), "Mechanistic Aspects of Group Transfer Polymerization".

Richard et al., Acrylate-Based Block Copolymers Prepared by Atom Transfer Radical Polymerization as Matrices for Drug Delivery Applications, in Controlled Radical Polymerization: From Synthesis to Materials, American Chemical Society Division of Polymer Chemistry, 2005, Chapter 17, pp. 234-251, vol. 944.

S.A.F. Bon et al., Controlled Radical Polymerization in Emulsion, Macromolecules, 1997, pp. 324326, vol. 30(2).

Samuni et al., "On the cytotoxicity of vitamin C and metal ions," European Journal of Biochemistry, 1983, 137. 119-124.

Schubert et al., Design of Effective Systems for Controlled Radical Polymerization of Styrene: Application of 4,4'-Dimethyl and 5,5'-Dimethyl 2,2'-Bipyridine Copper(ii) Complexes, Macromolecular Rapid Communication, 1999, pp. 351-355, vol. 20.

Schulz & Milkovich, Relative Reactivities and Graft Distributions of Polystyrene Macromers in Vinyl Chloride Copolymerization, Polymer International, 1994, pp. 141-149, Great Britain.

Seijas, et al., Tetrahedron, 48(9), 1637 (1992).

Shen, et al., Supported Atom Transfer Radical Polymerization of Methyl Methacrylate Mediated by CuBr-Tetraethyldiethylenetriamine Grafted onto Silica Gel - Journal of Polymer Science: Part A: Polymer Chemistry, vol. 39, 1051-1059 (2001); John Wiley & Sons, Inc.

Stille et al., Synthesis and Copolymerization of Styryl-Substituted Tetrazoles. Thermal Cross-Linking of Copolymers Containing Dipolarophiles and the Tetrazoles as Nitrile Imine Dipole Precursors, Macromolecules, 1972, pp. 377-384, vol. 5(4).

Sumerlin et al., Click Functionalization of Well-Defined Copolymers Prepared by Atom Transfer Radical Polymerization, in Controlled Radical Polymerization: From Synthesis to Materials, American Chemical Society Division of Polymer Chemistry, 2005, Chapter 11, pp. 140-152, vol. 944.

Takeichi et al., Preparation of Porous Carbon Films by the Pyrolysis of Poly(Urethane-imide) Films and Their Pore Characteristics, Carbon, 2001, pp. 257-265, vol. 39(2).

Tsarevesky et al., Factors Determining the Performance of Copper-Based Atom Transfer Radical Polymerization Catalysts and Criteria for Rational Catalyst Selection, in Controlled Radical Polymerization: From Synthesis to Materials, American Chemical Society Division of Polymer Chemistry, 2005, Chapter 5, pp. 56-70, vol. 944.

Tsarevsky et al., Well-Defined (Co)polymers with 5-Vinyltetrazole Units via Combination of Atom Transfer Radical (Co)polymerization of Acrylonitrile and "Click Chemistry"-Type Postpolymerization Modification, Macromolecules, 2004, pp. 9308-9313, vol. 37(25).

Udding, et al., J. Org. Chem. 59, 1993 (1994).

Van Gaal et al., "Trends in Redox Potentials of Transition Metal Complexes," Coord. Chem. Rev. 1982, 47, 41.

Veregin, et al., Macromolecules, 1996, 29, 2746.

Veregin, et al., Macromolecules, 1996, 29, 4161.

Vicek, "Ligand Based Redox Series," Coord. Chem. Rev. 1982, 43, 39.

Von Werne, et al., Preparation of Structurally Well-Defined Polymer—Nanoparticle Hybrids with Controlled/living Radical Polymerizations - J. Am. Chem. Soc. 1999, 121, 7409-7410.

Wang et al., "Living"/Controlled Radical Polymerization, Transition-Metal-Catalyzed Atom Transfer Radical Polymerization in the Presence of a Conventional Radical Initiator, Macromolecules, 1995, pp. 7572-7573, vol. 28.

Wang et al., Controlled/"Living" Radical Polymerization. Atom Transfer Radical Polymerization in the Presence of Transition-Metal Complexes, Journal of the American Chemical Society, 1995, pp. 5614-5615, vol. 117(20).

Wang et al., Controlled/"Living" Radical Polymerization. Halogen Atom Transfer Radical Polymerization Promoted by a Cu(I)/Cu(II) Redox Process, Macromolecules, 1995, pp. 7901-7910, vol. 28(23).

Wang et al., ESR Study and Radical Observation in Transition Metal-Mediated Polymerization: Unified View of Atom Transfer Radical Polymerization Mechanism, in ACS Symposium Series, Advances in Controlled/living Radical Polymerizations, American Chemical Society Division of Polymer Chemistry, 2003, Chapter 12, pp. 161-179, vol. 854.

Wang, et al., Polym. Prep. (Am. Chem. Soc. Polym. Chem. Div.), 36(1), 465 (1995).

Wayland, et al., Am. Chem. Soc., 116, 7943 (1994).

Webster, Living Polymerization Methods, Science, 1991, pp. 887-893, vol. 25.

Webster, Makromol. Chem., Macromol. Symp. 67, pp. 365-371 (1993), "Mechanism of GTP: Can all of the Available Data be Accommodated?".

Wei et al., Atom Transfer Radical Polymerization of Styrene in the Presence of Iron Complexes, Polymer Preprints, 1997, pp. 231, vol. 38(2).

Wu et al, Efficiency and Fidelity in a Click-Chemistry Route to Triazole Dendrimers by the Copper(I)-Catalyzed Ligation of Azides and Alkynes, Angewandte Chemie, International Edition, 2004, pp. 3928-3932, vol. 43(30).

Xia et al., Controlled/"Living" Radical Polymerization. Homogenous Reverse Atom Transfer Radical Polymerization Using AIBN as the Initiator, Macromolecules, 1997, pp. 7692-7696, vol. 30.

U.S. Appl. No. 09/534,827 filed Mar. 23, 2000.

\* cited by examiner (Height scale = 40.0 nm)           (Height scale = 40.0 nm)

US 7,893,174 B2

ATOM TRANSFER RADICAL POLYMERIZATION PROCESS

CROSS REFERENCE TO RELATED APPLICATIONS

The present application is a U.S. nationalization under 35 U.S.C. §371 of and claims priority under 35 U.S.C. §119 to PCT Application No. PCT/US05/07265, filed Mar. 7, 2005, which claims priority to U.S. Provisional Application No. 60/550,391, filed Mar. 5, 2004; the disclosure of each of which are incorporated by reference herein.

FIELD OF THE INVENTION

The present invention is directed towards a catalytic controlled polymerization process. More directly, embodiments of the present invention are directed toward an atom transfer radical polymerization ("ATRP") comprising low catalyst concentrations. Embodiments of the present invention comprise reacting a reducing agent with at least one of catalyst in an oxidized state and a compound comprising a radically transferable atom or group to initiate and/or maintain catalytic activity throughout the polymerization process.

BACKGROUND

ATRP is considered to be one of the most successful controlled/"living" radical processes (CRP) and has been thoroughly described in a series of co-assigned U.S. patents and applications, such as U.S. Pat. Nos. 5,763,548; 5,807,937; 5,789,487; 5,945,491; 6,111,022; 6,121,371; 6,124,411; 6,162,882; 6,407,187; 6,512,060; 6,538,091; 6,541,580; 6,624,262; 6,624,263; 6,627,314; 6,759,491; and U.S. patent application Ser. Nos. 09/534,827; 09/972,056; 10/034,908; 10/269,556; 10/289,545; 10/638,584; 10/860,807; 10/684,137; 10/781,061 and 10/992,249 all of which are herein incorporated by reference. ATRP has also been discussed in numerous publications with Matyjaszewski as co-author and reviewed in several book chapters. [*ACS Symp. Ser.*, 1998, 685; *ACS Symp. Ser.*, 2000; 768; *Chem. Rev.* 2001, 101, 2921-2990; *ACS Symp. Ser.*, 2003; 854.] Within these publications, similar polymerizations may be referred to by different names, such as transition metal mediated polymerization or atom transfer polymerization, but the processes are similar and referred to herein as "ATRP".

A controlled radical polymerization ("CRP") process is a process performed under controlled polymerization conditions with chain growth proceeding via a radical mechanism, such as, but not limited to, ATRP stable free radical polymerization, ("SFRP") most frequently, nitroxide mediated polymerization, ("NMP") reversible addition-fragmentation transfer, ("RAFT") or degenerative transfer systems. A feature of CRP is the creation of an equilibrium between active polymer chain and dormant polymer chain. In certain embodiments, it may be preferable if a majority of polymer chains are present as dormant polymer chains. The equilibrium between the active and dormant chains typically provides for more controlled chain growth relative to conventional radical polymerization. CRP processes are capable of producing mere uniform polymers; however, the active propagating chain may react in termination reactions resulting in higher polydispersities. Therefore, typically, to minimize termination reactions, the instantaneous concentration of active propagating species is maintained at a low concentration.

In CRP, the ability to maintain or adjust the equilibrium between active and dormant species and quantitative initiation early in the polymerization process allows, under appropriate conditions, the capability for synthesis of polymers with special architecture and functionality. In addition, if desired, the overall rate of monomer conversion may occur at rates equivalent to uncontrolled polymerization. Controlled polymerization process may be used to prepare polymers having a degree of polymerization that may be approximated from the ratio of the amount of consumed monomer to the initiator, a polydispersity close to a Poisson distribution and functionalized chain ends.

As used herein, "polymer" refers to a macromolecule formed by the chemical union of monomers, typically five or more monomers. The term polymer includes homopolymer and copolymer block copolymers, and polymers of any topology including star polymers, block copolymers, gradient copolymers, periodic copolymers, telechelic polymers, bottle-brush copolymers, random copolymers, statistical copolymers, alternating copolymers, graft polymers, branched or hyperbranched polymers, comb polymers, such polymers tethered from particle surfaces, as well as other polymer structures.

ATRP is the most often used CRP technique with a significant commercial potential for many specialty materials including coatings, sealants, adhesives, dispersants but also materials for health and beauty products, electronics and biomedical applications. The most frequently used ATRP is based on a simple reversible halogen atom transfer catalyzed by redox active transition metal compounds.

Certain advantages of an ATRP are as follows, many commercially available initiators may be used and various macroinitiators, including wafers, colloids, glass, paper, and bioactive molecules including proteins, DNA, carbohydrates and many commercial polymers may be simply synthesized; many polymers produced by ATRP allow facile functionalization or transformation of the end groups by replacing terminal halogens with azides, amines, phosphines and other functionalities via nucleophilic substitution, radical addition or other radical combination reactions; an abundance of polymerizable monomers are available; allows production of macromolecules with complex topology such as stars, combs and dendrimers, coupled with the ability to control composition (block, gradient, periodic copolymers) and even control of polymer tacticity; and allows a simple reaction which may be carried out in bulk, or in the presence of organic solvents or in water under homogeneous or heterogeneous conditions, in ionic liquids, and $CO_2$.

However, in certain applications, concentration of the transition metal catalyst in an ATRP polymerization medium may have to be reduced in the final product. As such, there have been several methods developed to remove or reduce the amount of transition metals in the process, but these add additional cost to the preparation of polymers by ATRP. The methods used to reduce the concentration of catalysts in the final product include development of more active catalysts, for example CuBr complexed by $Me_6TREN$ is ~10,000 more active than catalysts complexed by bipyridine ligands; catalysts have been immobilized on solids; hybrid catalyst systems comprising both immobilized and small concentrations of soluble catalysts (~10-20 ppm). There are also several methods developed to recover and regenerate catalysts, including separating the catalyst by filtration, precipitation or extraction. For example, CuBr/PMDETA complex may be oxidized to Cu(II) species by expose to air and quantitatively extracted from toluene to water, resulting, in some cases, with as little as <1 ppm of catalyst remaining in the polymer. There is therefore a need to reduce the concentration of catalyst while maintaining polymer reaction rate and retaining control over MW and PDI and there exists a need for more efficient methods to reduce the catalyst concentration in polymers produced by ATRP.

Three different ATRP initiation methods, or activation reactions, have been disclosed: normal ATRP initiation, "reverse" ATRP initiation, and simultaneous normal and reverse initiation (SR&NI) ATRP. See U.S. Pat. Nos. 5,763, 548 and 6,759,491.

Typically, ATRP processes comprise a transition metal complex. The transition metal complex may participate in a repetitive redox reaction homolytically removing a radically transferable atom or group from an initiator molecule or dormant polymer chain, $P_n$—, to form the active propagating species, $P^*_n$, and then deactivating active propagating species, $P^*_n$, by donating back a transferable atom or group. (Scheme 1)

Scheme 1. General mechanism for the ATRP process

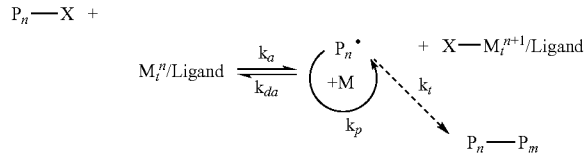

The transition metal catalyst for this repetitive addition process must be present, at least partially, in the lower oxidation state, or activator state, $M_t^n$/Ligand. However, typically, the lower oxidation state of the transition metal catalyst is readily oxidized. Therefore, there are inherent difficulties in handling the catalyst associated with large scale bulk and solution based polymerization processes and in emulsion and mini-emulsion processes where trace levels of oxygen should be removed. The typical ratio of activator ($M_t^n$/Ligand) to deactivator (X-$M_t^{n+1}$/Ligand) varies with the specific monomers and the polarity of the reaction medium, as well as other factors, between 99 parts activator to 1 part deactivator to 5 parts activator to 95 parts deactivator.

Any transition metal complex capable of maintaining the dynamic equilibrium and participate in a redox reaction comprising the transferable atom or group with the polymer chain may be used as the catalyst in ATRP, and many examples are discussed in the cited art. A suitable equilibrium can be formed after consideration of oxidation states, complex formation with suitable ligands and redox potential of the resulting complex to provide a catalyst for the desired (co)polymerization of a wide range of comonomers. A wide variety of ligands have been developed to prepare transition metal catalyst complexes that display differing solubility, stability and activity.

Normal ATRP Initiation

Typically, ATRP processes are initiated by the redox reaction between an initiator comprising one or more transferable atom(s) or group(s) and a catalyst complex comprising a transition metal salt in a lower oxidation state complexed with a ligand, solvent molecule or monomer. The transferable atom or group is an atom or group that may be homolytically cleaved from the initiator by the catalyst, thereby oxidizing the catalyst to a higher oxidation state and forming an active propagating species capable of monomer addition. After initiation, an ATRP process, generally, is based on a dynamic equilibrium between a transition metal complex reversibly activating and deactivating the polymer chain via a similar homolytic atom or group transfer via a redox reaction. (Scheme 1) During the dynamic equilibrium the transition metal complex cycles between a lower oxidation state and a higher oxidation state.

The advantages of normal initiation of ATRP include that the added initiator molecule includes the transferable atom or group needed to initiate and subsequently repeatedly terminate each polymer chain, therefore no additional transferable atoms or groups are required to be added by other components of the polymerization process. Therefore, adding sufficient transition metal complex in the lower oxidation state provides suitable catalytic activity to the process. By "suitable catalytic activity" it is meant that the polymerization comprises an amount of catalyst needed to drive the reaction to a desired degree of polymerization with appropriate heat control to produce a polymer with the desired properties. Typically, an ATRP process requires a sufficient catalyst amount to compensate for any loss of catalytic activity due to termination reactions.

ATRP catalysts may vary in catalytic activity based upon the properties of the transition metal, the ligands and the temperature and polarity of the reaction medium, as well as other factors. Generally, more active catalysts are less oxidatively stable in their lower oxidation states. Due to this oxidative instability, active catalysts in their lower oxidation states are more difficult to handle; for instance, trace levels of oxygen or other oxidants should be to be removed from the polymerization medium prior to addition of the active catalyst in a lower oxidation state to prevent the catalyst from being converted to the higher oxidation state deactivator.

Reverse ATRP Initiation

In a reverse ATRP, a more stable catalyst complex in the higher oxidation state may be added to the polymerization medium. Generally, the higher oxidation state of a transition metal complex is a lower cost and more oxidatively stable state of the complex and may often be stored in the presence of air.

In reverse ATRP, as opposed to normal ATRP, the transferable atom or group begins as a counterion or ligand on the transition metal salt or transition metal complex in the higher oxidation state. A "reverse ATRP" the reaction is then initiated by generation of a radical by known processes, such as by decomposition of a standard free radical initiator which either directly participates in a redox reaction with the higher oxidation state transition metal forming the transition metal complex in the lower oxidation state, and a molecule with a transferable atom suitable for initiation of an ATRP reaction, or it may initiate a polymerization that is quickly deactivated by the transition metal complex in the higher oxidation state. Typically, reverse ATRP processes require a high catalyst concentration in order to introduce the appropriate concentration of radically transferable atoms or groups to the reaction to both maintain a controlled polymerization and attain polymers of the desired molecular weight at high conversion of monomer to polymer.

In addition, a typical reverse ATRP process must be initiated in a narrow temperature range to ensure efficient thermal decomposition of the standard free radical initiator to reduce the catalyst complex and produce polymers with low polydispersities. Further, since the first radicals are provided by normal radical initiators, it is not as easy to prepare homotelechelic polymers, block, or graft copolymers of more complex architecture than with normal initiation.

SR&NI ATRP

A SR&NI polymerization process comprises a dual initiation system for atom transfer radical polymerization. The initiation system comprises aspects of both standard free radical initiators and initiators comprising a transferable atom or group. The dual initiation system may be used to prepare any type of polymer that may be prepared by ATRP, such as, but not limited to, homopolymers, random, statistical, gradient, alternating copolymers, block, graft, branched or hyperbranched, star, comb, and bottle brush as well as other polymer structures.

However, polymerization in an SR&NI polymerization proceeds from two different initiators. In certain embodiments, this may be desirable. For example, if one initiator is a macroinitiator used to form a block copolymer in the "normal" initiated ATRP, but the conventional radical initiator added to form the active catalyst complex in a "reverse ATRP" will form a homopolymer that may be considered an undesirable byproduct for certain applications.

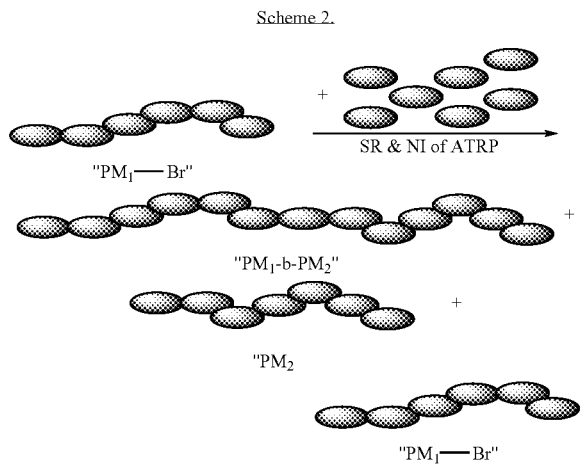

Scheme 2.

Thus, there is a need for an improved ATRP process that avoids such limitations.

SUMMARY

Embodiments of the polymerization process of the present invention are directed to a polymerizing free radically polymerizable monomers in the presence of a polymerization medium initially comprising at least one transition metal catalyst and an atom transfer radical polymerization initiator. The polymerization medium may additionally comprise a reducing agent. The reducing agent may be added initially or during the polymerization process in a continuous or intermittent manner. The polymerization process may further comprises reacting the reducing agent with at least one of the transition metal catalyst in an oxidized state and a compound comprising a radically transferable atom or group to form a compound that does not participate significantly in control of the polymerization process.

In embodiments of the present invention, the reducing agent is used to reduce transition metal complex in the oxidized state to, for example, compensate for termination reactions. Thus, maintain the rate of polymerization and allow the overall concentration of transition metal in the polymerization medium to be reduced in embodiments of the process of the present invention, the molar ratio of the transition metal catalyst to the atom transfer radical polymerization initiator may be less than 0.25, in certain embodiments the molar ratio of the transition metal catalyst to the atom transfer radical polymerization initiator may be less than 0.1, and preferably certain embodiments may comprise a molar ratio of the transition metal catalyst to the atom transfer radical polymerization initiator that is less than 0.05 or even 0.02.

Embodiments of the polymerization process of present invention include bulk polymerization processes, polymerization processes performed in a solvent, emulsion polymerization processes, mini-emulsion polymerization processes, microemulsion processes, reverse emulsion polymerization processes, and suspension polymerization processes. In such processes, the emulsion polymerization processes may further comprise at least one of a suspending medium, a surfactant, and a monomer phase comprising at least a portion of the radically polymerizable monomers.

It must be noted that, as used in this specification and the appended claims, the singular forms "a," "and," and "the" include plural referents unless the context clearly dictates otherwise. Thus, for example, reference to "a polymer" may include more than one polymer.

Unless otherwise indicated, all numbers expressing quantities of ingredients, time, temperatures, and so forth used in the present specification and claims are to be understood as being modified in all instances by the term "about." Accordingly, unless indicated to the contrary, the numerical parameters set forth in the following specification and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, may inherently contain certain errors necessarily resulting from the standard deviation found in their respective testing measurements.

It is to be understood that this invention is not limited to specific compositions, components or process steps disclosed herein, as such may vary. It is also to be understood that the terminology used herein is for the purpose of describing particular embodiments only, and is not intended to be limiting.

BRIEF DESCRIPTION OF THE FIGURES

The features and advantages of the present invention may be better understood by reference to the accompanying figures, in which.

DESCRIPTION OF EMBODIMENTS OF THE INVENTION

Figure 1:
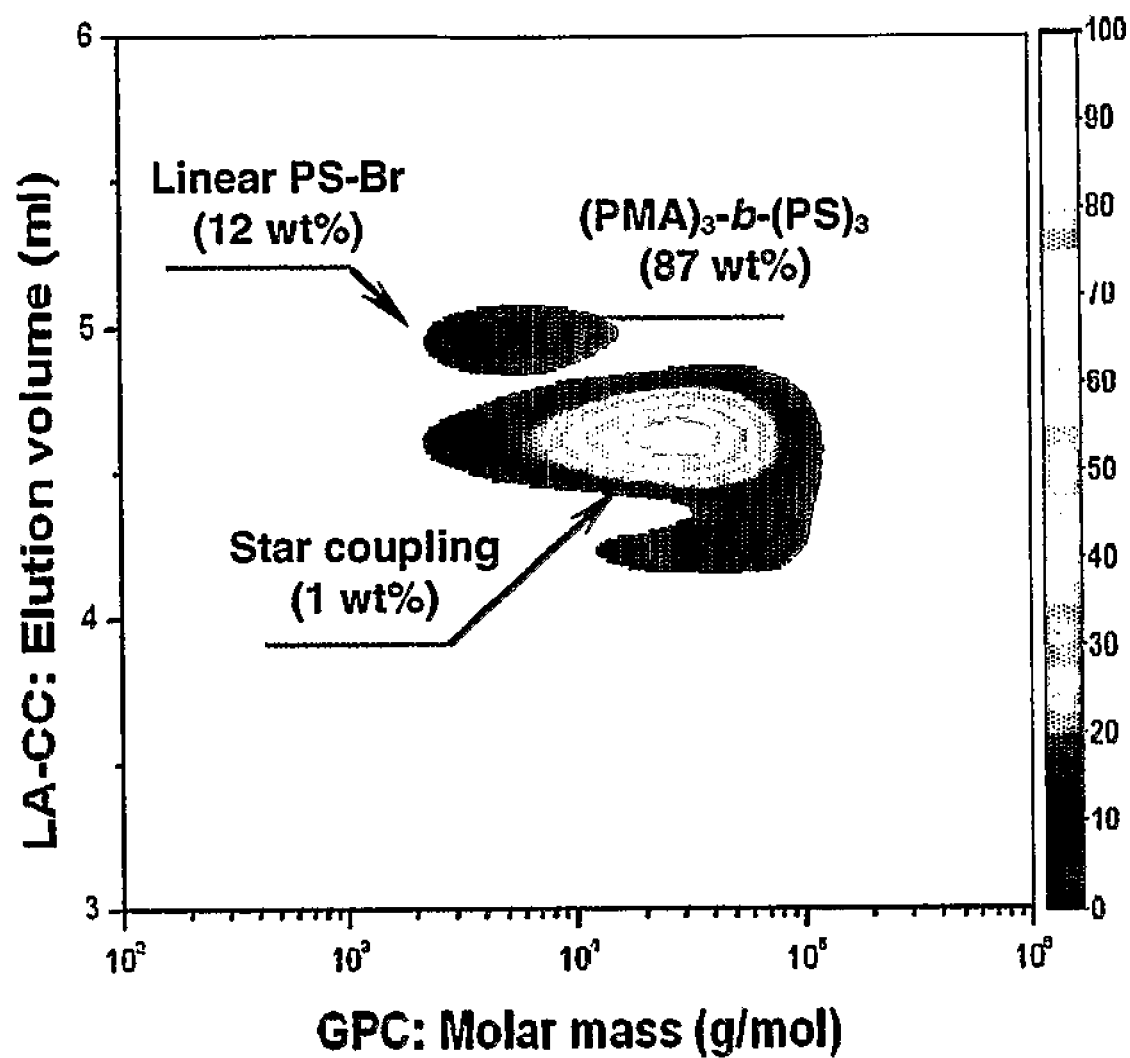
FIG. 1 is a 2D chromatographic characterization of a tri-arm block copolymer comprising blocks of methyl acrylate and styrene produced in a bulk ATRP initiated using SR&NI with AIBN as the conventional radical initiator and poly (methyl acrylate) macroinitiator as the normal ATRP initiator.

Embodiments of the polymerization process of the present invention are directed to a polymerizing free radically polymerizable monomers in the presence of a polymerization medium initially comprising at least one transition metal catalyst, an atom transfer radical polymerization initiator. The polymerization medium may additionally comprise a reducing agent. The polymerization process may further comprise reacting the reducing agent with at least one of the transition metal catalyst in an oxidized state and a compound comprising a radically transferable atom or group to form a compound that does not participate significantly in control of the polymerization process. In certain embodiments, the compound that does not participate significantly in control of the polymerization process does not comprise a radically transferable atom or group that can participate in a controlled polymerization process.

In the present invention, the reducing agent may reduce the transition metal complex in an oxidized state to form a transition metal catalyst in the activator state in a substantially non-reversible reaction. An embodiment wherein the reduction of the transition metal initiates the polymerization is referred to as "Activator Generated by Electron Transfer" ATRP ("AGET" or "AGET ATRP"). AGET ATRP may comprise a means for an essentially non-radical forming activation of a stable catalyst precursor. The transition metal catalyst in the activator state may then conduct a reversible redox reaction with a compound having a radically transferable atom or group to form the propagating active polymer chain. The reducing agent may also react directly with the compound having a radically transferable atom or group to form the propagating active polymer chain in a substantially non-reversible electron transfer reaction. In this case, a transition metal complex in the higher oxidation state may react with the propagating active polymer chain to form a dormant polymer chain by a reversible redox reaction. A reducing agent may additionally be added at the end of an ATRP process to activate a transition metal catalyst complex in the higher oxidation state to allow post-polymerizations reactions.

In an atom transfer radical polymerization process, the rate of polymerization is proportional to the molar ratio of transition metal catalyst in the activator state to the transition metal catalyst in the deactivator state. However, due to termination reactions between active propagating polymer chains, there may be an increase in the amount of transition metal complex in the deactivator state during a polymerization process. Typically, in ATRP processes, excess transition metal catalyst in the activator state would be added to compensate for the increase in deactivator state. However, in the process of the present invention the reducing agent may be used to react with the transition metal catalyst in the deactivator state, thereby reducing the amount of catalyst in the deactivator state and retarding the decrease in the rate of polymerization. Therefore, the reducing agent can be used to maintain the ratio of activator to deactivator and, hence, reduce the overall concentration of the transition metal catalyst.

Embodiments of an ATRP of the present invention comprise a reducing agent for reduction of the transition metal complex in an oxidized state but after the reducing reaction the reducing agent does not form an active propagating species, effective ATRP catalyst or an ATRP initiator. Reducing agents that conduct the reduction reaction essentially without formation of radicals capable of initiating new chains may be used. Stanous 2-ethylhexanoate, $(Sn(2EH)_2)$ employed for the AROP, is one of several possible reducing agents that may be used in embodiments of the present invention. $Sn(2EH)_2$ can reduce $Cu^{(II)}$ to $Cu^{(I)}$. (Scheme 3)

Scheme 3. Reduction of $Cu^{(II)}$ to $Cu^{(I)}$ by tin 2-ethlehexanoate.

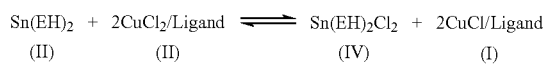

In such embodiments, it may be desirable for each reducing agent to have different rates of reduction for the capacity of the polymerization medium. Thus, embodiments of the present invention, the reducing agent is used to reduce transition metal complex in the oxidized state to, for example, compensate for termination reactions. An embodiment wherein the reduction of the transition metal is used to regenerate the catalyst activator from catalyst deactivator during the polymerization is referred to as "Activator ReGenerated by Electron Transfer" ATRP ("ARGET" or "ARGET ATRP"). Therefore, the overall concentration of transition metal in the polymerization medium may be reduced, the molar ratio of the transition metal catalyst to the atom transfer radical polymerization initiator in embodiments of the present invention may be less than 0.25, in certain embodiments the molar ratio of the transition metal catalyst to the atom transfer radical polymerization initiator may be less than 0.1, and preferably, certain embodiments may comprise a molar ratio of the transition metal catalyst to the atom transfer radical polymerization initiator that is less than 0.05 or even less than 0.01.

Alternatively, embodiments of polymerization processes of the present invention may comprise a concentration of transition metal catalyst in the polymerization medium of less than 1000 ppm, or even less than 100 ppm, and in certain embodiments, the concentration of transition metal catalyst in the polymerization medium may be less than 50 ppm. The addition of a base or excess ligand into the polymerization medium may assist in the reduction reaction.

Other reducing agents have also been employed to reduce the concentration of the deactivator, or persistent radical, in an ATRP reaction thereby increasing the rate of reaction. An ATRP process may slow down as the concentration of activator decreases and will stop if all activator is converted to deactivator by termination reaction. Sugars have been known as reducing agents for cupric salts. See Cramer, W. *Proc. Chem. Soc.* 1914, 30, 293. Various reducing monosaccharides have an effect on the rate of an ATRP of butyl methacrylate. See de Vries, A.; Klumperman, B.; de Wet-Roos, D.; Sanderson, R. D. *Macromol. Chem. Phys.* 2001, 202, 1645-1648, hereby incorporated by reference in its entirety. The addition of reducing sugars was shown to affect the rate of polymerization in an ATRP, with a 100% increase in the rate of polymerization in some cases. A possible explanation for these observations is the ability of the reducing sugars to reduce part of the $Cu^{(II)}$ species, which deactivate the growing radicals, to $Cu^{(I)}$, thereby inducing a shift in the equilibrium between active and dormant chains in the direction of the former with a resulting increase in the rate of reaction. Klumpermann et. al., did not suggest that this reaction could be used to reduce all of the deactivator in the reaction. The system was completely controlled and that these organic reducing agents have little effect on the molecular weight, molecular weight distribution of the formed poly(butyl methacrylate), and that the polymers had polydispersity indexes that remained well below 1.2. Such sugars do not significantly interact with the catalyst, cannot form side products (complexes) with it and the reducing activity is at least partially decreased by the low solubility of the sugars in the reaction medium. Therefore, these sugars were successful at increasing the propagation rate while not totally reducing the catalyst, thus, retaining control over the reaction.

U.S. Pat. No. 6,310,149 describes an increase in polymerization rate noted when phenols are added to an ATRP process. Phenols may act to reduce $Cu^{(II)}$ species and initiate reverse ATRP. See Gnanou et al., *Journal of Polymer Science, Part A: Polymer Chemistry* 2004, 42, 351-359, hereby incorporated by reference in its entirety. However, when a macroinitiator was used as the ATRP initiator in the reverse ATRP activated by phenol, the polymer displayed a bimodal molecular weight distribution and it was concluded there may have been side reactions resulting in the formation of a low molecular weight peak. No mechanism was proposed for his results, and it is possible that the low molecular weight peak is due to polymerization from phenoxy radicals in the system.

The addition of octanethiol, a free-radical chain transfer agent, also caused an increase in the rate of an ATRP process. The octanethiol may have caused a reduction in the concentration of $Cu^{(II)}$ as a result of the oxidation of the thiol to a disulfide. See Heuts, J. P. A. et. al. *Macromol. Chem. Phys.* 1999, 200, 1380-1385, hereby incorporated by reference in its entirety.

Processes for the increasing rate of ATRP processes by the addition of Lewis acids, metal halides, acetyl acetonate and other organic acids, such as camphorsulfonic acid, have been disclosed. Preferred Lewis acids include aluminium complex compounds, metal halides, e.g. zinc halides, lithium halides, iron trichloride, boron trifluoride. A preferred aluminium compound is methyl aluminium bis(2,6-di-tert-butyl-4-methyl)phenoxide. No mechanism was suggested for the increased rate and there was no suggestion that the reactions could be used to activate a reverse ATRP. See WO 00/47634, hereby incorporated by reference.

None of the previous polymerizations with reducing agents were undertaken to determine possible mechanisms for ATRP and do not suggest that the reducing agents may be used to reduce the molar ratio of the transition metal catalyst to the atom transfer radical polymerization initiator. In fact, typically the processes involved molar ratio of the transition metal catalyst to the atom transfer radical polymerization initiator of greater than or equal to 1.

The reducing agent of the present invention may be used in an initiation reaction for an ATRP process. The reducing agent may react with transition metal complex in an oxidized state to form a transition metal catalyst in the activator state or react directly with the compound having a radically transferable atom or group to form the propagating active polymer chain in a substantially nonreversible electron transfer reaction to initiate an embodiment of the present invention. The reducing agent may be involved in both reactions, initiation and compensation, for the decrease in polymerization rate due to build up of the transition metal in the deactivator state. In certain embodiments, there may be two or more different reducing agents in the polymerization medium. One of the reducing agents may primarily be involved in the initiation of the polymerization process and the second reducing agent may primarily compensate for the build up of transition metal catalyst in the activator state.

The reducing power of different transition metal complexes are known [Lingane, J. J., *Chem. Rev.*; 29 1 1941: Vlcek, A. A., *Coord. Chem. Rev.* 43 39, 1982; van Gaal, H. M. L., van der Linden, J. G. M., *Coord. Chem. Rev.* 47 41 1982] and one only has to chose a complex that can reduce the transition metal complex selected as the catalyst for the ATRP reaction, preferably, without further significant participation in the polymerization process. Different transition metal complexes may be reduced to a different degree by the same reagent.

Several exemplary combinations of monomer/catalyst complex precursors are discussed exemplifying bulk polymerization including: styrene/$CuCl_2$/dNbpy, octadecyl methacrylate/$CuCl_2$/dNbipy, methyl methacrylate/$CuCl_2$/PMDETA, n-butyl acrylate/$CuBr_2$/PMDETA, and methyl acrylate/$CuCl_2$/$Me_6$TREN therein demonstrating the broad applicability of embodiments of the process of the present invention. These polymerizations proceeded in a controlled manner for all systems, producing well-defined polymers with a controlled degree of polymerization and narrow molecular weight distribution, thereby demonstrating the robust nature of AGET ATRP. The robust nature of AGET ATRP is also exemplified in bi-phasic systems by polymerization of various monomers from multifunctional initiators forming star, star block copolymers, hybrid materials and brush copolymers in high yield and high conversion.

Not wishing to be limited by a suggested mechanism, Scheme 4 shows the proposed mechanism for embodiments of the present polymerization process and shows all components present in the initial polymerization medium in italics. Scheme 4 shows that all reagents can be added to the reaction prior to the addition of the reducing agent and that once the reducing agent is added a normal ATRP reaction can occur.

Scheme 4. Proposed Mechanism.

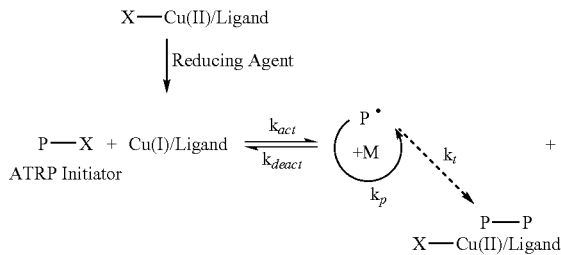

Embodiments of the process of the present invention include polymerizations wherein the oxidatively stable transition metal complex is reduced to the desired degree essentially by a non-radical forming reducing agent and that the reducing agent that does interact with the radically transferable atom or group on the higher oxidation state transition metal complex forms a molecule comprising a species from which the radically transferable atom cannot readily be abstracted by the lower oxidation state transition metal catalyst complex, i.e. the former ligand or counterion on the higher oxidation state transition metal complex does not form an activated substituent on the reducing agent. This can be accomplished by selection of transition metal reducing agents that do not have a radically transferable counterion, such as a triflate or an oxide, or when a halogen counterion is present, with some reagents this can be accomplished when a rapid dehydrohalogenation occurs. The addition of a base or excess ligand may accelerate some reduction reactions. The additional base can be in the form of additional N-containing ligand.

The reduction reaction can be preferentially conducted in-situ or if desired prior to addition of the catalyst complex to the reaction medium. Appropriate conditions can be determined by examining the kinetics of the reduction reaction for the transition metal chemistry, as noted below, or validated by running a reaction using a monofunctional macroinitiator followed by GPC analysis of the product. Monomodal MWD should be produced. (See FIG. 3b from example 10, run KM 241 below.) In this way the same product is obtained as when a normal ATRP reaction is conducted but in this case the reaction is initiated after activation of the deactivator by non-ATRP initiator forming, reduction reaction; i.e. normal initiation of the reaction by the formed activator and the added initiator molecule or active surface. This procedure has all the benefits of a normal ATRP initiated polymerization plus the benefits, or freedom, of adding the catalyst complex to the reaction medium in its more stable higher oxidation state, in the presence of the initiator, and as disclosed below optionally in the presence of dissolved oxygen. In some cases, the reducing agent may be attached to a surface.

Embodiments of the process of the present invention are particularly advantageous in mini-emulsion systems since a stable miniemulsion is created with the aid of a high-shearing force, usually sonification, before polymerization is initiated. The sonification may increase the concentration of dissolved oxygen in the polymerized medium. In such a process, it is more difficult to avoid oxidation of the transition metal catalyst and, thus, control the concentration of the activator during the sonification.

Figure 4:
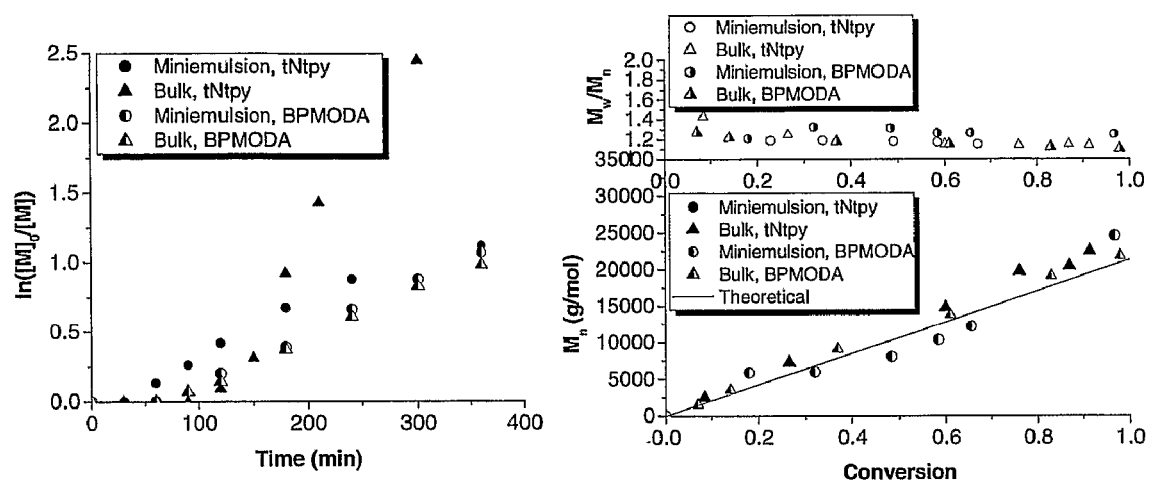
FIG. 4 are graphs of the kinetics and the evolution of number average molecular weight and molecular weight distribution for bulk and miniemulsion polymerization of BA using different catalysts.

In a miniemulsion polymerization process, the monomer droplets minimize the problems associated with monomer transport during aqueous dispersed, or emulsion, polymerization. Each miniemulsion droplet behaves like a "mini-bulk" system. In order to conduct a successful ATRP in miniemulsion, each component, including the initiator, the monomer and the catalyst in both oxidation states, should remain stable inside the monomer droplets for the entire polymerization. A stable miniemulsion is created with the aid of a high-shearing force before polymerization is initiated. The sonification procedure presents a problem for a direct ATRP because the activating $Cu^{1+}$ complex is sensitive to dissolved oxygen. Reverse ATRP and SR&NI were applied to miniemulsion polymerization and as shown in the comparison runs while a reverse ATRP is more adaptable to miniemulsion because catalyst oxidation during sonification is less challenging However, reverse ATRP has some limitations; the amount of catalyst can not be independently reduced and should be present at a concentration comparable to the radical initiator since the added $Cu^{2+}$ complex provides the source of the transferable atoms. Furthermore, a block copolymer is difficult to synthesize using a reverse ATRP since this would require preparation and use of a macro-free radical initiator. These problems were partially solved by the development of Simultaneous Reverse and Normal Initiation (SR&NI) process. In this process, an ATRP initiator, i.e., an alkyl halide or a halogen-terminated macroinitiator, is added to the reaction together with a conventional radical initiator. Both of them contribute to the ATRP equilibrium, so that the relative amount of catalysts can be dramatically decreased, and the synthesis of block copolymers can be achieved. Indeed, SR&NI was successful for the preparation of homopolymers, block copolymers, star-block copolymers, and gradient copolymers with a significantly decreased concentration of catalyst in both bulk and miniemulsion processes. On the other hand, SR&NI process showed an intrinsic deficiency when it was used to synthesize block and graft copolymers. (See FIGS. 1 and 2 for analysis of materials prepared by SR&NI and compare to FIGS. 4 and 5 displaying the analysis of materials prepared by AGET ATRP) This drawback came from the use of a conventional radical initiator to reduce the stable high oxidation state catalyst complex, which introduced new initiating species based on the first generated free radicals. These free radicals produced homopolymer chains consisting of the second monomer only, which competed with the growth of block copolymers from the macroinitiator. Therefore, the final product contained a portion of homopolymer in addition to the desired block copolymer. To evaluate the composition of the resulting materials a block copolymerization was conducted and the composition of final product was analyzed by 2D chromatography.

AGET ATRP allows the addition of multi-functional macro-initiators, or solid particles comprising initiators on the surface, to the reaction medium to be performed prior to dispersion in the suspending medium. A further improvement is that the activator is generated by the reducing agent and therefore the rate of the initiation and propagation reactions can be tuned by the addition rate/amount or composition of the reducing agent. In this way, the rate of the ATRP can be constantly controlled throughout the polymerization by adjusting the $Cu^{(I)}/Cu^{(II)}$ ratio with the addition of reducing agents. (Scheme 5)

$$R_p = k_p K_{atrp} [M][RX]_0 ([M_t^n]/[M_t^{n+1}])$$

Scheme 5. Rate of Propagation of an ATRP Reaction.

The rate equation of an ATRP polymerization, Scheme 5, shows that the rate of polymerization ($R_p$) is proportional to the molar ratio of activator, $M_t^{(n)}$, to deactivator, $M_t^{(n+1)}$, and not the absolute amount of transition metal catalyst present in the reaction. Therefore, the rate of an ATRP polymerization is proportional to the ratio of activator to deactivator. Thus, if the ratio of activator to deactivator may be maintained, it appears that an ATRP polymerization could operate with low concentrations of overall amount of catalyst without affecting the rates. However, due to biradical termination reactions, the activator may be converted to the deactivator; therefore, reducing the ratio of activator to deactivator causing the reaction to slow down and, perhaps, eventually stop. Therefore, in conventional ATRP, a sufficient excess of activator was added to overcome this problem and drive the reaction to completion. The amount of catalyst added to the reaction significantly exceeds the concentration of termination reactions, which typically is between 1 and 10 mole % of the initiator. The high concentration of catalyst needed to compensate for termination reactions has resulted in the belief that the amount of catalyst required for an ATRP presents a problem for removal of the transition metal complex from the reaction.

In embodiments of bulk polymerizations of MMA comprising reducing $Cu^{(II)}$ complex with $Sn^{(II)}$, with different concentrations and ratios of the $Sn^{(II)}$ complex to $Cu_{(II)}$ may be used to vary the rate of polymerization and level of control of the reaction. Indeed, this second transition metal, when added in excess and/or at appropriate rate, continuously reduces $Cu^{(II)}$ throughout the reaction, thereby maintaining or increasing the rate of the reaction throughout the polymerization process. The minimal concentration of $Cu^{(II)}$ species needed to obtain polymers with a degree of polymerization of 2000 and a PDI of 1.2 for relatively efficient deactivators (kda=$10^7$ mol$^{-1}$ Ls$^{-1}$ for MMA) and kda=$10^8$ mol$^{-1}$ Ls$^{-1}$ for BA) for nearly complete conversion at 80° C. for methyl methacrylate (MMA kp=2 $10^3$ mol$^{-1}$ Ls$^{-1}$) and n-butyl acrylate (BA kp=5 $10^4$ mol$^{-1}$ Ls$^{-1}$) are estimated to be only 2.5 $10^{-5}$ mol/L for MMA and 6 $10^{-5}$ mol/L for BA. This corresponds to 5 and 12 ppm of $Cu^{(II)}$ vs. monomer (5 mol/L). These values are estimated to be even 5 times smaller (1 and 2 ppm, respectively), for polymers having a degree of polymerization of only 1000 (MW~100,000).

Thus, copper concentration could be significantly reduced to a ppm level without reducing rates while preserving control of molecular weights and functionalities. The only problem preventing such reduction in catalyst are termination reactions which would consume all activating $Cu^{(I)}$ species. Thus, this problem could be solved if any $Cu^{(II)}$ species, formed above the amount needed for control, could be regenerated to the desired $Cu^{(I)}$ state.

To maintain the polymerization rate throughout the polymerization, the reducing agent should be added at molar concentration exceeding that of estimated terminated chains. The unexpected conclusion that can be drawn from this discussion, in conjunction with a full understanding of Schemes 4 & 5 as described above, is that one can add a low concentration of the transition metal catalyst and a reducing agent to maintain the ratio of activator to deactivator. Preferentially, for some embodiments this reduction reaction, or reactivation process, will be conducted in a continuous manner and a relatively constant ratio of activator to deactivator can be maintained. In certain embodiments, a second agent may be used, one reducing agent to activate the oxidized transition metal catalyst and the second reducing agent to maintain the desired ratio of activator to deactivator. As such, it may be desirable for the two reducing agents to have different rates of reduction. The first reduction to form the initial catalyst activator may be desired to be relatively fast and efficient to provide fast activation of the transition metal catalyst and ATRP initiator, while the second reducing agent may have a lower rate of reduction corresponding to the rate of termination reactions and, thus, maintain the desired rate of reaction. The second reducing agent may reduce the transition metal complex in a continuous manner. Embodiments of the process of the present invention also include adding a reducing agent to a polymerization process, wherein the rate of reduction of the reducing agent of the transition metal catalyst in the oxidized state causes a change in the polymerization rate. The rate of reduction of the reducing agent may either cause an increase or decrease in the initial rate of polymerization. Embodiments may also include adding more than two different reducing agents.

The number of termination reactions can differ for different (co)monomers and hence it may be desirable to control this second continuous reduction with a different reducing agent or by monitoring the rate of addition of the first reducing agent for each individual copolymerization. For example approximately $\Delta P_t$=4 $10^{-4}$ mol/L chains should terminate for MMA and $10^{-6}$ mol/L for BA, assuming kt=$10^8$ mol$^{-1}$ Ls$^{-1}$. These values are ~2% of all chains for MMA when targeting DP=200 and 8% for DP=1000. The fraction of terminated chains is much smaller than 1% for BA.

We are thereby providing a process allowing addition of a low level of transition metal catalyst to the reaction. E.g. in the above example one could add significantly less than 8% of the catalyst complex typically added to a conventional ATRP to targeting a DP=1000 for a MMA polymerization. In certain embodiments, the level of transition metal complex added to an ARGET ATRP may be so low that the reaction medium may be colorless and the transition metal complex can either be left in the final product or, since it is added at such low levels it can be inexpensively and readily removed from the reaction at the end of the reaction by filtration over an active substrate or extraction into a solvent, such as, water in some embodiments. Further, since the transition metal is normally removed as the higher oxidation state complex, i.e. after exposure to air, it is an ideal component for addition to the AGET ATRP as the catalyst precursor.

In certain embodiments, the amount of reducing agent added, preferably, should be sufficient to reduce most of the first added $Cu^{(II)}$ to $Cu^{(I)}$, remove any excess oxygen from the system, and then be available to continue to reduce the excess $Cu^{(II)}$ formed as a result of unavoidable termination reactions at a similar rate to formation of the $Cu^{(II)}$, that is at a rate that may slowly change throughout the reaction. Thus, a further aspect of the invention is that oxygen does not have to be removed from the polymerization system prior to adding the reducing agent and initiating the polymerization process since the reducing agent can continuously reduce the higher oxidation state transition metal complex so that it additionally interacts with the dissolved oxygen and removes it from the process. Such a catalyst based removal of oxygen by an added agent can be accomplished for all controlled radical polymerization processes not just ATRP.

Embodiments of the present invention include reducing agents that reduce the transition metal catalyst in the oxidized state, and when the higher oxidation state comprises radically transferable atoms or groups as a ligand or counterion by removal of a radically transferable atom or group, typically a halogen, in a process that prevents the radically transferable atom or group from further participating in control of the polymerization process. The reducing agent may prevent the radically transferable atom or group from further participating in the polymerization process by oxidation of the reducing agent to a more stable higher oxidation state or by reaction with a halogen to form a halogen-containing compound that will not further participate in the polymerization process as a reactant, such as a dehydrohalogenation reaction, for example. The reducing agent may be an inorganic compound or an organic compound comprising reducing capability. Ascorbic acid has been found to reduce transition metals that are suitable as ATRP catalyst, in particular iron, even in the presence of oxygen, see Samuni, A. et. al. *European journal of Biochemistry;* 1983, 137, 119-124 and Davies, M. B. *Polyhedron* 1992, 11, 285-321 both hereby incorporated by reference in their entirety. Suitable reducing agents for the present invention may be, for example, ascorbic acid, ascorbic acid-6-palmitaite (A6P), stannous compounds, stannous oxalate, sodium sulfite, sulfur compounds of a low oxidation state, sodium hydrogen sulfite, inorganic salts comprising a metal ion, hydrazine hydrate, alkylthiols, mercaptoethanol, carbonyl compounds which can easily be enolized, acetyl acetonate, camphorsulfonic acid, hydroxy-acetone, reducing sugars, monosaccharides, glucose and related sugars, tetrahydrofuran, dihydroanthracene, silanes, 2,3 dimethylbutadiene, amines, polyamines, hydrazine derivatives, formamidine-sulfinic acid, silane compounds, borane compounds, aldehydes, and derivatives of such compounds. The metal ions of the inorganic salts may be, for example, at least one of $Sn^{2+}$, $Fe^{2+}$, $Cr^{3+}$, $Al^{3+}$, $Ti^{3+}$ and $Ti^{4+}$ and, preferably, in certain embodiments, the metal ion may be at least one of $Sn^{2+}$, $Fe^{2+}$, $Cr^{3+}$ and $Ti^{3+}$. In certain embodiments, the reducing agent may preferably be capable of reacting with oxygen, or reducing a transition metal catalyst that has been oxidized by oxygen such as dissolved oxygen in the polymerization medium. The reducing agent may also preferably be soluble in the polymerization medium or in at least one phase of the polymerization medium, such as the suspending phase or the monomer phase for polymerization processes having at least two phases. In typical multiphase polymerization processes the polymerization medium may include a water based suspending medium. Preferably, reducing agent will be soluble in the desired phase of the polymerization medium, have a reducing rate to substantially maintain the desired ratio of transition metal in the lower oxidation state to the higher oxidation state. The addition of a base or excess ligand to any phase of the polymerization medium may assist in reducing the transition metal catalyst or extraction of the radically polymerizable atom or group.

The reducing agent may be a monomer soluble reducing agent or water soluble reducing agent, such as addition of ascorbic acid to a water based system, such as miniemulsion. The reducing agent may be added to a higher oxidation state catalyst complex forming an active catalyst complex, possibly by an outer sphere electron transfer reaction or by formation of the activator through a lower energy transition state complex that does not result in full separation of intermediate species which could result in formation of independent initiating species.

In certain embodiments, the reducing agent may be considered to be a halogen trap. As used herein, a halogen trap is any compound can trap a halogen to prevent the halogen from further participation in the polymerization process as a radically transferable atom or group. For instance, to initiate the polymerizing, the halogen trap may reduce the transition metal compound in a higher oxidation state to a transition metal compound in the lower oxidation state.

Embodiments of the polymerization process of the present invention may comprise any ATRP initiator. An ATRP initiator may be any compound comprising a radically transferable atom or group, such as a chemical molecule or functionalized particle with a transferable (pseudo)halogen that can initiate chain growth. In controlled polymerizations, fast initiation is important to obtain well-defined polymers with low polydispersities. A variety of initiators, typically alkyl halides, have been used successfully in ATRP. Many different types of halogenated compounds are potential ATRP initiators. ATRP initiators may comprise at least two radically transferable atoms or groups or be a polymer or a solid comprising a radically transferable atom or group attached to the polymer or a solid.

Embodiments of the polymerization process of present invention include emulsion polymerization processes, miniemulsion polymerization processes, microemulsion process, reverse emulsion polymerization, and suspension polymerization process. In such a process, the polymerization process may further comprises at least one of a suspending medium, a surfactant, and a monomer phase comprising at least a portion of the radically polymerizable monomers. Preferably, embodiments of the process of the present invention for an emulsion or miniemulsion system may also include adding a phase transfer agent, controlled addition of the reducing agent, or addition of an oil-soluble reducing agent.

Embodiments of the method of the present invention may be performed in bulk or in a solvent. If a solvent is used, the solvent may be a protic media or a non-protic media. A protic media is a media that comprises at least one component that is capable of being a proton donor. The protic media may comprise water and at least one alcohol, for example. The alcohol of the protic media may be, for example, methanol, ethanol, propanol, isopropanol, butanol, isobutanol, heptanol, or mixtures thereof. Embodiments of the present invention also include polymerizing the radically polymerizable monomers in a non-protic media, wherein the protic media comprises an aromatic solvent, such as, but not limited to, anisole, xylene, benzene, a halogenated benzene derivative, or other nonprotic solvent.

Suitable monomers used in the polymerization step of the present invention comprise at least one diene group or at least one vinyl group. Examples include, but are not limited to, acrylate esters, (meth)acrylate esters, acrylonitriles, cyanoacrylate esters, maleate and fumarate diesters, vinyl pyridines, vinyl N-alkylpyrroles, vinyl oxazoles, vinyl thiazoles, vinyl pyrimidines, vinyl imidazoles, vinyl ketones, acrylic acids, (meth)acrylic acids, styrenes, and derivatives of these monomers. Vinyl ketones include those in which the α-carbon atom of the alkyl group does not bear a hydrogen atom, such as vinyl ketones in which both α-carbons bear a $C_1$-$C_4$ alkyl group, halogen, etc. or a vinyl phenyl ketone in which the phenyl group may be substituted with from 1 to 5 $C_1$-$C_6$-alkyl groups and/or halogen atoms. Styrenes include those in which the vinyl group is substituted with a $C_1$-$C_6$ alkyl group, such as at the α-carbon atom, and/or those in which the phenyl group is substituted with from 1 to 5 substituents including a $C_1$-$C_6$ alkyl, alkenyl (including vinyl), alkynyl (including acetylenyl), or phenyl group, and functional groups such as $C_1$-$C_6$ alkoxy, halogen, nitro, carboxy, $C_1$-$C_6$ alkoxycarbonyl, hydroxy (including those protected with a $C_1$-$C_6$ acyl group), and cyano groups. Specific examples include esters of acrylic acid, such as acrylate esters of $C_1$-$C_{20}$ alcohols, (meth)acrylate esters of $C_1$-$C_{20}$ alcohols, methyl acrylate (MA), methyl methacrylate (MMA), butyl acrylate (BA), t-butyl acrylate, t-butyl (meth)acrylate, 2-ethylhexyl acrylate (EHA), acrylonitrile (AN), methacrylonitrile, styrene, DMAEMA, acrylamide, acrylonitrile, methacrylonitrile, vinyl pyridine and derivatives thereof.

The term "alkyl" as used herein refers to a branched or unbranched saturated hydrocarbon group generally comprising 1 to 24 carbon atoms, such as ethyl, ethyl, n-propyl, isopropyl, n-butyl, isobutyl, t-butyl, octyl, decyl, tetradecyl, hexadecyl, eicosyl, tetracosyl and the like, as well as cycloalkyl groups such as cyclopentyl, cyclohexyl and the like. The term "lower alkyl" intends an alkyl group of one to six carbon atoms, preferably one to four carbon atoms.

The term "alkenyl" as used herein refers to a branched or unbranched hydrocarbon group generally comprising 2 to 24 carbon atoms and containing at least one double bond, typically containing one to six double bonds, more typically one or two double bonds, e.g., ethenyl, n-propenyl, n-butenyl, octenyl, decenyl, and the like, as well as cycloalkenyl groups such as cyclopentenyl, cyclohexenyl and the like. The term "lower alkenyl" intends an alkenyl group of two to six carbon atoms, preferably two to four carbon atoms.

The term "alkylene" as used herein refers to a difunctional branched or unbranched saturated hydrocarbon group generally comprising 1 to 24 carbon atoms, such as methylene, ethylene, n-propylene, n-butylene, n-hexylene, decylene, tetradecylene, hexadecylene, and the like. The term "lower alkylene" refers to an alkylene group of one to six carbon atoms, preferably one to four carbon atoms.

The term "alkoxy" as used herein refers to a substituent —O—R wherein R is alkyl as defined above. The term "lower alkoxy" refers to such a group wherein R is lower alkyl.

The term "inert" to refer to a substituent or compound means that the substituent or compound will not undergo modification either (1) in the presence of reagents that will likely contact the substituent or compound, or (2) under conditions that the substituent or compound will likely be subjected to (e.g., chemical processing carried out subsequent to attachment an "inert" moiety to a substrate surface).

The term "available" to refer to an optionally substituted carbon atom refers to a carbon atom that is covalently bound to one or more hydrogen atoms that can be replaced by a designated substituent without disrupting or destabilizing the remaining structure of the molecule.

"Optional" or "optionally" means that the subsequently described circumstance may or may not occur and is not necessary, so that the description includes instances where the circumstance occurs and instances where it does not. For example, the phrase "optionally substituted" means that a non-hydrogen substituent may or may not be present, and, thus, the description includes structures wherein a non-hydrogen substituent is present and structures wherein a non-hydrogen substituent is not present.

The term "radical" encompasses all non-ionic active radical based species formed by homolytic cleavage of a bond and is not limited to a carbon centered free radical that does not interact with any other component in the system.

Radicals, which are formed in ATRP, and any other CRP process, not only propagate but also may terminate by radical termination reactions. Typically, between 1 and 10% of chains may terminate in a polymerization process, depending on the reaction conditions. For typical chains, growing from a monofunctional initiator only a single termination reaction will prevent further growth of the chain. However, when multifunctional initiators are used multiple intra-molecular coupling termination reactions may lead to gelation or crosslinking. Thus, the emulsion polymerization processes of the present invention are particularly useful for multifunctional initiators comprising 3 or more initiating species, however, greater advantages may be found with multifunctional initiators having 10 or more initiating sites, and the amount of termination reactions with multifunctional initiators having greater than 100 initiating sites is much greater and therefore the process of the present invention is particularly useful for such multifunctional initiators. Thus, synthesis of various star polymers, multifunctional molecular brushes and hybrids with hundreds of chains growing from colloidal particles has typically been carried out under high dilution, low monomer conversion and over long reaction times in order to minimize crosslinking by radical-radical termination reactions. At one level the difference between bulk and miniemulsion is not obvious, (FIG. 4) since in a miniemulsion system the polymerization takes place in separated "mini-bulk" domains and the reaction proceeds with a similar rate providing polymers with similar molecular weight and PDI. However one advantage for the mini-emulsion system is that the reaction can be driven to higher conversion forming polymeric materials with lower levels of non-functional products; c.f. FIG. 1 with FIG. 2. Understanding this unexpected observation is of particular utility when multi-functional initiators are employed; such as in the preparation of graft copolymers. Grafting, or blocking, from a macroinitiator is a useful approach to preparation of polymers with controlled topology, such as graft copolymers and multi-arm star block copolymers. Grafting from process comprises polymerizing monomers from a macroinitiator. Macroinitiators include natural products, synthetic polymers, organic based particles and inorganic compounds comprising various functionalities. The repulsive interactions between the chains are much smaller than in grafting onto, since the chains progressively grow and facilitate approach of monomer units. One of many examples of such an approach is synthesis of well-defined polymeric brush copolymers and organic-inorganic hybrids by a concurrent growth of hundreds of polymer chains from multifunctional organic macroinitiators, or inorganic based initiators such as silica, gold or other colloidal surfaces; as exemplified in commonly assigned patents and patent applications including U.S. Pat. Nos. 6,541,580 and 6,627,314, and U.S. application Ser. Nos. 09/534,827 and 10/638,584.

The polymers prepared by the embodiments of the mini-emulsion process of the present invention display evidence of higher levels of control than seen in bulk and solution based CRP's. Compartmentalization of polymerization in a mini-emulsion leads to a process of the present invention which may provide a more economically and environmentally viable approach to production of multifunctional materials including telechelic materials, star copolymers, bottle-brush copolymers and brush copolymers formed by grafting from any type of solid surface initially comprising a functional group that can initiate a CRP.

The miniemulsion process of the present invention may be used to reach high monomer conversions during the preparation of graft copolymers or materials comprising tethered (co)polymer chains from multifunctional initiators. The process can be applied to any radical based polymerization process employing macroinitiators and multifunctional initiators and avoids macroscopic gelation by confining the growing polymers to the monomer droplets, thereby conducting a mini-bulk polymerization. This fragmentation of the polymerization process both reduces the probability of coupling reactions and the impact of any coupling reactions on the bulk properties of the material. The process may be used for the preparation of stars, brushes, nanocolloids and any multifunctional systems.

The benefits of compartmentalization can be understood by considering a typical ATRP of n-butyl acrylate (BA). The concentration of growing radicals in the polymerization of BA (bulk or miniemulsion polymerization) is typically in the range of $\sim 10^{-9}$ M. (The concentration of radicals may be approximated from the polymerization rate: $d\ln[M]/dt=k_p[P^*]$, thus $[P^*] \sim 10^{-9}$ M, if 80% conversion is reached in $\sim 10$ h at 70° C., $k_p=40,000$ $M^{-1}s^{-1}$). In the ATRP miniemulsion experiments described herein, the average diameter of the monomer droplets was $d_d \sim 200$ nm, this corresponds to droplet volume $v_d \sim 4 \times 10^6$ nm$^3$ or $4 \times 10^{-18}$ L. In such a monomer droplet there are approximately $2 \times 10^7$ molecules of BA ($v_d N_A [BA]_o$). If one considers a miniemulsion polymerization from silica particles with $d_p=20$ nm containing approximately $\sim 1000$ 2-bromoisobutyrate initiator molecules anchored to the surface targeting a final degree of polymerization (DP=$[BA]_o/[RBr]_o$) of 200; such as described in U.S. Pat. No. 6,627,314, then in every droplet there are approximately 100 silica particles with a total 100,000 initiating sites. Under these conditions at any instant, only 1 in 400 droplets contain a growing radical, thus only 0.25% of droplets will be active and 99.75% will not be active since all polymer chains will be present in the dormant stage ($n=v_d N_A [P^*]$). Thus, under such conditions, the probability of terminated chains should be relatively small, and the proportion of terminated chains should be lower compared to conversion conditions for the bulk solution polymerizations. Thus, under such conditions, the proportion of terminated chains should be relatively small, compared to conversion conditions for the bulk solution polymerizations of U.S. Pat. No. 6,627,314. Assuming a large value for the termination rate constant, $k_t=10^8$ $M^{-1}s^{-1}$, under the discussed conditions after 10 h the total concentration of terminated chains should be $\Delta[P]_t=k_t[P^*]^2$ or $\Delta t \sim 4$ $10^{-6}$ M. That is approximately 0.01% of the total R—Br growing chains present in the system could terminate, which would correspond to $\sim 10$ terminated chains per droplet. Thus, no more than 10% of silica particles can be coupled or linked and perhaps, or probably, the level will be much less due to the likelihood of occurrence of some intra-particle termination of chains growing from the same particle.

Embodiments of the present invention for mini-emulsion polymerization systems for polymerizing free radically (co)polymerizable monomers from multifunctional materials allows for compartmentalization or physical fragmentation of the polymerization process resulting in an effective reduction in the concentration of the active radicals in the (co)polymerization environment. This further reduces the impact of termination reactions. The procedures disclosed for biphasic compartmentalized (co)polymerization processes utilizing multifunctional initiators are applicable to all CRP processes.

Figure 16:
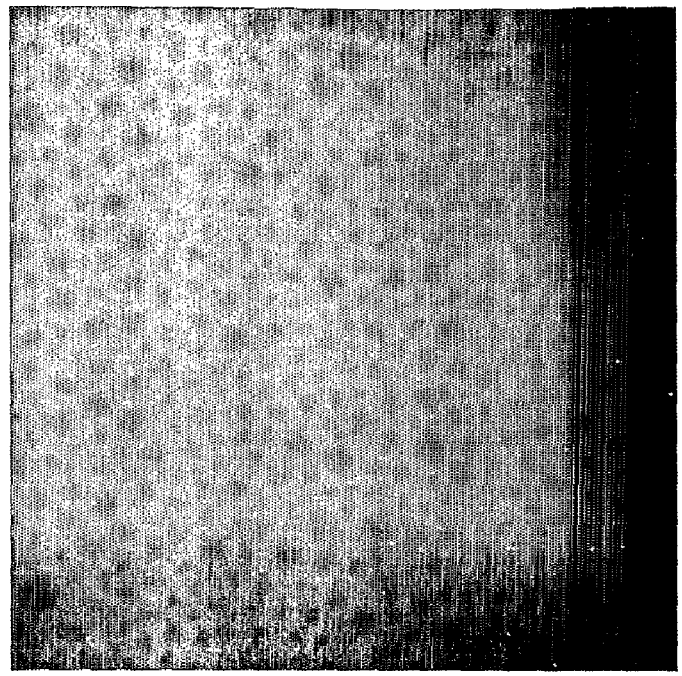
FIG. 16 is a tapping electron microscopy image of (poly) n-BA with a degree of polymerization of approximately 125 grafted from silica prepared in a miniemulsion polymerization.
Figure 17:
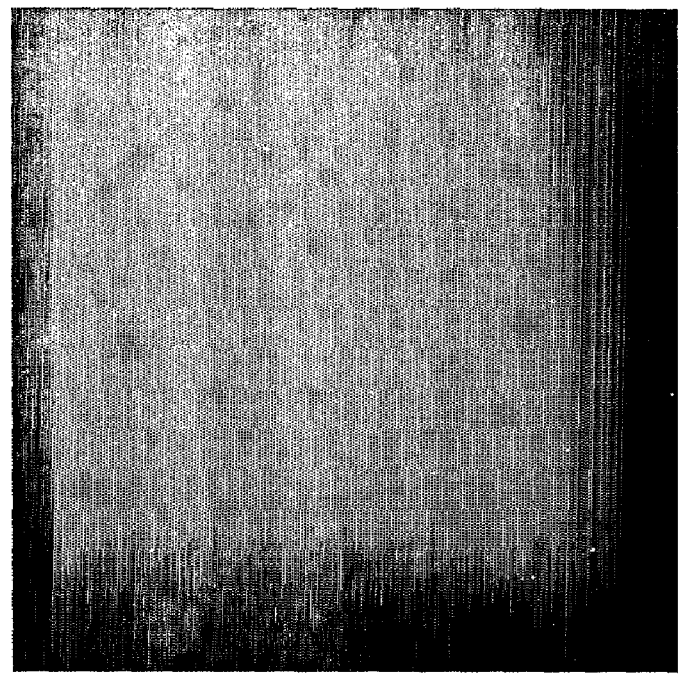
FIG. 17 is a tapping electron microscopy image of (poly) n-BA with a degree of polymerization of approximately 438 grafted from silica prepared in a miniemulsion polymerization.

Reactions followed first order kinetics with 80% conversion reached in 10 h. Droplet size was approximately 200 nm during the entire polymerization. The size of individual silica particles, determined after miniemulsion destruction, was measured by DSL and increased nearly linearly with monomer conversion. The proportion of aggregates and crosslinked particles was very small, as shown in FIGS. 16-19. The molecular weight of pBA detached from the silica particles by treatment with HF increased linearly with conversion, and polydispersity is low. FIG. 16 and FIG. 17 show TEM images of grafted silica particles with different molecular weight poly(butyl acrylate) chains tethered to the surface. The particles with lower molecular weight attached polymer are closer together than the higher molecular weight material. In both images little particle-particle coupling can be detected.

In ATRP processes in a miniemulsion, the reactor medium may include not only the monomers, catalysts, and initiators but also surfactants and hydrophobes. Preferably, the ligand(s) which should preferentially force both oxidation states of the catalyst into the organic phase while forming a catalyst complex with appropriate activity. For example, some embodiments employing dNbpy as the ligand showed quite low stability and a significant amount of flocculation after addition of the reducing agent whereas embodiments with BPMODA as ligand were stable.

The ligand for the transition metal complex may also facilitate removal of the transition metal from the organic phase after the reaction has been completed. A ligand with some hydrophilic character, particularly when complexed with the higher transition state transition metal, can cause the higher oxidation state of the transition metal complex to migrate from the organic phase to the aqueous phase. Further the transition metal complex can separate from the aqueous phase as a solid complex, thereby providing a means to recycle the transition metal. For example, during the reaction, the transition metal complex in the higher oxidation state is converted to the lower oxidation state by the reducing agent and migration is minimized. However, after the reaction is complete exposure to air forms the catalyst to the higher oxidation state and enhances migration to the suspending phase. The catalyst may then separate out as a solid and be readily recycled. The resulting polymer is essentially colorless.

Typically, it is preferable for the lower oxidation state of the transition metal complex to be at least partially soluble in the dispersed phase while the higher oxidation state may be less soluble in the dispersed phase. A water-soluble reducing agent for embodiments of the process of the present invention ATRP since the higher oxidation state transition metal would be reduced in the aqueous phase and driven back to the polymerization phase. This approach is particularly useful when selecting agents for an ARGET ATRP. An example of how the reducing agents can be selected to be additionally environmentally benign would be the selection of, ascorbic acid, vitamin C for the first reducing agent and a sugar for the second reducing agent in a miniemulsion polymerization process designed to require less than 100 ppm transition metal complex as the catalyst.

The concept of reduction of the higher oxidation state transition metal by electron transfer, i.e. non-initiator forming reactions or reactions that do not form an activated initiating species, can be further extended to allow for a continuous regeneration of the higher oxidation state transition metal by electron transfer when termination reactions generate higher oxidation state transition metal complex thereby allowing a reduction in the absolute level of transition metal in the system. The amount of reducing agent, or agents, that may be added to the reaction can be approximated by consideration of the amount of transition metal added to the reaction, the level of impurities in the system, and the approximate number of dead chains that are expected to be formed by termination reactions.

EXAMPLES AND DISCUSSION OF EXAMPLES

In many of the following examples purified monomers were polymerized under oxygen free conditions. As shown later in the examples this is not a requirement for conducting an AGET ATRP or an ARGET ATRP in either bulk or biphasic systems, but was used in most examples to allow direct comparison between the new process for initiating an ATRP reaction with the prior systems discussed in the comparison examples.

Chemicals. Styrene (St), methyl methacrylate (MMA), n-butyl acrylate (nBA) and methyl acrylate (MA), (Aldrich, 99%) were passed through a column filled with neutral alumina, dried over calcium hydride, and distilled under reduced pressure. n-Octadecyl methacrylate (ODMA) (Polysciences Inc., 99%) was purified by dissolution in hexane and extraction four times with 5% aqueous NaOH. After drying the organic phase over magnesium sulfate, the solution was passed through neutral alumina and the solvent was removed under reduced pressure. ε-Caprolactone (CL), (Aldrich, 99%) was dried over calcium hydride under nitrogen at 25° C., and distilled under reduced pressure just before use ($T_b$=74-76° C. at 0.5-0.6 mm Hg) and stored over 4 Å molecular sieves. 4,4'-Di-(5-nonyl)-2,2'-bipyridine (dNbpy), tris(2-(dimethylamino)ethyl)amine ($Me_6TREN$) and 1,1,1-tris(4-(2-bromoisobutyryloxy)phenyl)ethane (TBriBPE) were synthesized following previously reported procedures. N,N,N',N'',N''-pentamethyldiethylenetriamine (PMDETA) (99%), ethyl 2-bromoisobutyrate (EtBrIB) (Acros, 98%), copper(II) chloride (Acros, 99%), copper(II) bromide (Acros, 99%), tin(II) 2-ethylhexanoate ($Sn(2EH)_2$) (Aldrich), anisole (Aldrich, 99%), diphenyl ether (Acros, 99%), 2-bromoisobutyryl bromide (Aldrich, 97%), ethylene glycol (Aldrich, anhydrous) and triethylamine (Fisher 99%) were used as received. Toluene (Fisher Scientific, 99.9%) was distilled over sodium and stored over molecular sieves. Copper(I) chloride (Acros, 95%) and copper(I) bromide (Acros, 98%) were washed with glacial acetic acid, in order to remove any soluble oxidized species, filtered, washed with ethanol, and dried.

Molecular weights were determined by GPC equipped with an autosampler (Waters, 717 plus), HPLC pump at 1 mL/min (Waters, 515), and four columns (guard, $10^5$ Å, $10^3$ Å, and 100 Å; Polymer Standards Services) in series. Toluene was used as an internal standard. A calibration curve based on linear polystyrene standards was used in conjunction with a differential refractometer (Waters, 2410).

High Performance Liquid Chromatography (HPLC) at Critical Conditions. The analysis of samples was performed at the critical condition for polystyrene (PS) using a Waters 600 controller and pump. The mobile phase was a mixture of tetrahydrofuran (THF) and acetonitrile (49%/51%, v/v). The columns used for separation were Macherey & Nagel, Nucleosil 300-5 C18 (particle size 5 μm, pore size 300 Å and column dimensions 250×4 mm i.d.) and Nucleosil 1000-7 C18 (particle size 7 μm, pore size 1000 Å and column dimensions 250×4 mm i.d.). The column oven temperature was set at 32° C. The mobile phase flow rate was 0.5 mL/min. An evaporative light scattering detector (ELSD, Polymer Laboratories, PL-ELS 1000, nitrogen flow 1.2 L/min, evaporator temperature 90° C.) was used. Dilute polymer solutions were made in THF/acetonitrile of 50%/50% v/v (2 mg/mL), and, each time a 5 μL sample was used for analysis. Data acquisition was accomplished with PSS-WINGPC 7 from Polymer Standards Service (PSS; Mainz, Germany).

2-Dimensional (2D, HPLC-GPC) Chromatography. For the first dimension HPLC, the same analytical condition was used as described for the HPLC analysis at the critical condition for PS, except that the flow rate was set at 0.08 mL/min instead of 0.5 mL/min. Sample fractions from the first dimension were transferred to the second dimension (GPC) via an eight-port valve system (VICI Valco EHC8W), which consisted of two 200 μL loops. The second dimension (GPC) consisted of a Waters 515 pump delivering a flow rate of THF at 5 mL/min. The column used was a Polymer Standards Service SDV linear M, high-speed column (pore size 5 μm, dimensions 50×20 mm i.d.). The same ELSD detector was used as in HPLC analysis, and the second dimension was calibrated using polystyrene homopolymer standards. Dilute polymer solutions were prepared in THF/acetonitrile 50%/50% v/v (5 mg/mL), and a 5 μL sample was used for analysis Data acquisition and processing were automatically performed by the Polymer Standards Service software: WINGPC 7 and PSS-2D-GPC software, respectively.

AGET ATRP for Bulk or Solution (Co)Polymerizations

In order to demonstrate the prime advantage of AGET ATRP, three different procedures were used for the polymerizations of nBA: a normal ATRP, a SN&RI ATRP and AGET ATRP.

Comparison 1: General Procedure for Normal ATRP of n-butyl Acrylate.

TBriBPE initiator (25.1 mg, 3.3×10$^{-2}$ mmol), CuBr (14.2 mg, 9.9×10$^{-2}$ mmol) and CuBr$_2$ (2.2 mg, 0.1×10$^{-2}$ mmol) were added to a 25 mL Schlenk flask, and the flask was thoroughly purged by vacuum and flushed with nitrogen. Nitrogen-purged nBA (5.0 ml, 35.1 mmol) was added via syringe. A solution of PMDETA (20.6 µl, 9.9×10$^{-2}$ mmol) in degassed anisole was added, and the mixture was stirred for 15 min in order to preform the CuCl/PMDETA and CuBr$_2$/PMDETA complexes. The flask was then transferred to a thermostated oil bath at 70° C., and the initial kinetic sample was taken. Samples were removed at different time intervals during polymerization, and conversion and molecular weights were determined by GC and GPC, respectively. The polymerization Was stopped by opening the flask and exposing the catalyst to air.

Comparison 2: General Procedure for SR&NI ATRP of n-butyl Acrylate.

TBriBPE initiator (25.1 mg, 3.3×10$^{-2}$ mmol), AIBN (8.7 mg, 5.3×10$^{-2}$ mmol) and CuBr$_2$ (22.2 mg, 9.9×10$^{-2}$ mmol) were added to a 25 mL Schlenk flask and the flask was thoroughly purged by vacuum and then flushed with nitrogen. Degassed nBA (5.0 ml, 35.1 mmol) was added via syringe. A purged solution of PMDETA (20.6 µl, 9.9×10$^{-2}$ mmol) in anisole was added and the mixture was stirred for 15 min in order to preform the CuBr$_2$/PMDETA complex. The flask was then transferred to a thermostated oil bath at 70° C., decomposition of the AIBN formed the active CuBr/PMDETA complex and the initial kinetic sample was taken. Samples were removed at different time intervals during polymerization, and conversion and molecular weights were determined by GC and GPC, respectively. The polymerization was stopped by opening the flask and exposing the catalyst to air.

Comparison 3: SR&NI in a Bulk Copolymerization

In a typical batch polymerization, CuBr$_2$ and ligand, PMDETA, were degassed in a Schlenk flask by three nitrogen/vacuum cycles. Then, deoxygenated monomer was added to the flask using previously purged syringes. The solution was stirred for 10-20 min at 60° C. to form the Cu$^{(II)}$ complex in a homogenous solution. The deoxygenated alkyl halide (i.e., MBP or EBiB) was injected to the flask under nitrogen atmosphere. The flask was immersed in an oil bath thermostated at 80° C. The polymerization was initiated by the injection of deoxygenated AIBN in anisole solution using a pre-purged syringe. Samples were withdrawn periodically to monitor the monomer conversion, copolymer composition, and molecular weight. Run ML143 was conducted to prepare a tri-arm poly(methyl acrylate) macroinitiator that was isolated and purified prior to chain extension in run ML144 (bulk).

The result of 2-D chromatography of the polymer prepared in Run ML 144 is shown in FIG. 1. The final product had 12% homo-polystyrene present in the material.

Comparison 4: Identification of Ability of Stannous Oxalate to Reduce Cupric Complexes.

C4a. Simultaneous Copolymerization of Caprolactone and Octadecyl Methacrylate.

Initial dual process copolymerization: Conducting an atom transfer radical polymerization (ATRP) and anionic ring opening polymerization (AROP) in the same time. (Scheme 6)

Scheme 6. Dual mechanism controlled polymerization from a dual functional initiator.

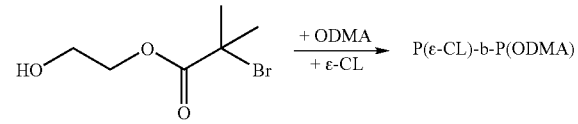

The catalyst for AROP of ε-caprolactone (CL) was tin(II) ethylhexanoate and the catalyst for ATRP of octadecyl methacrylate (ODMA) was CuCl/d-n-bipy. The polymer was characterized by NMR and proved simultaneous polymerization of each homopolymeric block occurred. The kinetics of this process was followed by GPC providing the MW and PDI of the copolymer and conversion of ODMA as the polymerization progressed. The kinetics of the polymerization of CL was obtained by using GC to follow the reaction.

Figure 6:
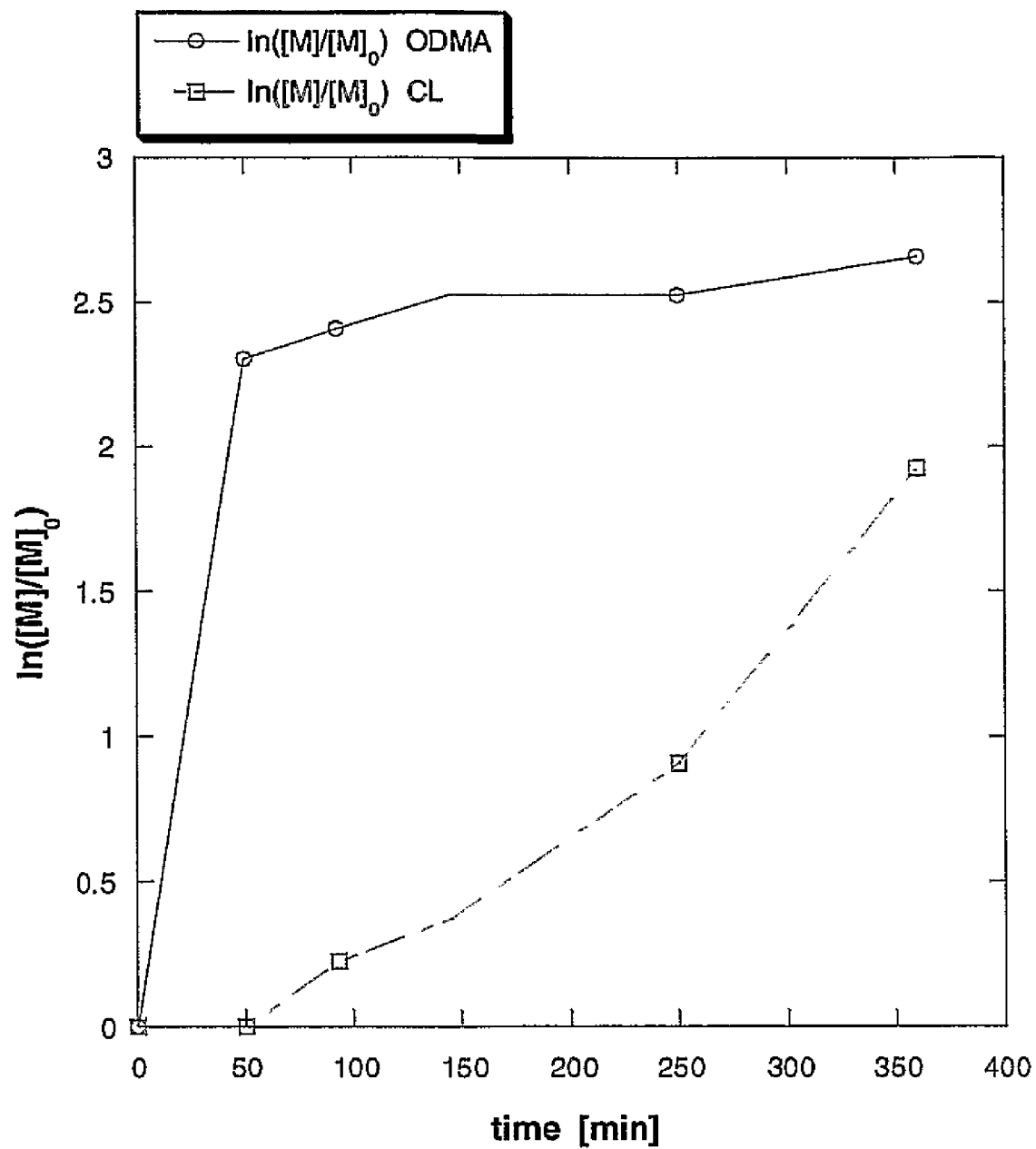
FIG. 6 is a graph of the kinetics of a one pot reaction dual mechanism copolymerization of caprolactone and octadecyl methacrylate.

The reaction conditions for the run, identified as WJ 70, were addition of ε-caprolactone (sufficient monomer to target a DP of 85) and octadecyl methyacrylate (sufficient monomer to target a DP of 30) to a Schlenk flask followed by toluene (same volume as ε-caprolactone), di-n-bpy (0.5 equivalents with respect to ODMA) and cuprous chloride (0.5 equivalents with respect to ODMA). The flask was purged of oxygen by bubbling with nitrogen then tin octanoate (3 equivalents with respect to ε-caprolactone) and hydroxylethyl 2-bromoisobutyrate (1 equivalent with respect to ODMA), were added. The reaction was immersed in an oil bath and stirred at 75° C. The results are presented in Table 1 and FIG. 6.

TABLE 1

| Results for Run WJ 70 | | | | |
|---|---|---|---|---|
| Time [min] | conv. ODMA | conv. CL | Mw | PDI |
| 0 | 0 | 0 | 0 | 0 |
| 50 | 0.902 | 0 | 16700 | 1.27 |

| Run | Sample | Stoichiometry | Conv. | $M_{n,th}$ (g/mol) | $M_{n,sec}$ (g/mol) | $M_w/M_n$ |
|---|---|---|---|---|---|---|
| ML143 | (PMA-Br)$_3$ | [MA]/[CuBr—PMDETA]/[TBiBPE] = 300/1/1 | 0.41 | 10,600 | 9,200 | 1.08 |
| ML144 | (PMA)$_3$-b-(PS)$_3$ | [St]/[ML143]/[CuBr$_2$—BPMODA]/[AIBN] = 300/1/0.6/0.375 | — | — | 30,100 | 1.32 |

TABLE 1-continued

Results for Run WJ 70

| Time [min] | conv. ODMA | conv. CL | Mw | PDI |
|---|---|---|---|---|
| 93 | 0.913 | 0.201 | 17900 | 1.30 |
| 145 | 0.921 | 0.309 | 20300 | 1.28 |
| 250 | 0.927 | 0.597 | 26700 | 1.25 |
| 360 | 0.934 | 0.853 | 27300 | 1.25 |
| 1020 | — | — | 28600 | 1.34 |

Polymerization of ODMA is much faster than the anionic ring opening polymerization of CL. After 50 min conversion of ODMA reached 90% when CL less than 5%. GPC of the copolymers showed regular increase in molecular weight and a low polydispersity for the resulting copolymer, PDI=1.34, however with a higher Mw=28600 then theoretical $M_{theory}$=20000 (for 100% of conversion of both monomers). This results from differences in the hydrodynamic volume of copolymer and PMMA, which was the standard employed for calibrating the GPC.

C4b. Addition of Cupric Complexes to Dual Mechanism Copolymerization. (Identification of Role of Tin Octanoate)

The conditions employed for this reaction were selected to try to slow down the ATRP of ODMA and accelerate AROP of CL. Since the rate of the ATRP process was faster than the AROP process copper(II) was added to the system in an effort to achieve the same rate of both ATRP and AROP. Run WJ 77, was run under the similar conditions to run WJ 70 except that 0.18 equivalents of cupric chloride and an additional 0.18 equivalents of di-n-bpy were added to the reaction, (these steps should reduce the rate of polymerization of ODMA by a factor of ten). Further, the reaction was heated to 90° C. to increase the rate of AROP of CL. These steps did not slow down the ATRP of ODMA. The opposite effect was observed; an acceleration of the ATRP polymerization occurred. The reason of this behavior is shown below:

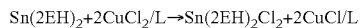

Sn(2EH)$_2$+2CuCl$_2$/L→Sn(2EH)$_2$Cl$_2$+2CuCl/L

Copper$^{(II)}$ may react with tin$^{(II)}$ catalyst and produce tin$^{(IV)}$ and copper$^{(I)}$ which will accelerate the polymerization of ODMA.

In reaction WJ 78 the same conditions as WJ 77 were employed but without initial addition of any tin$^{(II)}$ catalyst. The color of the solution changed from dark brown to green in 20 minutes. The reaction was continued for 20 h and as shown in Table 2 no polymerization occurred during this time. After this period of time tin catalyst was added and the color of the reaction solution immediately turned brown and polymerization took place. This is the best indication that a reaction between Sn$^{(II)}$ and Cu$^{(II)}$ occurred producing Sn$^{(IV)}$ and Cu$^{(I)}$ and that the Cu$^{(I)}$ can activate an ATRP.

TABLE 2

Results from Run WJ 78

| | Time [min] | conv. ODMA | conv. CL | Mw | PDI |
|---|---|---|---|---|---|
| | 0 | 0 | 0 | — | — |
| +tin catalyst | 20 | 0 | 0 | — | — |
| | 50 | 0 | 0 | — | — |
| | 160 | 0 | 0 | — | — |
| | 240 | 0 | 0 | — | — |
| | 1200 | — | — | 4600 | 1.12 |
| | 1350 | — | — | 19400 | 2.20 |

TABLE 2-continued

Results from Run WJ 78

| Time [min] | conv. ODMA | conv. CL | Mw | PDI |
|---|---|---|---|---|
| 1430 | — | — | 22500 | 1.87 |
| 1710 | — | — | 27800 | 1.61 |

Example 1

Figure 7:
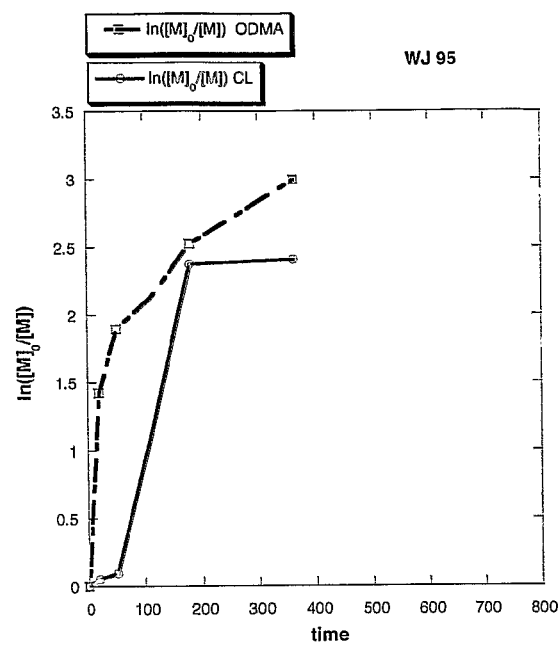
FIG. 7 is a graph of the kinetics of a one pot reaction dual mechanism copolymerization of caprolactone and octadecyl methacrylate starting from $Cu^{(II)}$ complex reduced in-situ with tin ocatanoate.

Simultaneous ATRP and AROP by Activation of a Cupric Halide Complex with Tin Octanoate The ATRP catalyst was added to the reaction only as the cupric complex. Run (WJ 95) Target DP for CL=95; Target DP for ODMA=30; Normal ATRP initiator hydroxyl ethyl 2-bromoisobutyrate (1 equivalent); CuCl$_2$ (0.15 equivalents); Ligand, di-n-bpy (0.15 equivalents); ROP catalyst tin(II) ethylhexanoate; Solvent toluene (1 equivalent to CL); Temperature 90° C. The results are shown in Table 3 and in FIGS. 7 and 8.

TABLE 3

Results from run WJ 95

| Time [min] | conv. ODMA | conv. CL | Mw | PDI |
|---|---|---|---|---|
| 0.0000 | 0 | 0 | 0.0000 | 0 |
| 20.000 | 0.76 | 0.05 | 13700 | 1.30 |
| 50.000 | 0.85 | 0.10 | 15700 | 1.30 |
| 110.00 | 0.88 | 0.66 | 22300 | 1.24 |
| 180.00 | 0.92 | 0.90 | 24200 | 1.24 |
| 360.00 | 0.95 | 0.91 | 24000 | 1.26 |

Figure 8:
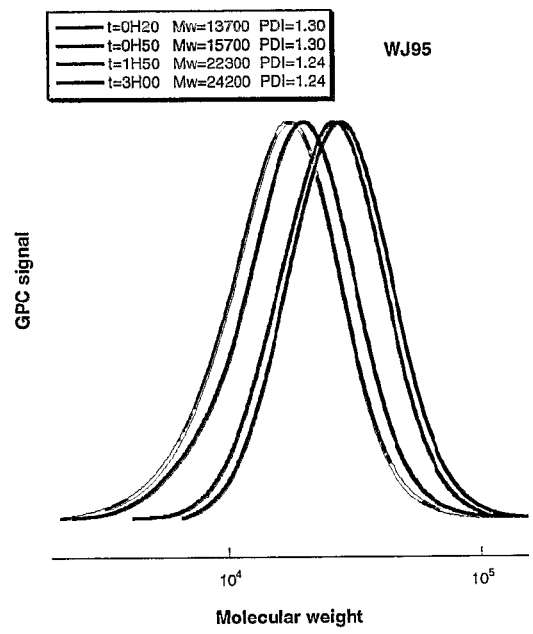
FIG. 8 is a graph of the GPC traces for simultaneous copolymerization of caprolactone and octadecyl methacrylate starting from $Cu^{(II)}$ complex reduced in-situ with tin ocatanoate.

It is clearly seen that polymerization of both monomers occurred and that the ATRP of ODMA occurred just as rapidly as in the first comparison run, WJ 70. The GPC traces in FIG. 8 show that a block copolymer with narrow molecular weight distribution was prepared; i.e., both polymerization mechanisms were well controlled. This indicates that tin octanoate acted to reduce a cupric halide complex to a Cu$^{(I)}$ state and that this in situ formed complex can activate an ATRP from an added alkylhalide initiator and that tin octanoate may also initiate the ROP of caprolactone.

Example 2

General Procedure for Activator Generated by Electron Transfer for ATRP of n-Butyl Acrylate TBriBPE initiator (25.1 mg, 3.3×10$^{-2}$ mmol) and CuBr$_2$ (22.2 mg, 9.9×10$^{-2}$ mmol) were added to a 25 mL Schlenk flask and the flask was thoroughly purged by vacuum then flushed with nitrogen. Nitrogen-purged nBA (5.0 ml, 35.1 mmol) was added via syringe followed by a purged solution of PMDETA (20.6 µl, 9.9×10$^{-2}$ mmol) in anisole. Sn(2EH)$_2$ (15.0 µl, 4.5×10$^{-2}$ mmol) was added and the mixture was stirred for 15 minutes in order to preform the CuBr/PMDETA complex. The flask was then transferred to a thermostated oil bath at 70° C., and the initial kinetic sample was taken. Samples were removed at different time intervals during polymerization, and conversion and molecular weights were determined by GC and GPC, respectively. The polymerization was stopped by opening the flask and exposing the catalyst to air.

The conditions and results for these reactions are shown in Table 4.

TABLE 4

Experimental conditions and properties of PnBA prepared by different ATRP methods[a]

| | ATRP method | TBriBPE/Cu(I)/Cu(II)/ PMDETA/AIBN/Sn2EH | Time (min) | Conv. (%) | $M_{n,\,theo}$[b] | $M_{n,\,GPC}$ | $M_w/M_n$ |
|---|---|---|---|---|---|---|---|
| 1 | Normal | 1/3/0.3/3/—/— | 1147 | 88 | 118800 | 131400 | 1.10 |
| 2 | SR&NI | 1/—/3/3/1.6/— | 1170 | 81 | 109350 | 43700 | 1.45 |
| 3 | AGET | 1/—/3/3/—/1.4 | 1150 | 63 | 85050 | 86500 | 1.09 |

[a][nBA]$_0$/[TBriBPE]$_0$ = 1050; [nBA]$_0$ = 7.01 M; T = 70° C., anisole used as a GC standard;
[b]$M_{n,\,theo}$ = ([M]$_0$/[EtBrIB]$_0$) × conversion A trifunctional initiator, TBriBPE was used in each case to clearly show the presence of any non-functionalized homopolymers in a GPC analysis of the products. During normal ATRP (Table 4, entry 1), the reaction was well controlled and low polydispersity index, PDI, was achieved ($M_w/M_n$=1.1). GPC traces for the polymers formed when nBA was polymerized using SR&NI ATRP with AIBN (Table 4, entry 2) showed a clear bimodal distribution. The low molecular weight peak is due to the presence of linear homopolymer originally from AIBN and the high molecular weight peak is attributed to tri-arm star polymer. In the next reaction (Table 4, entry 3) the same conditions were used but AIBN was replaced by Sn(2EH)$_2$ creating the conditions for a AGET ATRP. The result is that a pure star polymer was obtained without any linear polymer by-product. The reaction was well controlled and a low PDI (1.09) was achieved. It can be concluded that the Cu$^{(II)}$ complex added to the reaction mixture was efficiently reduced to Cu$^{(I)}$ by reaction with tin$^{(II)}$ octanoate essentially in a non-radical, or non-initiator forming, process.

The broad applicability of the process to a range of monomers in bulk copolymerizations is now further exemplified.

Example 3

AGET ATRP of Styrene

Styrene (5 ml, 43.6 mmol), CuCl$_2$ (29.3 mg, 21.8×10$^{-2}$ mmol) and dNbipy (178.2 mg, 43.6×10$^{-2}$ mmol) were placed in a 25 mL Schlenk flask and bubbled with nitrogen for 15 min. Sn(2EH)$_2$ (31.8 µl, 9.8×10$^{-2}$ mmol), and a purged solution of EtBrIB (29.7 µl, 20.3×10$^{-2}$ mmol) in toluene were added, and the sealed flask was placed in thermostated oil bath at 110° C. The polymerization was stopped by opening the flask and exposing the catalyst to air.

The conditions and results for normal and AGET ATRP are shown in Table 5. All reactions were well controlled with experimental molecular weights being close to theoretical values. However, a slightly higher PDI (1.37) was observed for an AGET ATRP when the amount of Cu$^{(II)}$ vs. initiator was 1:1 (Table 5, entry 2) although the final GPC traces remained monomodal. Decreasing the ratio of Cu$^{(II)}$/initiator to 0.3 in AGET ATRP (Table 5, entry 3) resulted in controlled reaction and a final polymer with lower PDI (1.22)

TABLE 5

Experimental conditions and properties of PS prepared by different ATRP methods[a]

| | ATRP method | EtBrIB/Cu(I)/Cu(II)/ dNbipy/Sn2EH | Time (min) | Conv. (%) | $M_{n,\,theo}$[b] | $M_{n,\,GPC}$ | $M_w/M_n$ |
|---|---|---|---|---|---|---|---|
| 1 | Normal | 1/1/—/2/— | 1580 | 95 | 19000 | 15600 | 1.27 |
| 2 | AGET | 1/—/1/2/0.45 | 420 | 83 | 17200 | 14000 | 1.37 |
| 3 | AGET | 1/—/0.4/0.8/0.18 | 420 | 64 | 12800 | 8500 | 1.22 |

[a][St]$_0$/[EtBrIB]$_0$ = 200; [St]$_0$ = 8.72 M; T = 110° C., toluene used as a GC standard;
[b]$M_{n,\,theo}$ = ([M]$_0$/[EtBrIB]$_0$) × conversion Example 4

AGET ATRP of Octadecyl Methacrylate

The same procedure was applied for the polymerization of octadecyl methacrylate except that a temperature of T=60° C. was employed. In this series of examples the amounts of reducing agent was varied to define conditions for optimum control of the polymerization. In the case of the AGET ATRP dNbpy/CuCl$_2$ was added to the reaction as the precursor of active complex and EtBrIB was added as the initiator. The conditions and results of these polymerizations are shown in Table 6.

TABLE 6

Experimental conditions and properties of
PODMA prepared by different ATRP methods[a]

| | ATRP method | EtBrIB/Cu(I)/Cu(II)/ dNbipy/Sn2EH | Time (min) | Conv. (%) | $M_{n, theo}$[b] | $M_{n, GPC}$ | $M_w/M_n$ |
|---|---|---|---|---|---|---|---|
| 1 | Normal | 1/1/0.05/2/— | 1080 | 95 | 19000 | 19600 | 1.23 |
| 2 | AGET | 1/—/1/2/2 | 1020 | 92 | 18400 | 18300 | 1.45 |
| 3 | AGET | 1/—/1/2/0.9 | 1125 | 98 | 19600 | 22800 | 1.34 |
| 4 | AGET | 1/—/1/2/0.45 | 1100 | 66 | 13200 | 13800 | 1.10 |
| 5 | Sn2EH alone | 1/—/—/—/0.45 | 960 | 11 | 2200 | 3100000 | 1.5 |

[a] $[ODMA]_0/[EtBrIB]_0 = 60$; $[ODMA]_0 = 0.85$ M; T = 60° C., in toluene (2 volume equivalent vs. monomer);
[b] $M_{n, theo} = ([M]_0/[EtBrIB]_0) \times$ conversion During normal ATRP (Table 6, entry 1), the reaction was well controlled, as evidenced by the GPC traces being monomodal and a polymer with a low polydispersity was formed, (PDI=1.2). Next, ODMA was polymerized using AGET ATRP. The amount of reducing agent, $Sn(2EH)_2$, was varied from 2:1, 0.9:1 and 0.45:1 equivalents versus $Cu^{(II)}$. The best result was obtained when 0.45 equivalents of $Sn(2EH)_2$ was used (Table 6, entry 4). In this case, assuming that the equilibrium represented by Scheme 3 is strongly shifted to the products, but not all of the $Cu^{(II)}$ will be reduced to $Cu^{(I)}$ and as a result of the remaining fraction of $Cu^{(II)}$ (~10%) provides better control over the reaction. In all reactions polymers with monomodal molecular weight distributions were observed.

Thus ATRP, of ODMA was attempted in the presence of EtBrIB and $Sn(Oct)_2$, alone, without any Cu species (Table 6, entry 5). Very low conversion (11%) and extremely low initiator efficiency was observed (0.07%). The very high molecular weight of PODMA suggests that although $Sn(2EH)_2$ is a reducing agent for Cu species it is a poor ATRP catalyst. This indicates that the reduction plausibly occurs via outer sphere electron transfer rather than via inner sphere electron transfer (i.e., halogen atom transfer).

Example 5

AGET ATRP of Methyl Methacrylate

MMA (4 ml, 37.3 mmol) and $CuCl_2$ (25.2 mg, $18.7 \times 10^{-2}$ mmol) were added to a 25 mL Schlenk flask and the mixture was bubbled with nitrogen for 15 min. A purged solution of PMDETA (39.1 µl, $18.7 \times 10^{-2}$ mmol) in anisole was added, and the mixture was stirred. $Sn(2EH)_2$ (36.9 µl, $11.4 \times 10^{-2}$ mmol) and a purged solution of EtBrIB (27.4 µl, $18.7 \times 10^{-2}$ mmol) in anisole were added, and the sealed flask was heated in thermostated oil bath at 90° C. The polymerization was stopped by opening the flask and exposing the catalyst to air.

MMA was polymerized by normal and AGET ATRP employing different initiator to $Cu^{(II)}$ ratios. In this case PMDETA/$CuCl_2$ was used as the precursor of the active complex and EtBrIB as the initiator. The conditions and results for the reactions are shown in Table 7.

TABLE 7

Experimental conditions and properties of
PMMA prepared by different ATRP methods[a]

| | ATRP method | EtBrIB/Cu(I)/Cu(II)/ PMDETA/Sn2EH | Time (min) | Conv. (%) | $M_{n, theo}$[b] | $M_{n, GPC}$ | $M_w/M_n$ |
|---|---|---|---|---|---|---|---|
| 1 | Normal | 1/1/—/1/— | 180 | 88 | 17600 | 27000 | 1.29 |
| 2 | AGET | 1/—/1/1/2 | 70 | 77 | 15400 | 23000 | 1.99 |
| 3 | AGET | 1/—/1/1/0.45 | 145 | 79 | 15800 | 23000 | 1.45 |
| 4 | AGET | 1/—/0.4/0.4/0.18 | 360 | 78 | 15600 | 14200 | 1.10 |
| 5 | AGET | 1/—/0.2/0.2/0.09 | 360 | 52 | 10400 | 9600 | 1.12 |

[a] $[MMA]_0/[EtBrIB]_0 = 200$; $[MMA]_0 = 6.22$ M; T = 90° C., in anisole (0.5 volume equivalent vs. monomer);
[b] $M_{n, theo} = ([M]_0/[EtBrIB]_0) \times$ conversion During normal ATRP (Table 7, entry 1), the reaction was well controlled as evidenced by the monomodal molecular weight distribution and low PDI (1.34). The amounts of $Sn(2EH)_2$ used in the AGET ATRP were 2.00 and 0.45 equivalents versus $Cu^{(II)}$. Similar to the polymerization of ODMA, better results were obtained when 0.45 equivalents of $Sn(2EH)_2$ were used; however the final polymer synthesized using AGET ATRP had a higher PDI than the polymer synthesized using normal ATRP. Nonetheless, the polymerizations were controlled as evidenced by the evolution of the monomodal GPC traces for AGET ATRP of MMA. In the next reactions (Table 7, entries 4 and 5) the amount of $Cu^{(II)}$ was decreased from 1 to 0.4 and 0.2 equivalents versus initiator, since Cu(I)/PMDETA is a relatively active catalyst for (meth)acrylates. In both cases better results were obtained, monomodal molecular weight distribution and low PDI (1.10 and 1.12) were observed.

This demonstrates that concentration of the reducing agent/catalyst precursor, here Sn/$Cu^{(II)}$, can be varied independently of the concentration of the added ATRP initiator to optimize the control of the reaction.

Example 6

AGET ATRP of Methyl Acrylate

The same procedure was applied for polymerization of methyl acrylate except that Me$_6$TREN was used as ligand, toluene as solvent, and the temperature was held at 25° C. MA was also polymerized by both normal and AGET ATRP, the conditions used for the reactions and the results are shown in Table 8.

TABLE 8

Experimental conditions and properties of PMA prepared by different ATRP methods[a]

| | ATRP method | EtBrIB/Cu(I)/Cu(II)/ Me$_6$TREN/Sn2EH | Time (min) | Conv. (%) | $M_{n, theo}$[b] | $M_{n, GPC}$ | $M_w/M_n$ |
|---|---|---|---|---|---|---|---|
| 1 | Normal | 1/1/0/1/— | 1110 | 96 | 19200 | 18000 | 1.30 |
| 2 | AGET | 1/—/1/1/0.45 | 2760 | 61 | 12100 | 13100 | 1.16 |

[a] [MA]$_0$/[EtBrIB]$_0$ = 230; [MA]$_0$ = 5.37 M; T = 25° C., in toluene (1 volume equivalent vs. monomer);
[b] $M_{n, theo}$ = ([M]$_0$/[EtBrIB]$_0$) × conversion The results and the kinetic plot for the reactions show that the normal ATRP was faster than the AGET ATRP. This is plausibly due to incomplete reduction of Cu$^{(II)}$ to Cu$^{(I)}$. The remaining Cu$^{(II)}$ slows down the reaction due to an increased rate of deactivation, and the final rate of the AGET polymerization is lower than the normal ATRP, where Cu$^{(I)}$ was employed initially.

To ensure the slower rate of polymerization was not due to interaction of Sn(2EH)$_2$ with the monomer or growing polymer chain end, two conventional radical polymerization were performed, one with and one without Sn(2EH)$_2$. The rates of both polymerizations were the same, indicating that AGET ATRP was slower than normal ATRP plausibly due to the difference in the concentration of Cu$^{(II)}$ for each system with the result that the AGET ATRP was better controlled and the final polymer had a lower PDI (M$_w$/M$_n$), due to efficient deactivation of growing species by Cu$^{(II)}$ retained in the reaction though appropriate selection of the molar ratio of reducing agent to transition metal complex. The GPC traces showed monomodal distributions of molecular weights.

These results are in agreement with the preceding studies of ATRP of MA in the presence of Me$_6$TREN. The Me$_6$TREN ligand generates one of the most reducing copper complexes, i.e., one of the most active catalyst systems, and Sn(2EH)$_2$ plausibly cannot reduce it completely to the Cu$^{(I)}$ state, therefore some Cu$^{(II)}$ remains in the system and results in a more controlled polymerization. This is important since overall control always depends on deactivation rate, i.e., on [Cu$^{(II)}$] and sufficient Cu$^{(II)}$ must always be present to provide control. This can be explained in the following series of equations.

Consider the equilibrium:

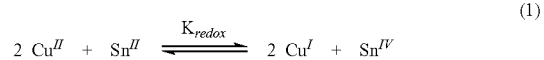

$$2\ Cu^{II} + Sn^{II} \xrightleftharpoons{K_{redox}} 2\ Cu^{I} + Sn^{IV} \qquad (1)$$

The equilibrium constant is defined as $$K_{redox} = \frac{[Sn^{IV}][Cu^{I}]^2}{[Sn^{II}][Cu^{II}]^2} \qquad (2)$$

The mass balance equations are $$[Sn]_{tot} = [Sn^{II}] + [Sn^{IV}] \qquad (3)$$

$$[Cu]_{tot} = [Cu^{I}] + [Cu^{II}] \qquad (4)$$

Combining equations (2), (3), and (4) yields expressions for the amounts of [Cu$^I$] and [Cu$^{II}$] present at the system at equilibrium $$[Cu^{I}] = \frac{[Cu]_{tot}\sqrt{\frac{K_{redox}[Sn^{II}]}{[Sn]_{tot} - [Sn^{II}]}}}{1 + \sqrt{\frac{K_{redox}[Sn^{II}]}{[Sn]_{tot} - [Sn^{II}]}}} \qquad (5)$$

$$[Cu^{II}] = \frac{[Cu]_{tot}}{1 + \sqrt{\frac{K_{redox}[Sn^{II}]}{[Sn]_{tot} - [Sn^{II}]}}} \qquad (6)$$

If, in order to achieve well-controlled polymerization, the amount of Cu$^{(II)}$ necessary to be present in the system is x[Cu]$_{tot}$ (x is a molar fraction), one can calculate the fraction of the reduced form of the reducing agent after the equilibrium is reached by:

$$\frac{[Sn^{II}]}{[Sn]_{tot}} = \frac{(1-x)^2}{K_{redox}x^2 + (1-x)^2} \qquad (7)$$

Figure 9:
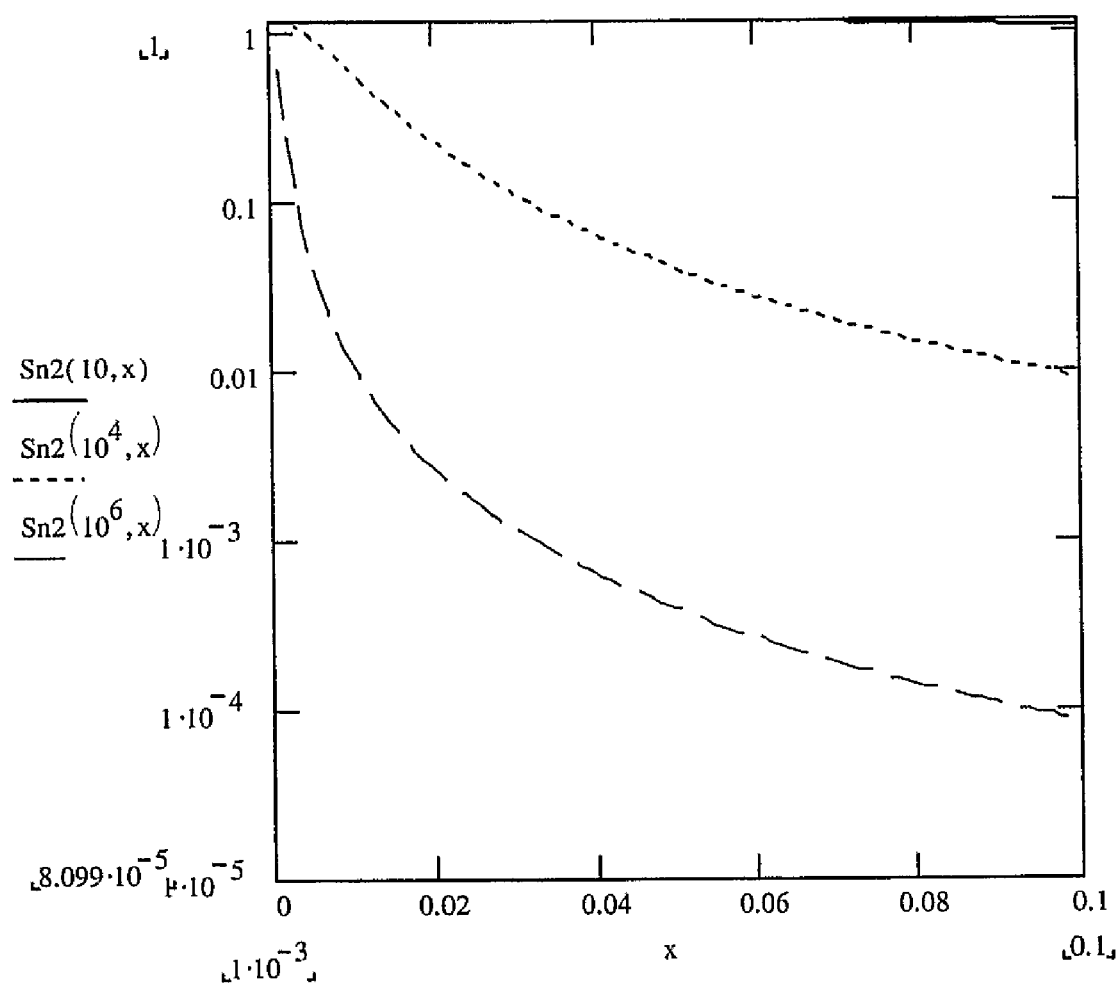
FIG. 9 is a graph of the dependence of the fraction of $Sn^{II}$ present at equilibrium in order to reach an equilibrium value of $[Cu^{II}]$ equal to $x[Cu]_{tot}$ for several values of the equilibrium constant $K_{redox}$.

The dependence (7) is presented in FIG. 9 for three different values of the redox equilibrium constant. The fraction of Sn$^{(II)}$ remaining after the equilibrium has been established varies with equilibrium value of Cu$^{(II)}$ for several values of K$_{REDOX}$, the latter depends strongly upon the ligands complexed to the copper ions as well as the nature of the solvent/monomer.

In summary, the amount of catalyst can be very small, according to ATRP rate law, the ratio of activator to deactivator is proportional to the rate of polymerization.

The concentration of deactivator, $Cu^{II}$, desired to control the reaction is represented by the following formula:

$$DP_w/DP_n = 1 + 1/DP_n + \frac{k_p[R-X]_o}{k_d[X-Cu^{II}]} \cdot \left(\frac{2}{p} - 1\right).$$

As such, for a polymerization of MMA with a Mn~100,000 and PDI~1.2 and approximately 90% conversion using $Me_6TREN/CuBr_2$ with kd~107 M−1s−1 and kp~2 103 M−1s−1 at 90° C., the amount of deactivator is estimated at only 5 $10^{-6}$ M (1 ppm) of $Cu^{II}$.

For a polymerization of nBA with a Mn~100,000, PDI~1.2 and approximately 90% conversion using $Me_6TREN/CuBr_2$ with kd~108 M−1s−1 and kp~5 104 M−1s−1 at 90° C., the amount of deactivator is estimated at only $10^{-5}$ M (2 ppm) of $Cu^{II}$.

By the same calculation, for the polymerization of Mn~20,000 for poly(MMA), approximately 5 ppm of $Cu^{II}$ is required, and for poly(BA), approximately 10 ppm of $Cu^{II}$ is needed.

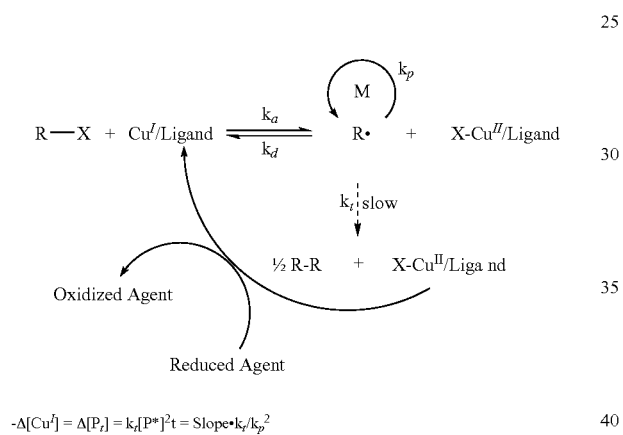

For ascorbic acid, or vitamin C, the following Scheme 7 shows the chemistry involved in the reduction and shows that the oxidized agent does not contain any functional groups that could initiate an ATRP reaction.

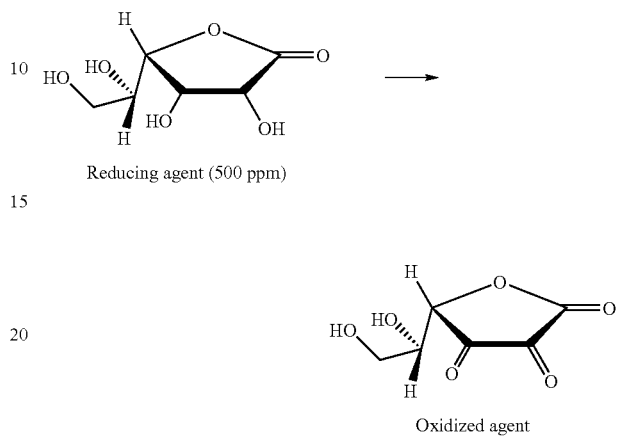

Scheme 7. Reduction of ascorbic acid.

Example 7

ARGET ATRP of MMA

A series of runs were made with low concentrations of copper complexes formed with ligands that form strongly reducing complexes, PMDETA and $Me_6TREN$. $Sn(2EH)_2$ was used as a reducing agent since it has been shown that it can efficiently reduce $Cu^{(II)}$ to $Cu^{(I)}$ (Scheme 3) to compensate for generation of $CU^{II}$ by termination reactions and generate active catalyst. The molar ratio of transition metal catalyst to the ATRP initiator was varied from 0.1 to 0.001 (5 ppm). In these experiments, the ratio of reducing agent to initiator was kept constant at 0.1. Results are shown in Table 9.

TABLE 9

| Label | EtBrIB | $CuCl_2$ | Ligand | $Sn(2EH)_2$ | Time (min) | Conv. (%) | $M_{n,theo}$[b] | $M_{n,GPC}$ | $M_w/M_n$ |
|---|---|---|---|---|---|---|---|---|---|
| WJ-02-86 | 1 | 0.1 | PMDETA | 0.1 | 0.1 | 360 | 34 | 6800 | 8600 | 1.22 |
| WJ-02-87 | 1 | 0.01 | | 0.01 | 0.1 | 180 | 70 | 14100 | 47900 | 1.47 |
| WJ-02-88 | 1 | 0.001 | | 0.001 | 0.1 | 210 | 67 | 13400 | 48800 | 1.41 |
| WJ-02-89 | 1 | 0.1 | $Me_6TREN$ | 0.1 | 0.1 | 530 | 24 | 4800 | 9600 | 1.21 |
| WJ-02-90 | 1 | 0.01 | | 0.01 | 0.1 | 505 | 50 | 1010 | 20600 | 1.36 |
| WJ-02-91 | 1 | 0.001 | | 0.001 | 0.1 | 480 | 25 | 4700 | 33200 | 1.46 |
| WJ-02-92 | 1 | — | | — | 0.1 | 420 | 30 | 6100 | 1060000 | 2.10 |

Conditions for the reactions
[a][MMA]$_0$/[EtBrIB]$_0$ = 200; [MMA]$_0$ = 6.22 M; T = 90° C., in anisole (0.5 volume equivalent vs. monomer);
[b]$M_{n,theo}$ = ([M]$_0$/[EtBrIB]$_0$) × conversion 7a. ATRP of MMA Using Low Concentrations of CuCl$_2$/PMDETA Catalyst Complex Ratio of reagents: [MMA]$_0$/[EtBrIB]$_0$=200; [MMA]$_0$= 6.22 M; T=90° C., in anisole (0.5 volume equivalent vs. monomer).

Figure 10A:
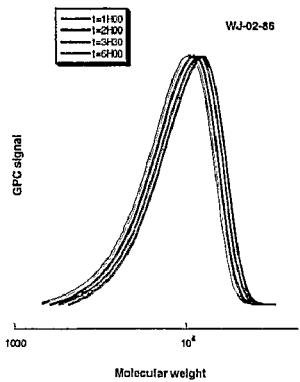
FIGS. 10a-g are graphs of the GPC traces for a series of polymers prepared with using low levels of transition metal in an ARGET ATRP.
Figure 10B:
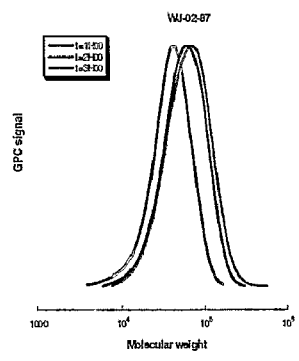
Figure 10C:
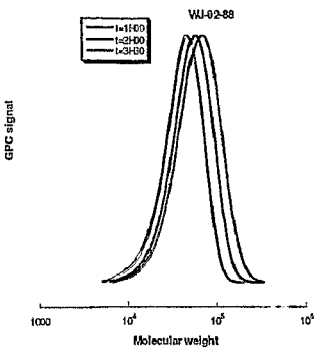

The kinetic plots from this series of experiments showed that the rate of polymerization was the lowest for reaction with the ratio of ATRP initiator: copper (Ini:Cu) of 0.1 (WJ-02-86). The reaction slowed down after 30 min at 25% of conversion. The probable cause for this early termination of the polymerization reaction was that the amount of Sn(2EH)$_2$ was too small to both reduce the Cu$^{(II)}$ to Cu$^{(I)}$ and start the reaction and still regenerate Cu$^{(II)}$ formed due to termination reactions. After 30 minutes, the amount of Cu$^{(II)}$ in the system became too high and the reaction slowed down, although molecular weights were close to the theoretical ones and polymer with low PDI was obtained (1.2). In next two experiments (WJ-02-87, 88), the amount of copper was decreased to Ini:Cu of 0.01 and 1:0.001. Both reactions were faster then the previous one and the molecular weight cleanly shifted to higher molecular weight as the reaction progressed. (See FIGS. 10a-10c)

Sn(Oct)$_2$ may slowly activate a polymerization reaction by removal of the transferable atom or group from the initiator, but the reaction is uncontrolled. The presence of a catalyst provides a deactivator.

7b. ATRP of MMA Using CuCl$_2$/Me$_6$TREN Catalyst Complex.

Figure 10D:
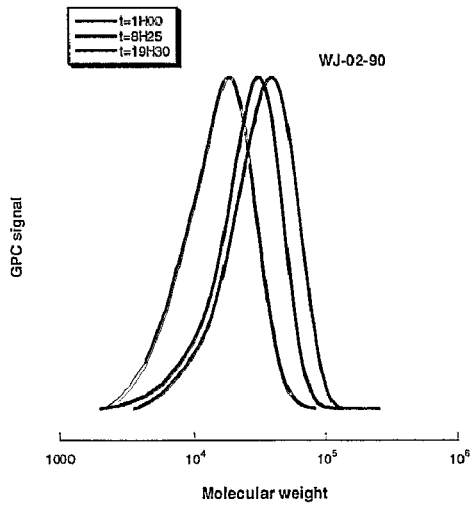
Figure 10E:
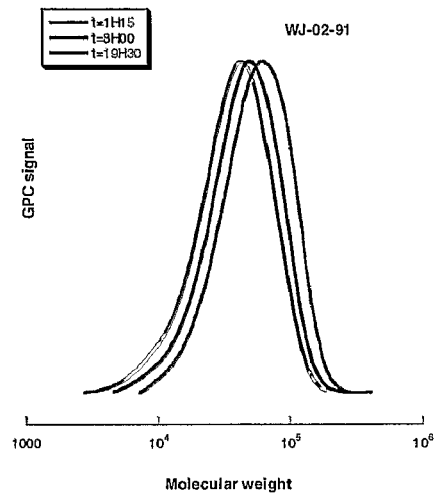

The reactions (WJ-02-89, 90, 91) were slightly slower and again the molecular weight of the polymers formed cleanly shifted to higher values with conversion, FIGS. 10d and 10e show the increase in molecular weight for experiments employing the lower concentrations of copper complex. (I.e., 35 ppm and 3.5 ppm Cu in the reaction)

In both series of experiments, the molecular weights were higher than the theoretical values and a larger PDI (>1.4) was observed. This could be attributed to the high concentration of initiator relative to the amount of deactivator present in the initial stages of the reaction. This can be resolved for this particular activator/reactivator system by targeting higher degrees of polymerization or by providing an additional reducing agent that has a lower reducing capability than Sn(2EH)$_2$ for the continuous regeneration of the active catalyst complex. Preferably, but not necessarily reducing the deactivator complex at a rate generally equivalent to termination reactions. I.e., retaining an approximately constant ratio of Cu$^{(I)}$ to Cu$^{(II)}$.

7c. ATRP of MMA Using CuCl$_2$/dNBPY Catalyst Complex.

Figure 10F:
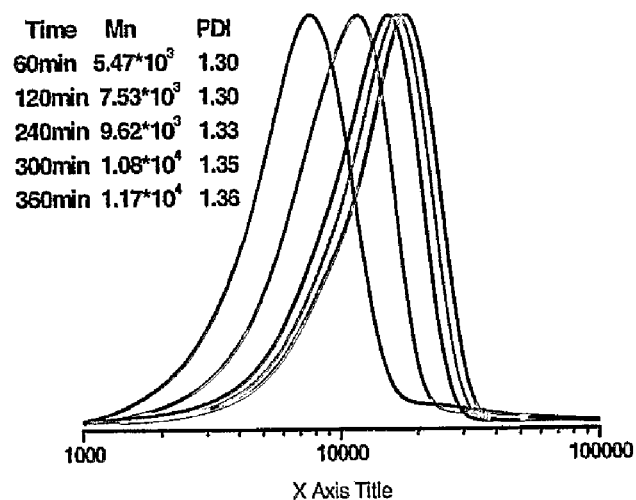
Figure 10G:
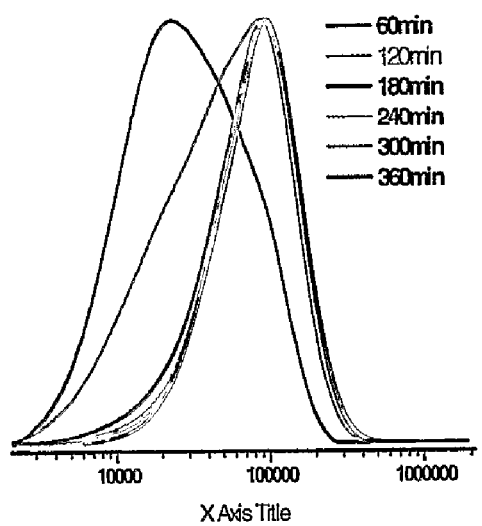

Two experiments were conducted with lower levels of copper$^{(II)}$ complex activated by excess reducing agent using dNBPY as ligand. When the ratio of Cu$^{(II)}$ to Sn$^{(II)}$ was 1:1 the reaction was very well controlled (FIG. 11) with a clean shift of GPC traces to higher values as monomer conversion increased and the molecular weight of the polymer was close to the theoretical values. (FIG. 10f) When the ratio was decreased to 1:100 molecular weight increased with conversion and there was a shift in MW with conversion however there was an indication of either slow activation of the initiator or slow deactivation of the growing polymer chain (FIG. 10g)

7d. ATRP of BA Using CuCl$_2$/dNBPY Catalyst Complex Activated with Ascorbic Acid-6-palmamite (AGP).

A6P is a reducing agent with a structure similar to that of ascorbic acid, but with different solubility characteristics. A6P was partially soluble in anisole at room temperature; however, at the temperature of the experiment, 90° C., A6P seemed to dissolve. The reaction didn't change color until several hours later because A6P is a weaker, or more slowly reducing, agent than ascorbic acid or Sn(2EH)$_2$. When A6P was added with a ratio 0.1:0.1 to Cu$^{(II)}$ as compared to added initiator, no conversion was detected after 12 hours which would indicate very slow reduction of the copper complex. When the ratio was 0.1:0.01, the reaction slowly proceeded to a very low conversion. When the ratio was 0.1:0.001, the reaction progressed relatively fast, but from the molecular weight evolution there was still evidence of slow initiation resulting in broad polydispersity.

7e. ATRP of St Using CuCl$_2$/Me$_6$TREN Catalyst Complex in the Presence of Excess Ligand.

A series of styrene polymerizations was conducted with different molar ratios of copper to tin and different ratios of copper to Me$_6$TREN. The results are presented in Table 10. At a mole ratio of CuCl$_2$:Me$_6$TREN:Sn(2EH)$_2$ of 1:1:1, the reaction was well controlled, and conversion reached 67% over a period of 17 hours. However, when the mole ratio was changed to 0.1 to 0.1 to 1 (i.e., a much lower concentration of copper), the reaction appeared to be cationic in nature, and oligomers were produced, but the addition of excess ligand with respect to copper resulted in a return to a controlled radical polymerization process. When there was a twofold excess of ligand; ratio 0.1:0.3:1, the reaction was controlled, and when a greater excess of ligand was present; ratio 0.1:1.1:1, the reaction was not only controlled but was faster than the first run, with ten times as much copper, and reached 59% conversion in 7.6 hours. In runs WJ-03-05, 07, and 08, the GPC curves showed clean shift to higher molecular weight as the reaction progressed, and the kinetics of conversion were linear over time.

TABLE 10

| Label | EtBrIB | CuCl$_2$ | Ligand | Sn(2EH)$_2$ | Time (min) | Conv. (%) | $M_{n, theo}$[b] | $M_{n, GPC}$ | $M_w/M_n$ |
|---|---|---|---|---|---|---|---|---|---|
| WJ-03-05 | 1 | 0.1 | Me$_6$TREN 0.1 | 0.1 | 1020 | 67 | 13950 | 17000 | 1.12 |
| WJ-03-06 | 1 | 0.01 | | 0.01 | 0.1 | 1000 | 44 | 9200 | — | — |
| WJ-03-07 | 1 | 0.01 | | 0.03 | 0.1 | 460 | 34 | 7100 | 6900 | 1.20 |
| WJ-03-08 | 1 | 0.01 | | 0.11 | 0.1 | 460 | 59 | 12300 | 12700 | 1.11 |

[a][St]$_0$/[EtBrIB]$_0$ = 200; [St]$_0$ = 5.82 M; T = 110° C., in anisole (0.5 volume equivalent vs. monomer);

[b]$M_{n, theo}$ = ([M]$_0$/[EtBrIB]$_0$) × conversion.

Example 8

Synthesis of Block Copolymers

8a. PODMA-b-PMMA by AGET ATRP.

Two sequential AGET ATRP's were used in the two step synthesis of block copolymer Poly(ODMA-b-MMA). First, the Poly(ODMA) block was prepared using AGET ATRP as in example 4 and used as a macroinitiator for the subsequent polymerization of MMA. The Poly(ODMA) macroinitiator (Mw=13800, PDI=1.10) (3 g, 0.22 mmol) and $CuCl_2$ (31.0 mg, $7.3 \times 10^{-5}$ mol) were added to a 25 mL Schlenk flask then dissolved in monomer (MMA, 9.4 g, 0.09 mol) and bubbled with nitrogen for 15 minutes. A purged solution of PMDETA (48.0 µl, 0.23 mmol) in toluene (5 ml) was added, and the mixture was stirred. $Sn(2EH)_2$ (34.0 µl, 0.10 mmol) in toluene (4 ml) was then added, and an initial sample was taken. The flask was then placed in a thermostated oil bath at 90° C. and stirred. The polymerization was stopped by opening the flask and exposing the catalyst to air. Chain extension with MMA using AGET ATRP was very efficient and after a reaction time of 120 minutes the GPC traces from the final block copolymer were monomodal with a molecular weight of 37200 and a PDI of 1.09.

8b. Three-Armed Star Block Copolymers.

Figure 11:
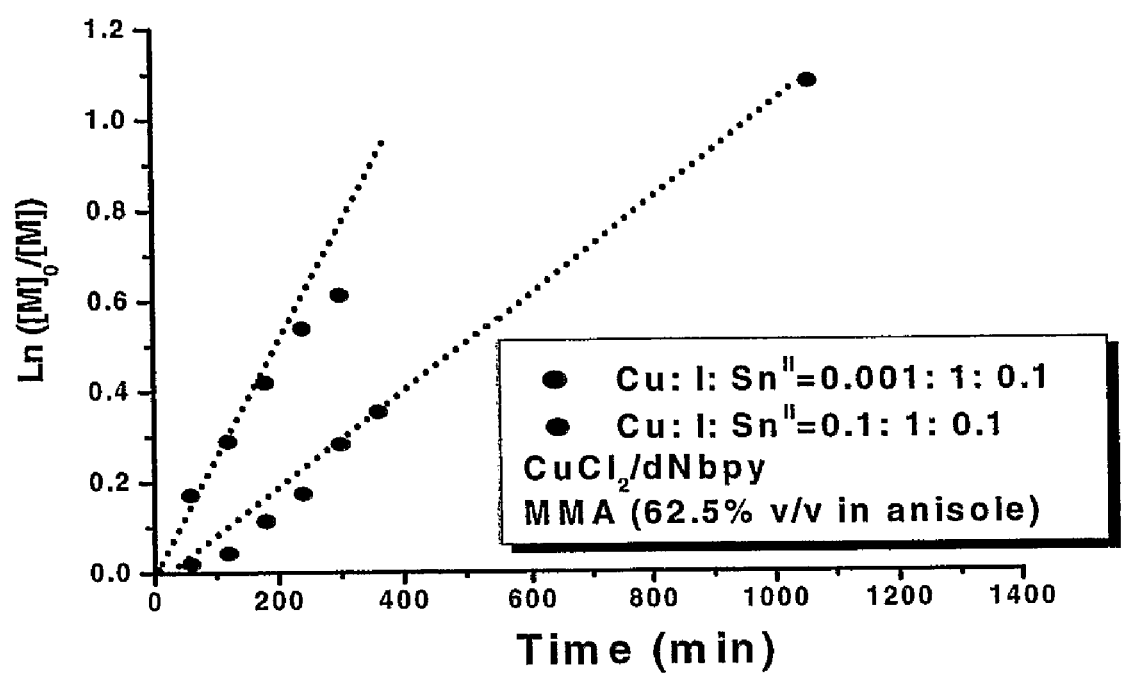
FIG. 11 is a graph of the kinetic plots for polymerization of MMA using low concentration of catalyst.
Figures 12A, 12B:
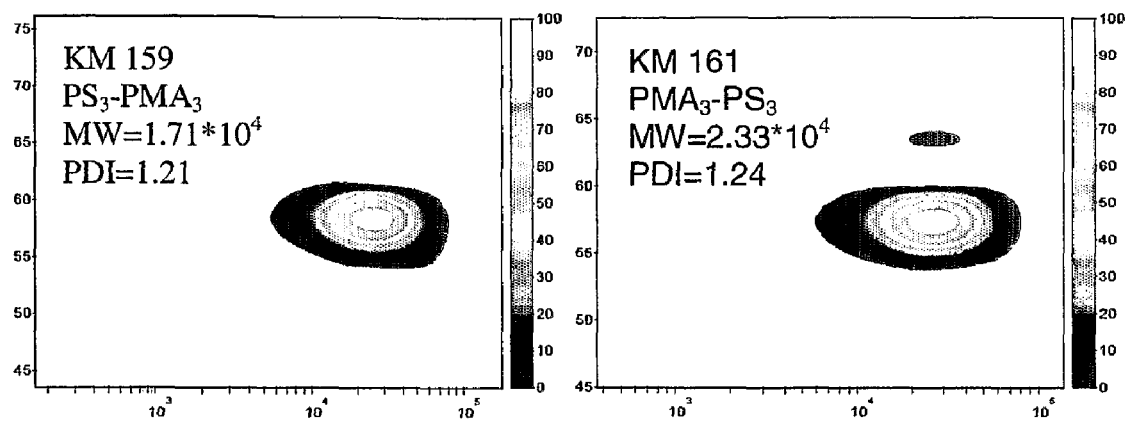
FIG. 12 is a 2D chromatographic characterization of a star copolymer comprising blocks of methyl acrylate and styrene produced in a AGET ATRP with $Sn(2EH)_2$ as a reducing agent.

$Sn(2EH)_2$ was employed to activate the catalyst complex for the preparation of linear and star-shaped block copolymers. The star-shaped copolymers were prepared from the core of two different three-armed macroinitiators, one comprising Poly(MA-Br)$_3$ (KM 159) and one Poly(St-Br)$_3$ (KM 161). Using GPC to follow the kinetics or the chain extension reaction showed a clean shift of molecular weight to higher molecular weight as conversion increased. 2D chromatography was selected as an appropriate tool to analyze the true molecular weight of star block copolymers (FIG. 11). The products of the chain extension reactions were shown to be essentially pure, although the occurrence of some thermal self-initiated styrene polymerization is evident in the 2D chromatogram for run KM 161 (FIG. 12b).

AGET ATRP in Mini-Emulsion

Comparison 5: SR&NI in a Mini-Emulsion System.

The radical deactivator ($CuBr_2$ and ligand), monomer, and costablizer (hexadecane) were charged in a round-bottom flask, and heated with magnetic stirring at 60° C. for 10-20 minutes to form a homogenous solution. After cooling down to room temperature, AIBN was charged with stirring. The surfactant solution was added and the mixture was ultrasonified (Heat Systems Ultrasonics W-385 sonicator; output control at 8 and duty cycle at 70% for 1 minutes) in an ice bath to prevent a significant temperature rise resulting from sonification. After homogenization, the miniemulsion was transferred to a 25 ml Schlenk flask, where pure argon was bubbled through the miniemulsion for 30 minutes before it was immersed in an oil bath thermostated at 80° C. The magnetic stirring speed was set at 700 rpm. Time zero of the polymerization was marked when the Schlenk flask was immersed in the oil bath. Samples were withdrawn periodically via pre-degassed syringe to monitor the monomer conversion, copolymer composition and molecular weight.

Conditions for the synthesis of water-borne 3-arm poly(n-butyl acrylate) in a miniemulsion system via a simultaneous reverse and normal initiation in ATRP process are shown below.

| Run | Sample | Stoichiometry | Conv. | $M_{n,th}$ (g/mol) | $M_{n,sec}$ (g/mol) | $M_w/M_n$ |
|---|---|---|---|---|---|---|
| ML145* | (PMA)$_3$-b-(PS)$_3$ | [St]/[ML143]/[CuBr$_2$—BPMODA]/[AIBN] = 300/1/0.6/0.375 | 0.93 | 27,300 | 22,100 | 1.37 |

Miniemulsion system: [Brij 98]/[hexadecane]=2.3/3.6 wt % based on monomer; solid content=20% (based on 100% conversion).

Figure 2:
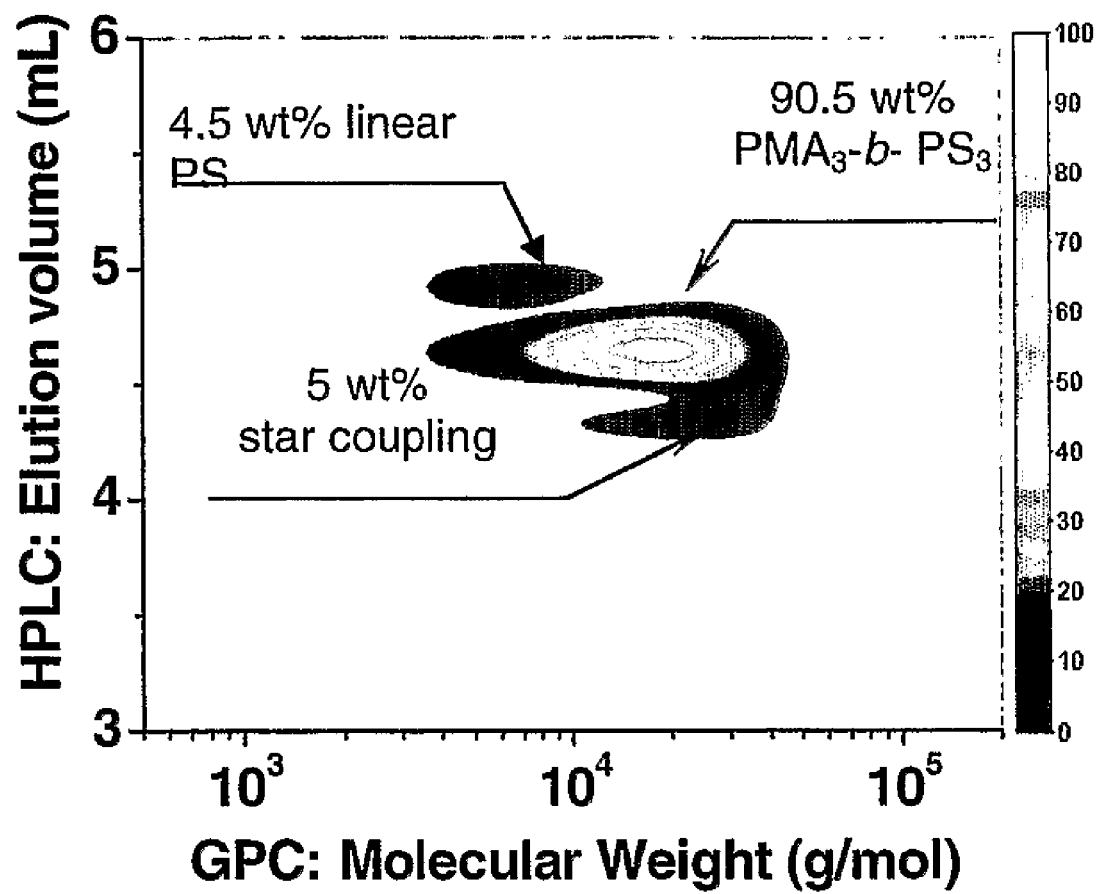
FIG. 2 is a 2D chromatographic characterization of a tri-arm block copolymer comprising blocks of methyl acrylate and styrene produced in a miniemulsion polymerization process using SR&NI with AIBN as the conventional radical initiator, poly(methyl acrylate) macroinitiator as the normal ATRP initiator, and CuBr/BPMODA as the catalyst complex.

The results of the 2-D chromatography analysis for run ML143 is shown in FIG. 2. The final product had 4.5% polystyrene present in the material.

Example 9

Synthesis of Homopolymers by AGET in Miniemulsion

Because of its tolerance to air, AGET is a convenient technique to conduct ATRP in miniemulsion. It also provides an economic incentive, because the price of a $Cu^{(II)}$ compound is generally lower than that of a $Cu^{(I)}$. Ascorbic acid was adopted as the exemplary reducing agent for the AGET ATRP miniemulsion polymerizations because of its water-solubility and its environmentally benign nature. Some hydrophobic reducing agents may float over the miniemulsion and not easily enter droplets where they could reduce the catalyst and activate the polymerization. On the contrary, a water soluble reducing agent, such as ascorbic acid, can be easily solubilized in the miniemulsion, and reduce the $Cu^{(II)}$ complexes, either in the water phase or at the surface of monomer droplets. Because the resulting $Cu^{(I)}$ complexes are more hydrophobic than $Cu^{(II)}$ complexes, the reduction process essentially drives the active catalysts back into the droplets.

Before conducting a miniemulsion polymerization, the $Cu^{(II)}$ complex was prepared in a round-bottom flask by dissolving $CuBr_2$ (0.0218 g, 0.098 mmol) and ligand, BPMODA (0.0440 g, 0.098 mmol), in n-butyl acrylate (5.0 g, 39 mmol) at 60° C. The resulting solution was cooled by an ice bath. The EBiB initiator (28.7 µL, 0.196 mmol), hexadecane (0.18 g) and the aqueous Brij98 solution (20 mL, 5 mmol/L) were added to the cooled solution before the mixture was subjected to sonification (Heat Systems Ultrasonics W-385 sonicator; output control set at 8 and duty cycle at 70% for 1 minute). The resulting homogenized miniemulsion was transferred to a Schlenk flask and purged with argon for 30 minutes. The flask was then immersed in an oil bath thermostated at 80° C. An aqueous solution of ascorbic acid was injected into the reaction to initiate the polymerization. Aliquots were taken at intervals to measure the conversion gravimetrically and to examine the evolution of molecular weight.

Before the polymerization was initiated, most of the $Cu^{(II)}$ species remained in the monomer droplets because of complexation with a highly hydrophobic ligand, such as BPMODA, but some $Cu^{(II)}$ species are also present in the aqueous medium. Therefore, when ascorbic acid is added to the miniemulsion, it can immediately interact with and reduce the small fraction of the $Cu^{(II)}$ complex that is present in water phase and those complexes near the surface of the monomer droplets; the system rapidly re-equilibrates thereby allowing reduction of most of the $Cu^{(II)}$. In order to eliminate an early non-stationary period, the ascorbic acid was slowly added during 10 minutes to allow equilibrium to be attained within the droplets. This resulted in the reaction attaining more linear kinetics than that obtained when all of the ascorbic acid was added at the very beginning of the reaction. In order to leave some excess of $Cu^{(II)}$ species to regulate ATRP, a sub-stoichiometric amount of the reducing agent was used. The amount of the added reducing agent will depended on the partition coefficients of the complexes, the desired rate of reaction, ATRP equilibrium constants, targeted molecular weights, etc. Too small an amount of ascorbic acid would lead to a slower polymerization, whereas too large an amount may lead to a reduced level of control. The experimental results suggested that the best ratio of ascorbic acid to $Cu^{(II)}$ complex is ~0.4:1. With this ratio, the polymerization was sufficiently fast and did not show the affect of significant amount of coupling reactions.

Example 10

Preparation of Block Copolymers

The macroinitiator, $CuBr_2$ and BPMODA ligand were dissolved in monomer in a round-bottom flask at 60° C. After the formation of the $Cu^{(II)}$ complex, the resulting solution was cooled by submersion in an ice bath. Hexadecane and an aqueous Brij98 solution were added to the cooled solution before the mixture was subjected to sonification (Heat Systems Ultrasonics W-385 sonicator; output control set at 8 and duty cycle at 70% for 1 minute). The resulting substantially homogenized suspension was transferred to a Schlenk flask and purged with argon for 30 minutes. The flask was then immersed in an oil bath thermostated at 80° C. An aqueous solution of ascorbic acid was injected into the flask to initiate the reaction. Aliquots were taken at intervals to measure the conversion gravimetrically and to examine the evolution of molecular weight.

In most embodiments, AGET should be a more efficient technique than SR&NI for the synthesis of block copolymers. In some embodiments of SR&NI, homopolymers are produced, even if an active catalyst was selected and the amount of conventional radical initiator was reduced to a low level. For AGET, the $Cu^{(I)}$ complex is produced in-situ through a non initiating electron transfer mechanism or through a low energy complex rather than employing an organic free radical based reduction of the $Cu^{(II)}$ complex.

The preparation of linear block copolymers by chain extension of a PMA-Br macroinitiator (KM 219) with styrene as the second monomer was much slower in bulk (KM 242) than in miniemulsion (KM 241). The product from the miniemulsion chain extension reaction was a clean block copolymer. This coupling-free copolymer resulted from the low amount of ascorbic acid initially added to the system providing an appropriate balance of activator and deactivator from the start of the reaction. Since too much ascorbic acid would lead to instant coupling at the beginning of the polymerization, in this example the ratio of ascorbic acid to $Cu^{(II)}$ was decreased to ⅓.

Polymerization conditions: $[Styrene]_0:[PMA]_0:[CuBr_2/BPMODA]_0:[Ascorbic\ Acid]_0=200:1:0.4:0.16$. Reaction temperature 80° C. Miniemulsion conditions: [Brij 98]=0.58 wt % with respect to water (2.3 wt % with respect to the oil phase); [Hexadecane]=3.6 wt % with respect to monomer. independent evaluation of chemical composition, or functionality, in addition to molar mass. The polymer mixtures were initially separated according to their chemical compositions in the HPLC first dimension, and then the eluents were transferred to the GPC dimension and further separated according to their molar masses or hydrodynamic volumes.

In order to determine the amount of homopolymer produced during AGET ATRP in a miniemulsion synthesis of a poly(methyl acrylate)-b-polystyrene (PMA-b-PS) copolymer, the critical condition for polystyrene (PS) was utilized in the HPLC analysis. Under the critical condition for PS, the entropic and enthalpic interactions between PS and the packing column are compensated and the elution volume of PS in the column is independent of the size of its polymer chains. Therefore, the PS becomes chromatographically invisible, i.e., the chromatographic behavior of PS under these critical conditions does not depend on its hydrodynamic size but on its chemical composition or functionality. Thus, the elution volume of the PMA-b-PS copolymer is solely determined by the molar mass of PMA segment in the copolymer. In addition, under the critical conditions for PS, the elution mode of PMA segment was set as size exclusion mode, meaning the PMA-b-PS copolymer chains with longer PMA segment would have smaller elution volume and elute earlier.

Figure 3A:
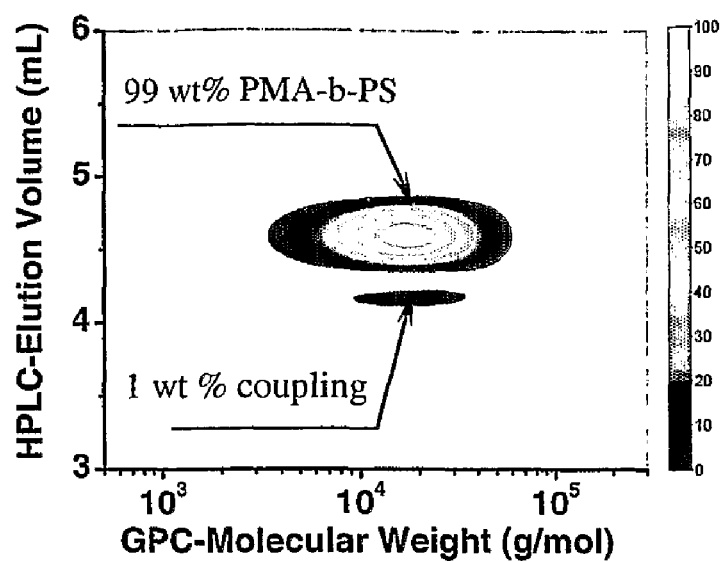
FIG. 3a is a 2D chromatographic characterization of a linear poly(methyl acrylate) macroinitiator and block copolymer comprising blocks of methyl acrylate and styrene produced in a AGET ATRP in miniemulsion polymerization process.
Figure 3B:
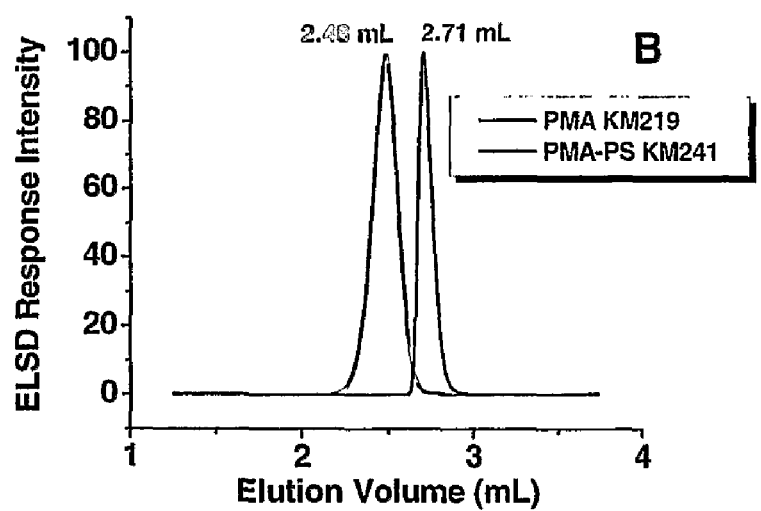
FIG. 3b is a graph of the HPLC evolutions for the linear block copolymer PMA-b-PS (KM241) and the macroinitiator PMA-Br (KM 219) under the critical condition of PMA.

FIG. 3 shows the 2D chromatograms of the linear macroinitiator PMA and linear block copolymer PMA-b-PS synthesized by AGET ATRP in miniemulsion. According to these two chromatograms, the PMA macroinitiator and the final PMA-b-PS copolymer have different molecular weights but similar elution volumes (4.52 mL). The comparable elution volume confirmed that the PS segment is chromatographically invisible in the HPLC analysis under the critical condition for PS. The elution volume of PS homopolymer under its critical condition (4.88 mL) is independent of the molecular weight of the polymer. Further, since there was no peak at 4.88 mL in the contour of the final linear block copolymer product no homopolystyrene was formed during this AGET ATRP miniemulsion reaction. The small region in the copolymer chromatogram with an elution volume of 4.24 mL was ascribed to star-star coupling products, since a smaller elution volume corresponds to a larger PMA segment. This was confirmed by the molecular weight determination from the GPC dimension, in which the small shoulder peak had a molecular weight of 22,000 g/mol, higher than that of the main product PMA-b-PS (15,400 g/mol). Integration of each peak in the 2D chromatogram of copolymer provided quantitative composition information of the final product. The coupling product corresponded to ~1 wt % of the final product, which showed a high yield of linear block copolymer by AGET ATRP in miniemulsion.

Example 11

Synthesis of Star Block Copolymers

Star block copolymers have enhanced rheological and mechanical properties compared to linear block copolymers. SR&NI ATRP in miniemulsion was successful for the synthesis of star block copolymers, (comparison 5) however, the limitation of SR&NI was also clearly observed. FIG. 2 shows a typical 2D chromatogram of a three-arm star block copolymer $P(MA-b-S)_3$ obtained from a SR&NI process in miniemulsion. The peak at 4.56 mL in HPLC represented the main desired 3-arm star block copolymer and the shoulder peak at 4.25 mL can be attributed to star-star coupling reactions, since the molecular weight of this shoulder peak was twice higher than that of the main peak. In addition, a small peak at elution volume of 4.88 mL was identified as PS homopolymer. The PS standard was used as the calibration standard for the GPC dimension, and the compositional information of the resulting block copolymers was provided by the integration of the intensity of each peak in the 2D contour. The polymer composition was: 90.5 wt % of 3-arm star block copolymer, 5 wt % of a copolymer resulting from star-star coupling reactions and 4.5 wt % of linear homopolymer PS. The homopolymer PS detected in 2D chromatography may have resulted from use of a conventional radical initiator (e.g., AIBN) to activate the catalyst. This 2D chromatography analysis of the star block copolymer highlighted the major limitation of a SR&NI process in preparation of a pure block copolymer.

The novel disclosed AGET technique is a highly efficient procedure that overcomes this barrier. Since the addition of a conventional radical initiator is avoided, the products of the polymerization remained as clean as if a direct ATRP had been employed. The water soluble reducing agent diffused rapidly throughout the miniemulsion system to reduce $Cu^{(II)}$ into $Cu^{(I)}$. The final product was also analyzed by 2D chromatography. (FIGS. 5 and 13) The improvement in control and purity of the final product attained in a well controlled AGET ATRP can be seen by comparing FIG. 5 with FIG. 2.

Figure 5:
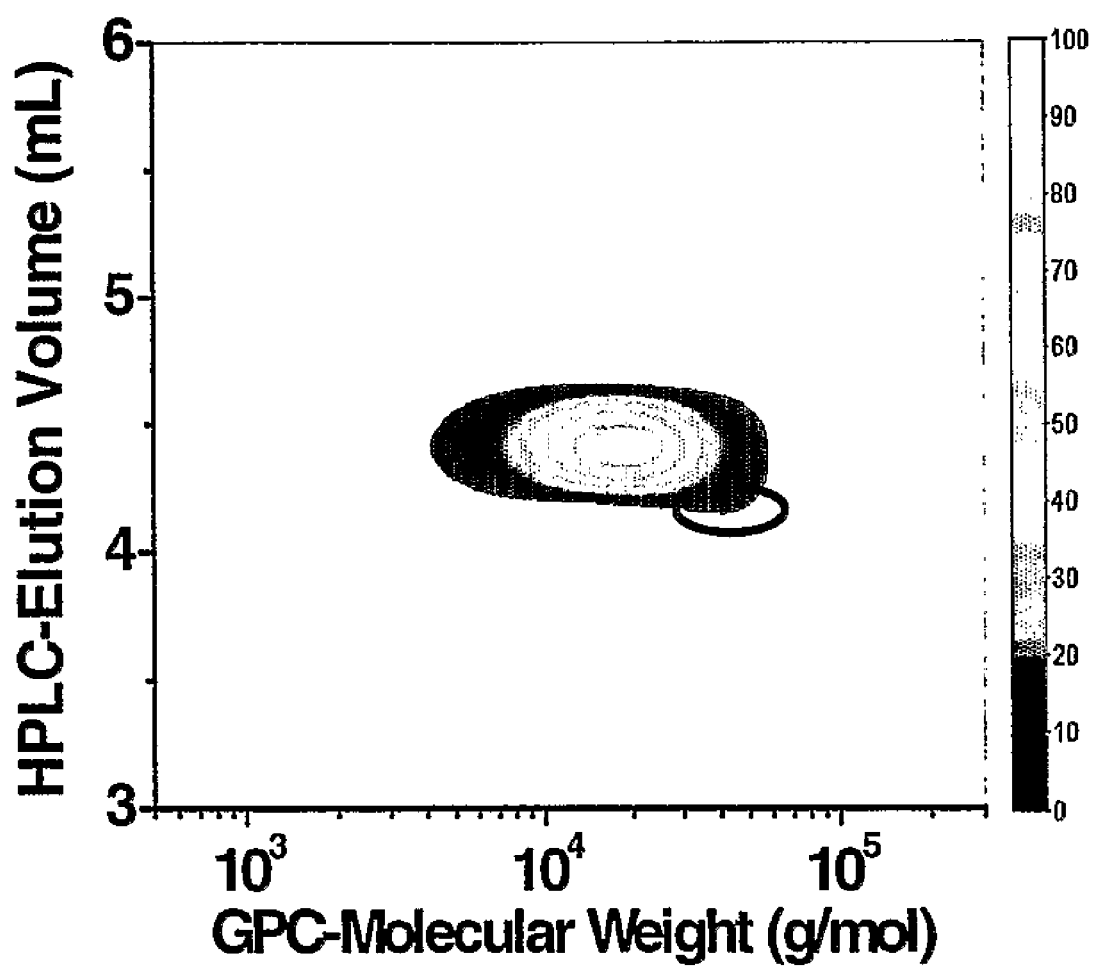
FIG. 5 is a 2D chromatographic characterization of a tri-arm block copolymer comprising blocks of methyl acrylate and styrene produced in a AGET ATRP initiated using poly (methyl acrylate) macroinitiator in a miniemulsion at 20% conversion, the first dimension is HPLC under critical conditions for polystyrene and the second dimension is GPC.
Figure 13:
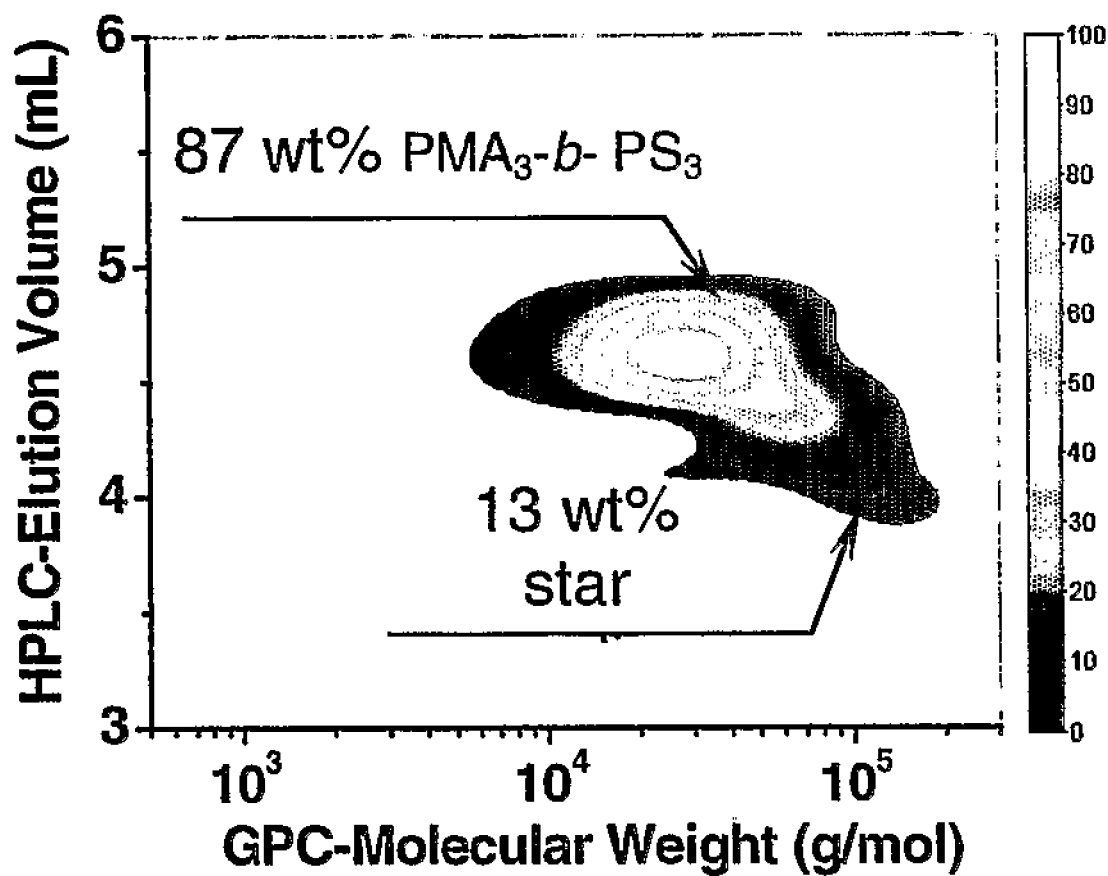
FIG. 13 is a 2D chromatographic characterization of a star copolymer comprising blocks of methyl acrylate and styrene produced in an AGET ATRP with excess reducing agent.

Polymerization conditions for the preparation of a pure star block copolymer: $[Styrene]_0:[(PMA-Br)_3]_0:[CuBr_2/BP-MODA]_0:[Ascorbic\ Acid]_0=400:1:0.6:0.24$; 80° C. Miniemulsion conditions: [Brij 98]=0.58 wt % with respect to water (2.3 wt % with respect to the oil phase); [Hexadecane]= 3.6 wt % with respect to monomer. The copolymerization was faster in miniemulsion than in bulk, which indicated a gradual diffusion of $Cu^{(II)}$ complex out of the monomer droplets to water. Star-star coupling reactions were difficult to avoid, especially for styrene polymerization. The contribution of coupling reaction increases with conversion but could be reduced by stopping the polymerization at a limited conversion. FIGS. 5 and 13 show 2D chromatograms of two samples prepared under the same reaction conditions but at different conversions. As shown by the 2D chromatogram (FIG. 13), star-star coupling was significant at 43% conversion—the weight fraction of the star-star coupling product was 17.3 wt %. However, at 20% conversion (FIG. 5), there was only one big peak in this 2D chromatogram, which represented a P(MA-b-S)$_3$ star block copolymer with the molecular weight of 19,400 g/mol, when PS standards were used for calibration. The weight fraction of star-star coupling products was less than 1 wt %, as shown in FIG. 5 by a circle. In addition, no homopolymer was detected at any conversion, which further proved that AGET is an efficient procedure for the preparation of a pure star block copolymer.

The star-star coupling of star block copolymers discernable in FIG. 13 could be minimized at lower monomer conversion, as described above, through selection of a strongly binding more hydrophobic ligand for formation of the catalyst complex or by selection of a ligand that provides a higher concentration of deactivator in the organic phase throughout the polymerization process. A reducing sugar may be a preferred reducing agent if an environmentally benign approach is desired and a single addition of the agent is desired. The addition of a water soluble reducing agent to a $Cu^{(II)}$ complex in a miniemulsion ATRP may be used to avoid the need for purging to remove dissolved oxygen.

It would be convenient to carry out polymerizations by ATRP without purging the monomer, solvents, and other components with inert gas in order to remove oxygen. Ascorbic acid is known as a very efficient reducing agent for copper$^{(II)}$ ions, which are reduced to copper$^{(I)}$. In the presence of copper ions it also reduces oxygen.

Comparison 6:

C6a. Emulsion Polymerization of n-BuMA by Direct ATRP in the Presence of Ascorbic Acid as Reducing Agent An emulsion was formed from 0.0068 g (4.74.10$^{-5}$ mol) copper(I) bromide, 0.0382 g (9.35.10$^{-5}$ mol) dNBpy dissolved in 1.5 ml (1.341 g; 9.43 mmol) n-BuMA and 0.205 g Brij 98 and 0.0180 g (0.1 mmol) ascorbic acid dissolved in 10 ml water. The monomer and water used were not degassed previously. The mixture was not degassed. The Schlenk flask with the emulsion prepared in this manner was placed in an oil bath at 90° C. (stirring). To this, 6.9 μl (0.0092 g 4.7×10$^{-5}$ mol) ethyl bromo-isobutyrate was added. Immediately a sample for GC was taken. At certain times, samples were taken again. The conversions were determined by GC and gravimetrically. Molecular weights of the polymers were determined with 1,4-dimetoxybenzene internal standard in THF. After 4 hours of stirring the mixture became green.

TABLE 10

Characteristics of the polymers prepared in experiment nvt-buma 7

| Sample | Time of Polymerization, h | Conv. (GC) | $M_n \cdot 10^{-4}$ | PDI |
|---|---|---|---|---|
| Buma 7-1 | 1 | 0.0429 | 1.348 | 2.926 |
| Buma 7-2 | 2 | 0.0753 | 2.011 | 5.085 |
| Buma 7-3 | 3 | 0.0780 | 1.408 | 3.811 |
| Buma 7-4 | 4 | 0.5365 | 0.7086 | 6.286 |

From the above results it is seen that the polymerization is not controlled; ascorbic acid acts as inhibitor at the beginning, and when it is consumed (oxidation by the oxygen in the flask), the polymerization becomes very fast. This experiment was unsuccessful probably due to the very fast and continuous reduction reaction of copper$^{(II)}$ by ascorbic acid; at these conditions no deactivator exists in the system.

C6b. Emulsion Polymerization of n-BuMA by Direct ATRP in the Presence of Sodium Sulfite as Reducing Agent Another reducing agent for copper$^{(II)}$, which is not oil (i.e. monomer) soluble, is sodium sulfite. As it is alkaline, it should be used in the presence of a small amount of acid. This makes the system very complicated. The experiment was unsuccessful since the polymerization was extremely fast (more than 75% conversion in 10 minutes). The experiment was carried out as follows. Emulsion from 0.0071 g (4.95× 10$^{-5}$ mol) copper (I) bromide, 0.0382 g (9.35.10$^{-5}$ mol) dNBpy, and 0.2 ml $C_{16}$ dissolved in 1.5 ml (1.341 g; 9.43 mmol) n-BuMA and 0.199 g Brij 98 and 0.0390 g (0.31 mmol) sodium sulfite dissolved in 10 ml water was prepared. The monomer and water used were not degassed before the experiment. The mixture was not degassed. The Schlenk flask with the emulsion was put in an oil bath at 90° C. (stirring). To this, 0.1 ml acetic acid and 6.9 μl (0.0092 g 4.7×10$^{-5}$ mol) ethyl bromo-isobutyrate was added. The mixture became brown immediately. A polymer started to separate and in 10 minutes a large quantity of polymer separated and the polymerization was stopped. This polymer, after washing with methanol and drying weighed 1.002 g (more than 75% conversion). These results show the importance of adding only the appropriate amount of reducing agent to reduce the required/desired amount of $Cu^{(II)}$ to $Cu^{(I)}$. An excess of reducing agent should be avoided since the deactivator ($Cu^{(II)}$) needs to be present throughout the polymerization to control the ATRP reaction.

Example 12

Mini-Emulsion AGET ATRP without Purging with an Inert Gas

Ascorbic acid is known as an efficient reducing agent for $copper^{(II)}$ ions. It also reduces oxygen, especially in the presence of copper ions. A solution of ascorbic acid may be added to an emulsion and until a significant portion of the oxygen is removed, as indicated by formation of a yellow color. When the final brown suspension is heated to the reaction temperature, a controlled reaction ensues.

This procedure can be used to remove dissolved oxygen from any radical miniemulsion process if ppm levels of copper are added.

Figure 14:
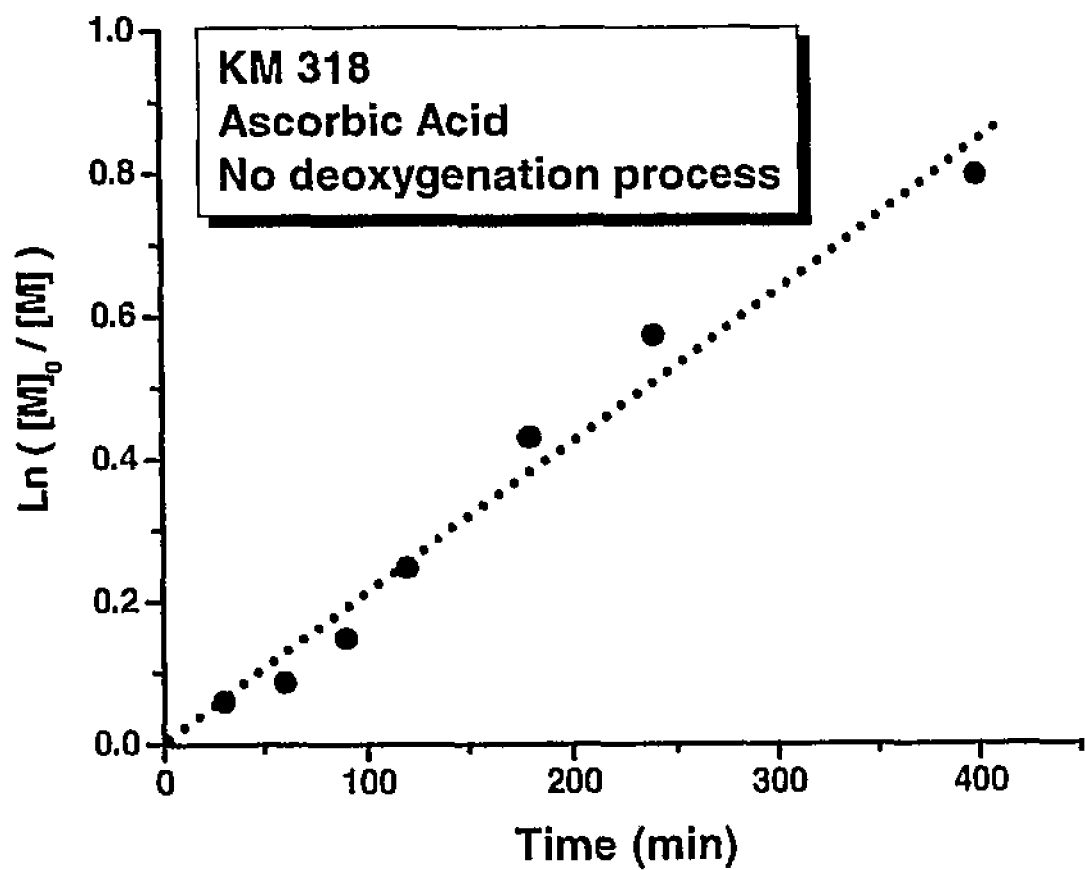
FIG. 14 is a graph of the kinetics of an AGET ATRP miniemulsion polymerization process of butyl acrylate conducted without purging to reduce the concentration of dissolved oxygen.

12a. In this experiment, 1.5 equivalents of ascorbic acid was used based on the amount of added $Cu^{(II)}$ complex. Theoretically, 0.5 equivalents of ascorbic acid are needed to reduce all the $Cu^{(II)}$ complex, therefore in this example 3 times the necessary amount of ascorbic acid was used. No deoxygenation process, including the deoxygenation of miniemulsion or the reducing agent solution, was applied to the reagents for this reaction. To avoid the effect from extra inadvertent oxygen, the sample-taking syringe was still purged with nitrogen. The experiment showed a successful ATRP could be attained without the need for deoxygenation. The polymerization remained living for at least 6 hours, 80% conversion of monomers to polymer with linear kinetics as shown in FIG. 14 and with measured and theoretical molecular weights close to each other throughout the reaction and narrow molecular weight distribution.

Example 13

AGET ATRP Followed by ATRC

Based on the research of reducing agents, ATRC was also attempted in miniemulsion system. In an ATRC reducing agents, such as $Cu^{(O)}$ or ascorbic acid are added at the end of a controlled ATRP, or to a solution of macroinitiators, in excess in order to instantly increase the concentration of activators and continuously decrease the concentration of any formed deactivators therefore increasing the concentration of radicals and the occurrence of coupling reactions are increased dramatically. Di-functional oligomers with Br end groups were used as the initiators and ascorbic acid was used as the reducing agent, and styrene was used as monomer. Ascorbic acid was added to the reaction at two different times. The first batch was added to initiate an AGET ATRP and the second batch to catalyze the ATRC coupling. However, before the second batch, some coupling reactions were already obvious due to addition of a molar excess of ascorbic acid in the first batch. The results are shown in FIG. 14 and one can clearly observe the coupling reactions and that addition of more reducing agent showed more obvious coupling reactions and the final product displayed a broad molecular weight distribution because of multiple coupling products. As noted above the addition of less ascorbic acid (e.g., Ascorbic acid:$Cu^{(II)}$=0.5:1) did not result in the formation of any coupling products.

A mono-functional initiator was also used for ATRC in a miniemulsion however since ascorbic acid was not deemed as a strong reducing agent, another reducing agent, hydrazine hydrate was used. As expected, this coupling reaction occurred rapidly, and was complete after 60 minutes.

Comparison 7: SR&NI ATRP of nBA from Functionalized Silica Particles in a Mini-Emulsion.

The procedure for the preparation of 1-(Chorodimethylsilyl)propyl 2-bromoisobutyrate and the subsequent functionalization of the silica (30% wt. Silica in methyl isobutyl ketone, effective diameter=20 nm, MIBK-ST, Nissan) was derived from the previously described procedures in incorporated references. The colloidal initiator was prepared by silylation of silica nanoparticles using both a functional chlorosilane (1 (chlorodimethylsilyl)propyl 2-bromoisobutyrate and hexamethyldisilazane. Elemental analysis of the functionalized silica colloid confirmed the incorporation of bromine (1.40%, 0.1852 mmolBr/1 g $SiO_2$). Bis(2-pyridylmethyl)octadecylamine (BPMODA) was prepared from 2-picolyl chloride and octadecylamine by previously disclosed procedures. Molar ratio of reagents were: [200:1:X:3.6%:0.125:0.2:0.2] nBA:Si-Ethyl2BrIB:Surfactant/Brij98:co-stabilizer/hexadecane:AIBN:CuBr2/BPMODA].

Figure 18:
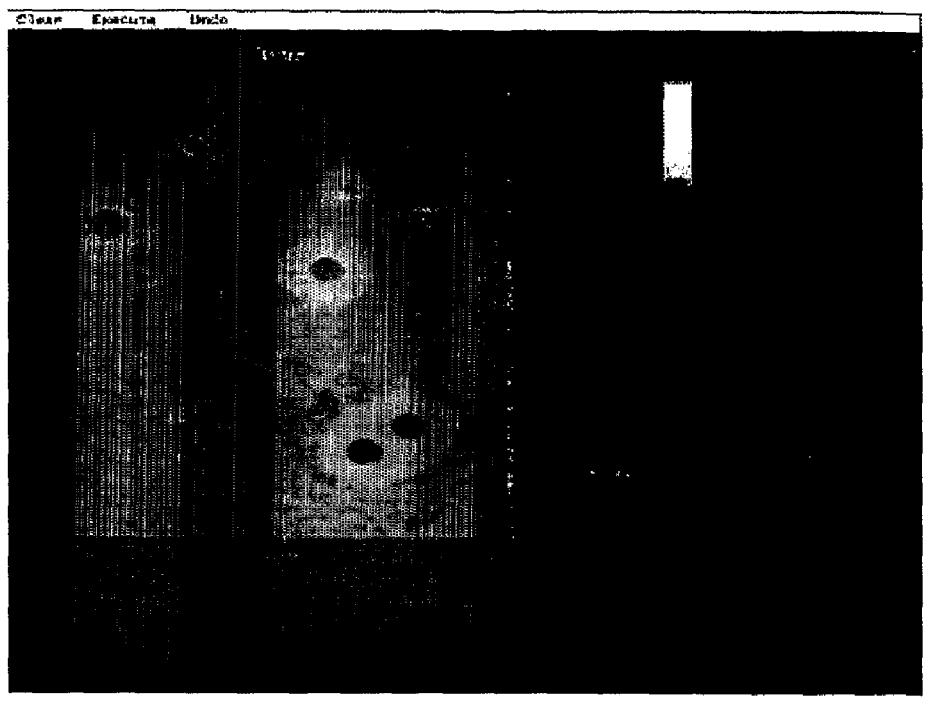
FIG. 18 is an atomic force microscopy image showing low aggregation of polymers at high conversion and high molecular weight of (poly)n-BA grafted silica with a degree of polymerization of 438 from SR&NI miniemulsion and free polymer generated from AIBN.

Procedure: 0.0085 g CuBr2, 0.017 g BPMODA and 4.86 g (5.44 mL/0.0379 mol) of nBA were added to a round bottom flask and allowed to stir to dissolve at 60° C. for ~20 min. The solution was then cooled by immersing the flask in ice. While on ice, brij 98 (a 20 mm solution diluted to 20 g with DI water), 0.0039 g purified AIBN, 0.125 mL (0.18 g) hexadecane, and 0.61 g Si-bromoisobutyrate functionalized particle was added to the flask. The mixture was stirred for a short time then sonicated for 3-4 minutes while on ice and then transferred to a Schlenk flask and bubbled with argon gas for 30 minutes. The grafting from polymerization reaction was then run at 80° C. for about 6 hours. Conversion increased linearly with time and reached 64% as measured by gravimetry. GPC of the detached grafted from polymer after silica etching is ~16K, with PDI=1.47 (close to theoretical (200*137=2740*64=17K)) indicating a controlled polymerization had been conducted. FIG. 18 shows the presence of free polymer generated from the added AIBN. This free polymer has the same molecular weight as the attached polymer and will be soluble in the tethered polymer chains therefore a homogeneous matrix will be formed. The free polymer acts as a matrix diluent and for many applications this will be acceptable particularly for bulk material applications or when the nano-composite material is used as a reinforcing agent.

Example 14

AGET ATRP

Figure 19:
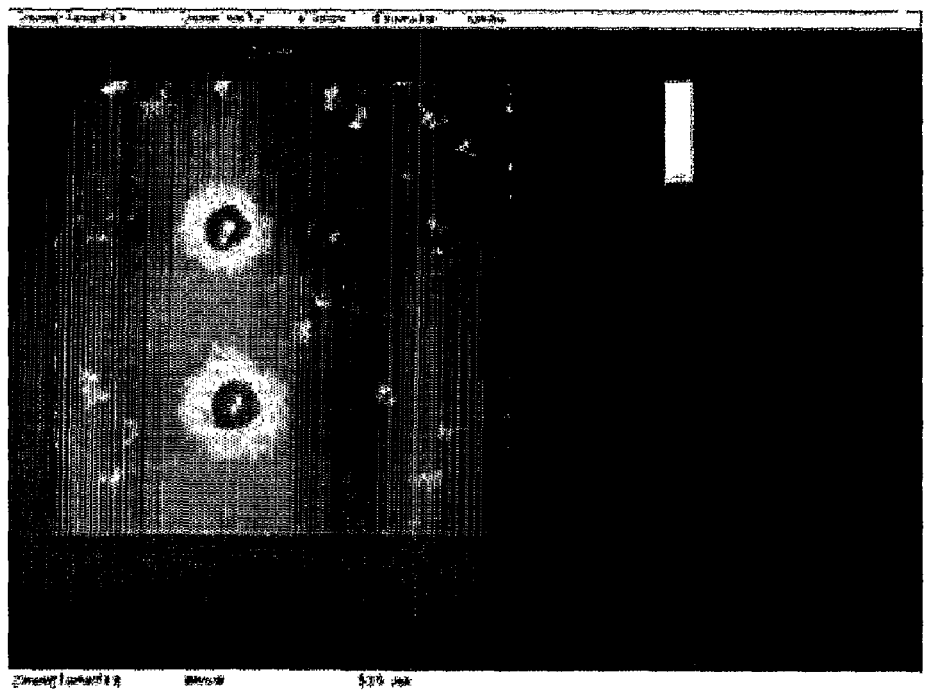
FIG. 19 is an atomic force microscopy image showing low aggregation of polymers at full conversion and high molecular weight of (poly)n-BA grafted silica with a degree of polymerization of 438 from AGET ATRP in miniemulsion and free polymer.

The reaction conditions were similar to those above except a reducing agent was added in place of AIBN and as shown in FIG. 19 considerably less free polymer is formed. This type of product would be preferred when the nano-composite particles will be used directly in an application such as a pigment dispersant.

Following the kinetics of a polymerization in a miniemulsion system containing colloidal particles with gas chromatography can be problematic due to the presence of several non-dissolvable species. For the same reasons, following monomer conversion via $H^1$-NMR is virtually impossible. However, as detailed above the kinetics of polymerization in miniemulsion systems can be followed by gravimetry. The results have decent reproducibility, and good agreement with theoretical predictions. This also proved to the case in these hybrid-miniemulsion systems. The expected molecular weight (Mn) from the gravimetric measurement taken just prior to terminating the reaction was 14,800 g/mol (calculated from 58% conversion X 200×1×128 g/mol) is in good agreement with the actual Mn determined after etching the silica cores, 15,900 g/mol. The conditions used from etching of silica for SEC measurements have been reported previously. Final polydispersity of the free n-BA polymer was relatively low (1.4), and may be slightly broader than expected due to intramolecular termination caused by crowding.

In a reaction targeting higher DP, the ratio of reagents were adjusted accordingly.

A comparison of these results with prior art examples for bulk grafting from silica particles shows that the reactions conducted in a miniemulsion system can be continued to higher conversion at a faster rate due to the dispersed nature of the active species.

Tapping-mode atomic force microscopy (AFM) analysis was carried out using a Nanoscope-III Multimode System (Digital Instruments, Santa Barbara, Calif.). The images were acquired in air with standard silicon TESP probes (nominal spring constant and resonance frequency respectively 50 N/m and 300 kHz). Deformable polymer layers on silica were contrasted well from the procedure described previously. Transmission electron microscopy was conducted using a Hitachi H-7100 electron microscope. TEM samples of hybrid nanoparticles were prepared by casting one drop of a dilute colloidal solution onto a carbon-coated copper grid. Emulsion droplet and particle size were determined using a dynamic light scattering high performance particle sizer (model HPP 5001, Malvern Instruments).

The images obtained from AFM and TEM analysis of the samples obtained show the individual silica particles surrounded by a uniform layer of polymer. The proportion of aggregates and coupled particles seen in all the images (1-4) are very small, regardless of conversion or molecular weight of the tethered polymer. Images 1 and 2 clearly show the low level of aggregation present in the samples prepared in miniemulsion. A comparison of images 3 and 4 show the benefits of moving from SR&NI to AGET activation of the catalyst complex. AGET ATRP clearly provides the same capabilities of full conversion and low polydispersities as a SR&NI miniemulsion system but without production of any free polymer. There is considerably less free polymer detectable in FIG. 19 compared to FIG. 18. The low levels of homopolymers seen in FIG. 19 could be a result of some initiator separation from the silica particle during sonication or a result of oxygen initiated homopolymerization due to peroxide formation during sample preparation due to removal of the antioxidant.

These AFM images show a low level of particle-particle coupling and the processability of the materials, exemplified by the fabrication of films for TEM, show the total absence of extensive crosslinking. The effect of increasing the molecular weight is demonstrated by the TEM images, (Images 1 and 2) which confirm the level of control inherent in the compartmentalized miniemulsion system. Even spacing of the silica cores is clearly seen in these images and the effect of increasing the degree of polymerization (DP), resulting in an increase in the spacing between the silica cores, is also evident. In FIG. 16, where the DP of the polybutyl acrylate is 125, the distance between silica cores averages about 20 nm. Whereas a higher DP (438) results in an increase in particle to particle spacing to about 50 nm, FIG. 17. TEM therefore shows increasing distance between particles with increased DP, along with uniform spacing as expected in controlled systems. The size of individual hybrid particles, which were determined after miniemulsion destruction by DLS, was Deff=104.9 nm for the polybutyl acrylate (DP=125). The size increases for the higher DP sample (438) to Deff=258.1 nm. The larger particle size from the DLS measurement is due to swelling by the solvent. Indeed some increase in droplet size was noticed before the reaction was stopped and this could result from the change in monomer unit mobility as the polymerization progressed. This is possibly due to restriction on the mobility of monomer units after polymerization; i.e., a greater free volume is created in the particle as the low MW monomer is consumed and aligned from the surface of the silica particle. The molecular weight of polymers detached from silica particles after treatment with HF were in line with theoretical values (from gravimetric analysis) and PDIs were low.

In summary in this example we present the first example of successful synthesis of hybrid nanoparticles using multifunctional silica initiators in a miniemulsion ATRP reaction. The experiments confirm the theoretical predictions. Reactions follow first order kinetics and can be driven at a high rate of reaction to high conversion without excessive production of coupled particles, thereby providing a viable commercial approach to these novel, functionally tailorable, materials whose properties can be preselected to target many specific applications. This approach can be also applied to other CRP systems comprising other multifunctional initiators, including multi-arm star molecules, molecular brushes and other well-defined polymers with complex architectures.

Pure multifunctional materials can be prepared from multifunctional initiators in a miniemulsion system. The reactions can conducted under conditions that provide higher conversion, higher yield and at relatively high rates versus traditional bulk or solution polymerization systems. The compartmentalization present in a miniemulsion system minimizes the ability for active polymer chains growing from the multifunctional initiators to physically crosslink and is the key to avoiding macro-crosslinking and therefore, gelation at the macroscopic level, and provides a convenient pathway for the synthesis of multiarm hybrid copolymers. This has lead to a break through in the ability to conduct controlled polymerizations using multifunctional initiator systems and the use of water as the major reaction medium is in accordance with the current effort to conduct basic science under conditions that exert minimum environmental impact.

Example 15

AGET ATRP of AN from Functionalized Silica Particles in a Mini-Emulsion

The above experiment was repeated using acrylonitrile as monomer. After the polymer was detached from the silica particle the MW was 4000 g/mole and displayed a PDI of 1.15. Again indicating a controlled polymerization can be conducted from a multifunctional surface without coupling or crosslinking. The material prepared in this example can be used to prepare carbon based films with well defined porosity after removal of the silica nanoparticles.

Example 16

Synthesis of Silica Tethered Poly(butyl acrylate-b-methyl methacrylate)

An Example of the Preparation of a Core/Shell Hybrid Particle

We have determined that using more diluted system in miniemulsion allows controlling the polymerization of more reactive monomers quite well (reducing monomer content to 14%, typically monomer content 20%). That is why for polymerization of chain extension of tethered poly(n-butyl acrylate) with MMA halogen exchange was employed and the amount of ascorbic acid was reduced to 0.2 moles. The tethered poly(BA-b-MMA) synthesized from silica macroinitiator in miniemulsion showed after chain cleavage that the molecular weight increased showing formation of a block copolymer.

$SiO_2$-$nBA_{220}$ was prepared as above with AGET ATRP in miniemulsion; Mn=33K, PDI=1.2. TGA results gave a residue of 31.6%. The following calculation was used to determine initiator efficiency:

TEM (number average): $TEM = 16 \pm 4.5$ nm

Vol. Sphere=$4/3\pi r^3$=$4/3\pi 8^3$=2145 $nm^3$

Density=1.9 $g/cm^3$ (for bulk silica)=$1.9 \times 10^{-21}$ $g/nm^3$

W each SiO2 particle==density*vol.= $1.9 \times 10^{-21}$ $g/nm^3$*2145 $nm^3$=$4.08 \times 10^{-18}$ g "Mn" (for each silica particle)=$N_A \times wSiO2$= $2.44 \times 10^6$ g/particle silica % wt (from TGA)=31.6% (for DP=220)

Mol polymer/gram=0.684 pBA/33000 g/mol=$2.07 \times 10^{-5}$ mol

Mol silica/gram=0.316 SiO2/$2.44 \times 10^6$ g/mol=$2.44 \times 10^{-7}$ mol

Chains of polymer/silica=$2.07 \times 10^{-5}$ mol/$2.44 \times 10^{-7}$ mol=160

From Elemental Analysis Br content was 0.31 mmol/g: # sites/particle=0.31 mmol Br/g*$2.44 \times 10^6$ g/part.=758 Br sites/particle Initiation Efficiency=chains/sites=160/758*100=21% efficiency Therefore, 0.31 mmol Br/g*0.21=0.065 mmol Br/g for the $SiO_2$-$nBA_{220}$ Procedure: [600:1:0.2:0.2]; [MMA: $SiO_2$-$nBA_{220}$:$CuBr_2$: BPMODA] with 40% ascorbic acid. (0.00084 g CuCl2, $6.24 \times 10^{-6}$ mol), (0.0023 g, $6.24 \times 10^{-6}$ mol) BPMODA and 1.87 g (2.0 mL/0.0187 mol) of methyl methacrylate were added to a round bottom flask and allowed to stir at 60° C. for ~20 min to dissolve the solid reagents. The solution was then cooled by immersing the flask in ice. While on ice, solution of brij 98 (2 g of 20 mM) in DI water (5.5 g), 0.087 mL (0.067 g) hexadecane, and 0.48 g of the silica functionalized with n-butyl acrylate (from above) was added to the flask. The mixture was sonicated for 3-4 minutes while remaining under contact with ice and then transferred to a schlenk flask and bubbled with argon gas for 30 minutes. Ascorbic Acid solution ($4.4 \times 10-4$ g (did stock solution) in 0.5 mL H2O). 0.35 mL was added first, and the remaining 0.15 mL was added after ten minutes. The flask was transferred to an oil bath heated to 80° C. and allowed to react for 1.5 hours at which point it was stopped by quickly adding the miniemulsion to THF and precipitating into methanol, and filtered for collection. Etching of silica for SEC measurements was done as reported previously. The GPC Trace gave Mn=97K with PDI=2.1 indicating chain extension of the tethered chains had occurred forming a core/shell hybrid particle. The rather broad MWD can be attributed to two factors: one, the amount of the product (making the miniemulsion unstable) and the other that the synthesis of the first tethered macroinitiator material had been allowed to go to full conversion of the first monomer (the SiO2-nBA) which means that termination was favored (since $k_t$ does not change as monomer concentration decreases) and some loss of functionality occurred through intramolecular chain-chain coupling. Doing the chain extension with a material that was only allowed to go to ~50% conversion would give better analytical results.

Examples 14-16 describe the preparation of hybrid nanoparticles with a well defined core and indicate that it is feasible to graft copolymer chains from a solid surface in a high yield reaction without significant particle-particle coupling. However it is also possible to use linear, branched or block copolymer macro-multifunctional-initiators to prepare soluble macromolecule bottle brush copolymers.

Preparation of Bottle Brush Copolymes by AGET ATRP

Comparison 8:

Grafting from the surface of solid particles is not the only type of multifunctional initiator used in CRP. Materials known as bottle brush copolymers have been prepared by grafting from a polymer backbone in which up to each monomer unit additionally comprises an initiating species. As was the situation with grafting from particles, these preparations have generally been run in solution with low overall conversion of monomer to polymer.

C8a. Formation of a Bottle Brush Copolymer p-(BPEM-g-(n-BA)) in Solution

A linear multifunctional homopolymer macroinitiator (formed by homopolymerization of HEMA TMS by ATRP then transformation of the functional groups to a bromo-ester, (p(BPEM)) as detailed in other co-assigned patents and applications) with a degree of polymerization of 480 was used as the initiator for the polymerization of n-BA. The polymerization was conducted for 5.5 hours. The degree of polymerization of each grafted from n-BA chain was 230 as measured by gravimetry and 380 by GPC MALS (this provides an exaggerated number).

C8b. Attempt to Run a "Normal" ATRP Reaction to Form a Bottle Brush Copolymer p-(BPEM-g-(n-BA)) in Miniemulsion.

Accordingly it was of interest to apply the presently developed system to the preparation of bottle brush copolymers. In run KM 271, a direct ATRP from a linear multi-initiator backbone was performed in miniemulsion, which is particularly inconvenient since oxygen has to be absent from the system. CuBr and BPMODA were charged to a 50 mL Schlenk flask, which was then subject to vacuum and refilled with nitrogen. This cycle was repeated 4~5 times before the deoxygenated BA was injected into the flask. The complex $Cu^I$/BPMODA was formed quickly under 50° C. and displayed a lemon yellow color. Deoxygenated hexadecane and Brij98 solution were injected into the mixture. Then the mixture was purged with violent passage of argon when the rubber septum was open to air and the sonicator probe was put inside the mixture. After sonicating for one minute, the flask was quickly sealed with a rubber septum and the argon flow was continued to purge the homogenized mixture for another 10 minutes. The flask was then immersed in the oil bath thermostated at 80° C. An anisole solution of macroinitiator, which had already been purged with nitrogen, was injected into the reaction mixture to initiate the polymerization. However, using this procedure for a chain extension a copolymerization is difficult because of the inefficient dispersion of the initiator. Before the addition of the macroinitiator, each component of the ATRP process had been dispersed in monomer droplets through the sonicating process. However, the macroinitiator added can not be efficiently dispersed in the miniemulsion mixture. Because the initiator is insoluble in water, it had to be dissolved in a non-polar solvent such as anisole and hence the initiator in the anisole solvent has no driving force to go inside the monomer droplets. On the contrary, the anisole droplets, formed under the stirring, tended to aggregate. They can initiate some monomers close to them but then there would be too many initiators in one anisole droplet, intra- or inter-molecular coupling reactions would occur rapidly, which would generate a gel-droplet. These gel droplets absorbed more and more monomer from the monomer droplets and they also tend to aggregate. Large gel droplets were observed after 1 hour.

Example 17

Bottle Brush Copolymers Prepared in Miniemulsion

17a. Synthesis of p-(BPEM-g-MMA) Using SR&NI Mini-Emulsion

Figure 20:
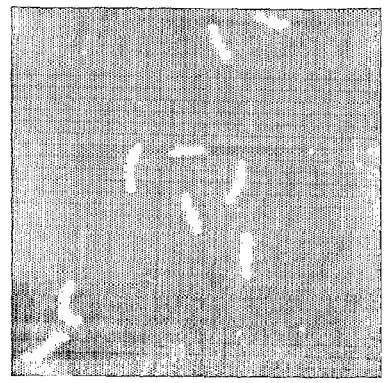
FIG. 20 is an atomic force microscopy image of a bottle brush copolymer prepared by SR&NI ATRP in miniemulsion.
Figure 21:
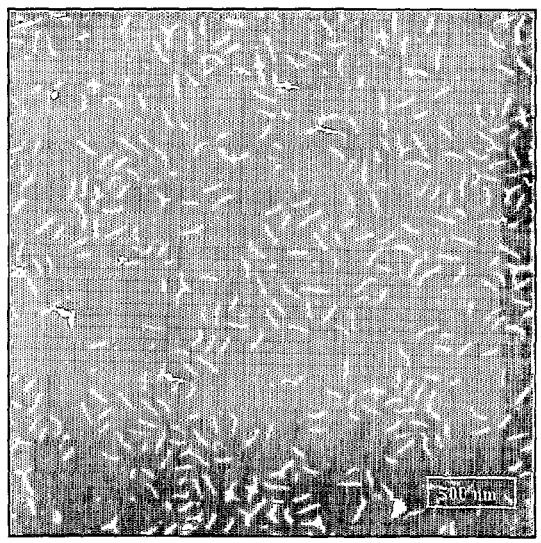
FIG. 21 is an atomic force microscopy image of a bottle brush copolymer prepared by ARGET ATRP in miniemulsion with ascorbic acid as the reducing agent and an ascorbic acid to Cu(II) ration of 1:4.
Figure 21:
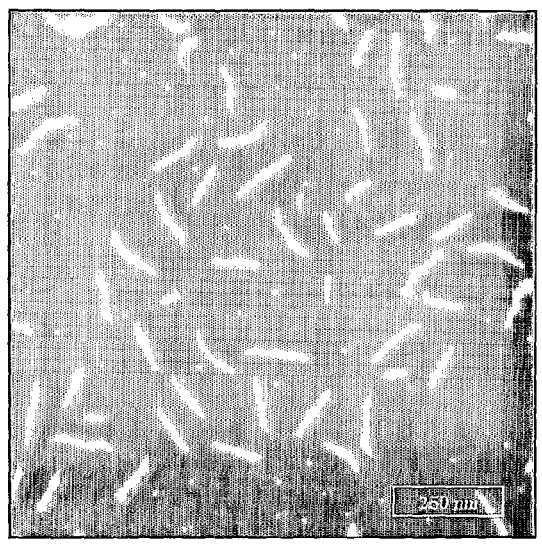

In a round bottom flask, 0.0177 g BPMODA, 4.01 g MMA, 0.0527 g p-(BPEM), and 0.0051 g $CuCl_2$ were mixed and dissolved in hot oil bath (T=60° C.). The blue-colored solution was cooled down in an ice bath. The following reagents were then added: 0.0042 g AIBN, 0.26 mL hexadecane, and 16 g Brij98/$H_2O$ (20 mM). The mixture was transferred to a Schlenk flask and purged with $N_2$ for 15 min. Afterwards, the flask was immersed in a hot oil bath (T=80° C.) and reaction started. Approximately 1.5 mL samples were taken every 30 min. for gravimetric and GC conversion analysis. There appears to be slow initiation and then rapid polymerization of MMA. The final conversion for this polymerization is 71.3% by GC. The reaction was terminated after t=150 min by removing the flask from the oil bath. The polymer was precipitated from MeOH. The resulting solid could be redissolved in THF and cast into a film. AFM images of the cast film showed that there was no brush-brush coupling. (FIG. 20.)

17b. Synthesis of p-(BPEM-g-MMA) with 400:1 Molar Ratio Using Mini-Emulsion

In a round bottom flask, 0.0179 g BPMODA, 7.99 g MMA, 0.0534 g p-(BPEM), and 0.0053 g $CuCl_2$ were mixed and dissolved in hot oil bath (T=60° C.). The blue-colored solution was cooled down in an ice bath. The following reagents were then added: 0.0023 g AIBN, 0.52 mL hexadecane, and 32 g Brij98/$H_2O$. The mixture was transferred to a Schlenk flask and purged with $N_2$ for 15 min. Afterwards, the flask was immersed in a hot oil bath (T=65° C.) and reaction started. The reaction was terminated after t=22.5 hours by removing the flask from the oil bath. The polymer was precipitated from MeOH.

Figure 15:
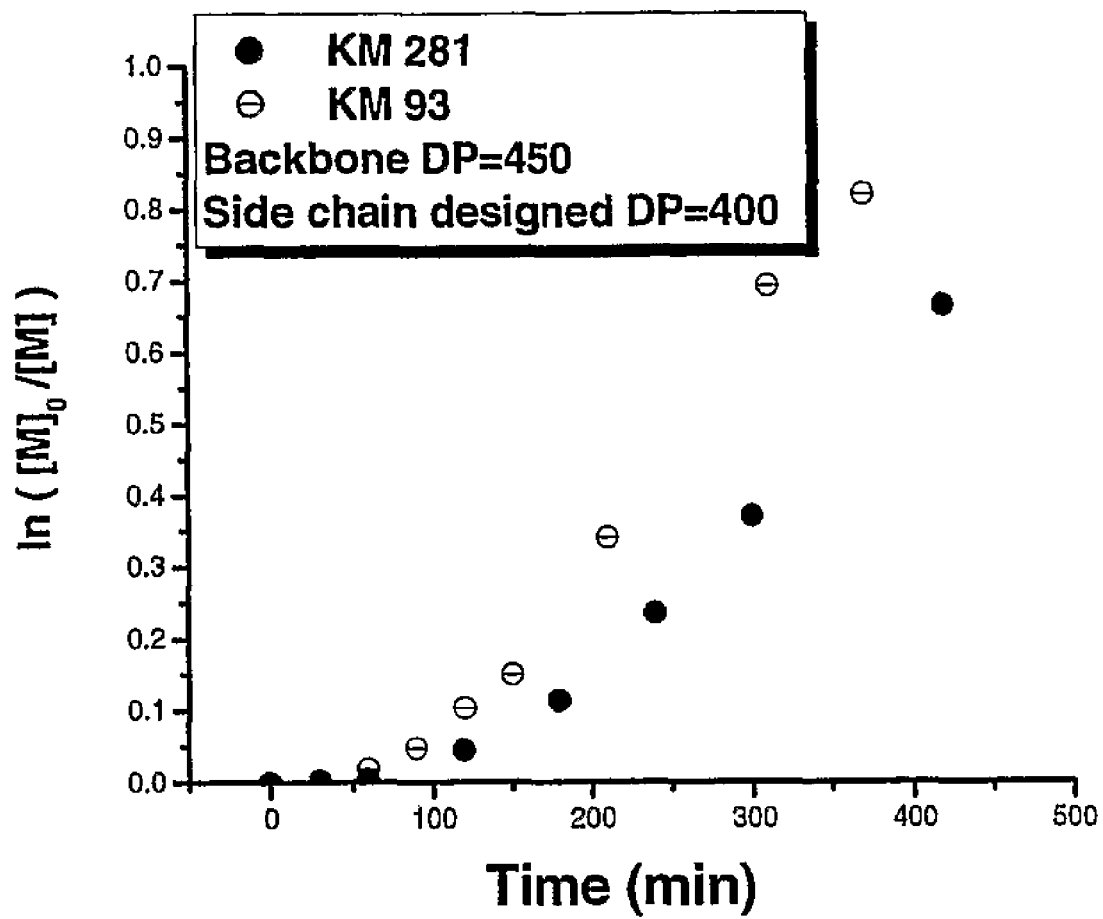
FIG. 15 is a graph of the kinetics of a SR&NI ATRP for preparation of polymer brushes in miniemulsion, where KM 93 is a polymerization process using a functionalized silica particle as the initiator and KM 281 is polymerization process for the preparation of a bottle brush copolymer.

The above procedure was used for several examples of brush polymers with BA side chains using SR&NI ATRP in miniemulsion, in order to prove that the conversion can reach higher value in miniemulsion than in bulk and that the molecular weight of the grafted chain can be driven to higher values. This was confirmed. When targeting a degree of polymerization of 400 for the grafts the conversion reached to 60% after 7 hours and while there was an induction period at the beginning, which indicated slow activation there was a subsequent linear rate of conversion, (kinetic plots for two runs are shown in FIG. 15). The miniemulsion remained stable after the reaction. AFM is by now the best way to analyze whether coupling reactions occurred inside monomer droplets and FIG. 20 shows that uncrosslinked molecules were prepared.

Example 18

Synthesis of p-(BPEM-g-n-BA) Brushes by AGET ATRP

In an AGET ATRP miniemulsion polymerization system the polymerization rate depends to a significant degree on the amount of ascorbic acid added to activate the catalyst complex. A ratio of ascorbic acid/$Cu^{(II)}$ of 1:2, was selected, which was slightly higher than that used in bulk/solution polymerization. A higher ratio was selected since in a bulk system, the AGET ATRP proceeds slowly in a controlled manner as a result of the remaining $Cu^{(II)}$ species that significantly affected the polymerization rate. On the other hand, in miniemulsion, diffusion of $Cu^{(II)}$ out of the monomer droplets actually helps maintain the conversion the rate and addition of "excess" reducing agent drives the reduced $Cu^{(I)}$ back to the droplet. The AFM images of brush copolymers prepared by AGET miniemulsion show that there was almost no crosslinking when ascorbic acid was added with the ratio to $Cu^{(II)}$ of 1:5 and that there was no homopolymers formed in the reaction.

The invention claimed is:

1. A polymerization process, comprising:
polymerizing free radically (co)polymerizable monomers in the presence of a reducing agent and a polymerization medium initially comprising:
at least one transition metal catalyst; and
an atom transfer radical polymerization initiator; and
wherein the molar ratio of the transition metal catalyst to the atom transfer radical polymerization initiator is less than 0.05,
wherein the reducing agent is capable of reducing the at least one transition metal catalyst from an oxidized, inactive state to a reduced, active state, and
wherein the oxidized reduction product does not participate as an initiator or a catalyst in control of the polymerization process.

2. The polymerization process of claim 1, wherein the transition metal catalyst is in an oxidized state, and the polymerization process further comprises reacting the reducing agent with at least one of the transition metal catalyst in an oxidized state and a compound comprising a radically transferable atom or group to form a compound that does not participate in control of the polymerization process.

3. The polymerization process of claim 1, wherein the concentration of transition metal catalyst in the polymerization medium is less than 1000 ppm.

4. The polymerization process of claim 1, wherein the concentration of transition metal catalyst in the polymerization medium is less than 100 ppm.

5. The polymerization process of claim 1, wherein the concentration of transition metal catalyst in the polymerization medium is less than 10 ppm.

6. The polymerization process of claim 1, wherein the polymerization medium further comprises a suspending medium.

7. The polymerization process of claim 1, wherein the reducing agent is an inorganic compound.

8. The polymerization process of claim 7, wherein the reducing agent is at least one of a transition metal compound, a sulfur compound of a low oxidation level, sodium hydrogen sulfite, an inorganic salt comprising a metal ion, hydrazine hydrate, and derivatives of such inorganic compounds.

9. The polymerization process of claim 8, wherein the metal ion is at least one of $Sn^{2+}$, $Fe^{2+}$, $Cr^{3+}$, $Al^{3+}$, $Ti^{3+}$ and $Ti^{4+}$.

10. The polymerization process of claim 9, wherein the metal ion is at least one of $Sn^{2+}$, $Fe^{2+}$, $Cr^{3+}$ and $Ti^{3+}$.

11. The polymerization process of claim 1, wherein the reducing agent is an organic compound.

12. The polymerization process of claim 11, wherein the reducing agent is at least one of alkylthiols, mercaptoethanol or carbonyl compounds that can be easily enolized, ascorbic acid, acetyl acetonate, camphosulfonic acid, hydroxy acetone, reducing sugars, monosaccarides, glucose, aldehydes, and derivatives of such organic compounds.

13. The polymerization process of claim 1, wherein the atom transfer radical polymerization initiator comprises at least two radically transferable atoms or groups.

14. The polymerization process of claim 1, wherein the atom transfer radical polymerization initiator comprises a radically transferable atom or group attached to a polymer or a solid.

15. The polymerization process of claim 1, wherein the polymerization medium further comprises a solvent or suspending medium.

16. The polymerization process of claim 15, wherein the polymerization process is one of an emulsion polymerization, a mini-emulsion polymerization, microemulsion process, a reverse emulsion polymerization, and a suspension polymerization.

17. The polymerization process of claim 1, wherein the polymerization process further comprises a suspending medium, a surfactant, and a monomer phase comprising at least a portion of the radically polymerizable monomers.

18. The polymerization process of claim 17, wherein the reducing agent is capable of reacting with dissolved oxygen or react with a transitional complex that was oxidized by oxygen.

19. The polymerization process of claim 17, wherein the suspending medium is an inorganic liquid.

20. The polymerization process of claim 19, wherein the suspending medium is water.

21. The polymerization process of claim 20, wherein the reducing agent is water soluble.

22. The polymerization process of claim 1, wherein the reducing agent is at least partially soluble in the polymerization medium.

23. The polymerization process of claim 1, wherein the transition metal catalyst participates in a redox reaction between a higher oxidation state and a lower oxidation state.

24. The polymerization process of claim 23, wherein the molar ratio of reducing agent to transition metal catalyst in the higher oxidation state is 1 or less.

25. The polymerization process of claim 1, wherein the atom transfer radical polymerization initiator is at least one of an alkyl halide and a substituted ester.

26. The polymerization process of claim 17, wherein the polymerization medium further comprises a base.

27. The polymerization process of claim 1, wherein the atom transfer radical polymerization initiator comprises a radically transferable atom or group attached to a substrate.

28. The polymerization process of claim 1, wherein the reducing agent is capable of reacting with dissolved oxygen or react with a transitional complex that was oxidized by oxygen.

29. The polymerization process of claim 1, wherein the polymerization medium further comprises a base.

30. The polymerization process of claim 1, wherein the polymerization medium comprises two reducing agents.

31. The polymerization process of claim 30, wherein the rate of reduction of the two reducing agents is different.

32. The polymerization process of claim 16, wherein the atom transfer radical polymerization initiator comprises at least two radically transferable atoms or groups.

33. The polymerization process of claim 17, wherein the reducing agent is soluble in at least one of the suspending phase and the monomer phase.

34. The polymerization process of claim 1, wherein the molar ratio of reducing agent to transition metal catalyst in the higher oxidation state is more than 1.

35. The polymerization process of claim 15, wherein the polymerization medium comprises two reducing agents.

36. The polymerization process of claim 35, wherein the rate of reduction of the two reducing agents is different.

37. A polymerization process, comprising:
polymerizing free radically (co)polymerizable monomers in the presence a polymerization medium initially comprising:
at least one transition metal catalyst;
a reducing agent, and
an atom transfer radical polymerization initiator;
wherein the molar ratio of the transition metal catalyst to the atom transfer radical polymerization initiator is less than 0.25 and the reducing agent reacts with at least one of the transition metal catalyst and a compound comprising a radically transferable atom or group to form a compound that does not participate as an initiator or a catalyst in control of the polymerization process.

38. The polymerization process of claim 26, wherein the base is a ligand.

39. The polymerization process of claim 29, wherein the base is a ligand.

40. The polymerization process of claim 37, wherein the reducing agent is one of an inorganic or an organic reducing agent.

41. The polymerization process of claim 40, wherein the organic reducing agent is one of at least one of alkyithiols, mercaptoethanol or carbonyl compounds that can be easily enolized, ascorbic acid, acetyl acetonate, camphorsulfonic acid, hydroxy acetone, reducing sugars, monosaccharides, glucose, aldehydes, or derivates of such organic compounds.

42. The polymerization process of claim 41, wherein the organic reducing agent is ascorbic acid or a derivative of ascorbic acid.

* * * * *